US008622842B2

(12) United States Patent
Nguyen et al.

(10) Patent No.: US 8,622,842 B2
(45) Date of Patent: Jan. 7, 2014

(54) VIRTUAL LEASH FOR PERSONAL GAMING DEVICE

(75) Inventors: Binh T. Nguyen, Reno, NV (US); David H. Muir, Newcastle (AU); Craig A. Paulsen, Reno, NV (US); James W. Stockdale, Clio, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 13/610,645

(22) Filed: Sep. 11, 2012

(65) Prior Publication Data

US 2013/0005453 A1 Jan. 3, 2013

Related U.S. Application Data

(63) Continuation of application No. 11/155,702, filed on Jun. 16, 2005, now Pat. No. 8,282,475, which is a continuation-in-part of application No. 10/871,876, filed on Jun. 17, 2004, now Pat. No. 8,087,988, and a continuation-in-part of application No. 10/672,307, filed on Sep. 26, 2003, now Pat. No. 7,918,728, which is a continuation-in-part of application No. 09/882,558, filed on Jun. 15, 2001, now Pat. No. 6,628,939.

(51) Int. Cl.
*A63F 9/24* (2006.01)
*A63F 13/00* (2006.01)

(52) U.S. Cl.
USPC .................. 463/42; 463/16; 463/20; 463/25; 463/29

(58) Field of Classification Search
USPC .......................................... 463/16, 20, 25, 42
See application file for complete search history.

(56) References Cited

U.S. PATENT DOCUMENTS

| | | | |
|---|---|---|---|
| 4,335,809 | A | 6/1982 | Wain |
| 4,467,424 | A | 8/1984 | Hedges et al. |
| 4,614,342 | A | 9/1986 | Takashima |

(Continued)

FOREIGN PATENT DOCUMENTS

| | | | |
|---|---|---|---|
| AT | 184721 | T | 10/1999 |
| AU | 4664296 | A | 8/1996 |

(Continued)

OTHER PUBLICATIONS

U.S. Appl. No. 12/208,074, filed Sep. 10, 2008, Mattice et al.

(Continued)

*Primary Examiner* — William M. Brewster
*Assistant Examiner* — Ryan Hsu
(74) *Attorney, Agent, or Firm* — Foley & Lardner LLP

(57) ABSTRACT

Methods and systems for providing a virtual leash and command download capabilities on a hand-held personal gaming device ("PGD") are disclosed. A host gaming system includes a game server configured to generate game seeds having data regarding predetermined game outcomes for various wager based games, and an authentication server configured to establish a virtual leash with a PGD. The virtual leash is adapted to repeatedly authenticate or verify a PGD user, a PGD location, the PGD itself, and/or software codes on the PGD. Included within an associated PGD are a display adapted to display gaming related information, a processor configured to execute gaming related code, and a memory containing a command download of computer code to be executed by the processor. The command download of computer code includes enough code for the PGD to process and display independently a game play based on a game seed.

19 Claims, 17 Drawing Sheets

(56) References Cited

U.S. PATENT DOCUMENTS

| | | | | |
|---|---|---|---|---|
| 4,624,462 | A | 11/1986 | Itkis | |
| 4,764,666 | A | 8/1988 | Bergeron | |
| 4,837,422 | A | 6/1989 | Dethloff et al. | |
| 4,856,787 | A | 8/1989 | Itkis | |
| 5,038,022 | A | 8/1991 | Lucero | |
| 5,048,831 | A | 9/1991 | Sides | |
| 5,054,787 | A | 10/1991 | Richardson | |
| 5,069,453 | A | 12/1991 | Koza et al. | |
| 5,112,050 | A | 5/1992 | Koza et al. | |
| 5,129,652 | A | 7/1992 | Wilkinson | |
| 5,178,389 | A | 1/1993 | Bentley et al. | |
| 5,218,356 | A | 6/1993 | Knapp | |
| 5,242,163 | A | 9/1993 | Fulton | |
| 5,265,874 | A | 11/1993 | Dickinson et al. | |
| 5,324,035 | A | 6/1994 | Morris et al. | |
| 5,342,047 | A | 8/1994 | Heidel et al. | |
| 5,382,784 | A | 1/1995 | Eberhardt | |
| 5,393,057 | A | 2/1995 | Marnell, II | |
| 5,393,073 | A | 2/1995 | Best | |
| 5,557,086 | A | 9/1996 | Schulze et al. | |
| 5,618,045 | A | 4/1997 | Kagan et al. | |
| 5,630,586 | A | 5/1997 | Lowden | |
| 5,643,086 | A | 7/1997 | Alcorn et al. | |
| 5,655,966 | A | 8/1997 | Werdin et al. | |
| 5,678,886 | A | 10/1997 | Infanti | |
| 5,709,603 | A | 1/1998 | Kaye | |
| 5,738,583 | A | 4/1998 | Comas et al. | |
| 5,741,183 | A | 4/1998 | Acres et al. | |
| 5,761,647 | A | 6/1998 | Boushy | |
| 5,762,552 | A | 6/1998 | Vuong et al. | |
| 5,768,382 | A | 6/1998 | Schneier et al. | |
| 5,770,533 | A | 6/1998 | Franchi | |
| 5,779,545 | A | 7/1998 | Berg et al. | |
| 5,779,546 | A | 7/1998 | Meissner et al. | |
| 5,795,228 | A | 8/1998 | Trumbull et al. | |
| 5,797,085 | A | 8/1998 | Beuk et al. | |
| 5,810,664 | A | 9/1998 | Clapper, Jr. | |
| 5,851,149 | A | 12/1998 | Xidos et al. | |
| 5,871,398 | A | 2/1999 | Schneier et al. | |
| 5,905,523 | A | 5/1999 | Woodfield et al. | |
| 5,915,023 | A | 6/1999 | Bernstein | |
| 5,951,397 | A | 9/1999 | Dickinson | |
| 5,970,143 | A | 10/1999 | Schneier et al. | |
| 5,999,808 | A | 12/1999 | LaDue | |
| 6,001,016 | A | 12/1999 | Walker et al. | |
| 6,012,832 | A | 1/2000 | Saunders et al. | |
| 6,012,983 | A | 1/2000 | Walker et al. | |
| 6,019,283 | A | 2/2000 | Lucero | |
| 6,024,640 | A | 2/2000 | Walker et al. | |
| 6,048,269 | A | 4/2000 | Burns et al. | |
| 6,093,100 | A | 7/2000 | Singer et al. | |
| 6,099,408 | A | 8/2000 | Schneier et al. | |
| 6,104,815 | A | 8/2000 | Alcorn et al. | |
| 6,105,008 | A | 8/2000 | Davis et al. | |
| 6,106,396 | A | 8/2000 | Alcorn et al. | |
| 6,110,041 | A | 8/2000 | Walker et al. | |
| 6,113,495 | A | 9/2000 | Walker et al. | |
| 6,117,013 | A | 9/2000 | Eiba | |
| 6,135,887 | A | 10/2000 | Pease et al. | |
| 6,149,522 | A | 11/2000 | Alcorn et al. | |
| 6,178,510 | B1 | 1/2001 | O'Connor et al. | |
| 6,234,896 | B1 | 5/2001 | Walker et al. | |
| 6,264,559 | B1 | 7/2001 | Lawrence et al. | |
| 6,264,561 | B1 | 7/2001 | Saffari et al. | |
| 6,270,410 | B1 | 8/2001 | DeMar et al. | |
| 6,280,326 | B1 | 8/2001 | Saunders | |
| 6,285,868 | B1 | 9/2001 | LaDue | |
| 6,308,887 | B1 | 10/2001 | Korman et al. | |
| 6,319,122 | B1 | 11/2001 | Packes et al. | |
| 6,340,331 | B1 | 1/2002 | Saunders et al. | |
| 6,354,941 | B2 | 3/2002 | Miller et al. | |
| 6,394,907 | B1 | 5/2002 | Rowe | |
| 6,402,614 | B1 | 6/2002 | Schneier et al. | |
| 6,409,602 | B1 | 6/2002 | Wiltshire et al. | |
| 6,416,414 | B1 | 7/2002 | Stadelmann | |
| 6,424,819 | B1 | 7/2002 | Yan | |
| 6,488,585 | B1 | 12/2002 | Wells et al. | |
| 6,508,709 | B1 | 1/2003 | Karmarkar | |
| 6,527,638 | B1 | 3/2003 | Walker et al. | |
| 6,554,707 | B1 | 4/2003 | Sinclair et al. | |
| 6,612,928 | B1 | 9/2003 | Bradford et al. | |
| 6,628,939 | B2 | 9/2003 | Paulsen | |
| 6,638,170 | B1 | 10/2003 | Crumby | |
| 6,645,077 | B2 | 11/2003 | Rowe | |
| 6,676,522 | B2 | 1/2004 | Rowe et al. | |
| 6,682,421 | B1 | 1/2004 | Rowe et al. | |
| 6,685,567 | B2 | 2/2004 | Cockerille et al. | |
| 6,761,636 | B2 | 7/2004 | Chung et al. | |
| 6,790,141 | B2 | 9/2004 | Muir | |
| 6,790,143 | B2 * | 9/2004 | Crumby | 463/42 |
| 6,800,029 | B2 | 10/2004 | Rowe et al. | |
| 6,804,763 | B1 | 10/2004 | Stockdale et al. | |
| 6,837,789 | B2 | 1/2005 | Garahi et al. | |
| 6,843,725 | B2 | 1/2005 | Nelson | |
| 6,846,238 | B2 | 1/2005 | Wells | |
| 6,863,608 | B1 | 3/2005 | LeMay et al. | |
| 6,918,831 | B2 | 7/2005 | Nguyen et al. | |
| 6,942,570 | B2 | 9/2005 | Schneier et al. | |
| 6,964,611 | B2 | 11/2005 | Packes, Jr. et al. | |
| 6,971,956 | B2 | 12/2005 | Rowe et al. | |
| 6,988,946 | B2 | 1/2006 | Michaelson et al. | |
| 7,008,317 | B2 | 3/2006 | Cote et al. | |
| 7,037,193 | B1 | 5/2006 | Kasparov et al. | |
| 7,111,141 | B2 | 9/2006 | Nelson | |
| 7,116,782 | B2 | 10/2006 | Jackson et al. | |
| 7,384,339 | B2 | 6/2008 | LeMay et al. | |
| 7,510,474 | B2 | 3/2009 | Carter, Sr. | |
| 7,515,718 | B2 | 4/2009 | Nguyen et al. | |
| 7,796,013 | B2 | 9/2010 | Murakami et al. | |
| 7,850,528 | B2 | 12/2010 | Wells | |
| 7,918,728 | B2 | 4/2011 | Nguyen et al. | |
| 8,087,988 | B2 | 1/2012 | Nguyen et al. | |
| 8,155,637 | B2 | 4/2012 | Fujisawa et al. | |
| 8,226,474 | B2 | 7/2012 | Nguyen et al. | |
| 2001/0003100 | A1 | 6/2001 | Yacenda | |
| 2001/0039204 | A1 | 11/2001 | Tanskanen | |
| 2001/0041612 | A1 | 11/2001 | Garahi et al. | |
| 2001/0053247 | A1 | 12/2001 | Sowinski et al. | |
| 2002/0035538 | A1 | 3/2002 | Moreau | |
| 2002/0035605 | A1 | 3/2002 | McDowell et al. | |
| 2002/0042729 | A1 | 4/2002 | Yajima et al. | |
| 2002/0060243 | A1 | 5/2002 | Janiak et al. | |
| 2002/0066041 | A1 | 5/2002 | Lemke | |
| 2002/0068629 | A1 | 6/2002 | Allen et al. | |
| 2002/0069166 | A1 | 6/2002 | Moreau et al. | |
| 2002/0085515 | A1 | 7/2002 | Jaynes et al. | |
| 2002/0089410 | A1 | 7/2002 | Janiak et al. | |
| 2002/0094860 | A1 | 7/2002 | Itkis et al. | |
| 2002/0098883 | A1 | 7/2002 | Packes et al. | |
| 2002/0098888 | A1 | 7/2002 | Rowe et al. | |
| 2002/0103008 | A1 | 8/2002 | Rahn et al. | |
| 2002/0111213 | A1 | 8/2002 | McEntee et al. | |
| 2002/0115487 | A1 | 8/2002 | Wells | |
| 2002/0119800 | A1 | 8/2002 | Jaggers et al. | |
| 2002/0193099 | A1 | 12/2002 | Paulsen | |
| 2003/0031321 | A1 | 2/2003 | Mages | |
| 2003/0040354 | A1 | 2/2003 | Itkis et al. | |
| 2003/0045341 | A1 | 3/2003 | Itkis et al. | |
| 2003/0064805 | A1 | 4/2003 | Wells | |
| 2003/0088880 | A1 | 5/2003 | Martinez et al. | |
| 2003/0104865 | A1 | 6/2003 | Itkis et al. | |
| 2003/0130029 | A1 | 7/2003 | Crumby | |
| 2003/0130039 | A1 | 7/2003 | Nelson | |
| 2003/0159044 | A1 | 8/2003 | Doyle et al. | |
| 2003/0171986 | A1 | 9/2003 | Itkis et al. | |
| 2003/0232647 | A1 | 12/2003 | Moser | |
| 2004/0002385 | A1 | 1/2004 | Nguyen | |
| 2004/0038723 | A1 | 2/2004 | Schneier et al. | |
| 2004/0048667 | A1 | 3/2004 | Rowe | |
| 2004/0053674 | A1 | 3/2004 | Nguyen et al. | |
| 2004/0053692 | A1 | 3/2004 | Chatigny et al. | |
| 2004/0137987 | A1 | 7/2004 | Nguyen et al. | |
| 2004/0180718 | A1 | 9/2004 | Uchida et al. | |
| 2004/0192439 | A1 | 9/2004 | Kula | |

(56) References Cited

U.S. PATENT DOCUMENTS

| | | | |
|---|---|---|---|
| 2004/0209690 | A1 | 10/2004 | Bruzzese et al. |
| 2004/0224741 | A1 | 11/2004 | Jen et al. |
| 2004/0230639 | A1 | 11/2004 | Soluk et al. |
| 2004/0235550 | A1 | 11/2004 | McNally et al. |
| 2004/0242321 | A1 | 12/2004 | Overton |
| 2005/0009600 | A1 | 1/2005 | Rowe et al. |
| 2005/0059485 | A1 | 3/2005 | Paulsen et al. |
| 2005/0097179 | A1 | 5/2005 | Orme |
| 2005/0101383 | A1 | 5/2005 | Wells |
| 2005/0107164 | A1 | 5/2005 | Muir et al. |
| 2005/0130728 | A1 | 6/2005 | Nguyen et al. |
| 2005/0143169 | A1 | 6/2005 | Nguyen et al. |
| 2005/0164783 | A1 | 7/2005 | Paulsen et al. |
| 2005/0181870 | A1 | 8/2005 | Nguyen et al. |
| 2005/0239530 | A1 | 10/2005 | Walker et al. |
| 2006/0009275 | A1 | 1/2006 | Packes et al. |
| 2006/0019745 | A1 | 1/2006 | Benbrahim |
| 2006/0035707 | A1 | 2/2006 | Nguyen et al. |
| 2006/0058102 | A1 | 3/2006 | Nguyen et al. |
| 2006/0068895 | A1 | 3/2006 | Nguyen et al. |
| 2006/0111168 | A1 | 5/2006 | Nguyen et al. |
| 2006/0211493 | A1 | 9/2006 | Walker et al. |
| 2006/0281541 | A1 | 12/2006 | Nguyen et al. |
| 2007/0101039 | A1 | 5/2007 | Rutledge et al. |
| 2007/0207852 | A1 | 9/2007 | Nelson et al. |
| 2008/0026844 | A1 | 1/2008 | Wells |
| 2008/0076547 | A1 | 3/2008 | Bigelow et al. |
| 2008/0076572 | A1 | 3/2008 | Nguyen et al. |
| 2008/0108426 | A1 | 5/2008 | Nguyen et al. |
| 2008/0182667 | A1 | 7/2008 | Davis et al. |
| 2008/0188308 | A1 | 8/2008 | Shepherd et al. |
| 2008/0234047 | A1 | 9/2008 | Nguyen |
| 2008/0298330 | A1 | 12/2008 | Leitch |
| 2009/0170596 | A1 | 7/2009 | Gagner et al. |
| 2009/0291755 | A1 | 11/2009 | Walker et al. |
| 2012/0094769 | A1 | 4/2012 | Nguyen et al. |

FOREIGN PATENT DOCUMENTS

| | | | |
|---|---|---|---|
| AU | 199871427 | | 4/1998 |
| AU | 199954012 | | 4/2000 |
| AU | 2001249901 | | 10/2001 |
| AU | 2001255746 | | 11/2001 |
| BR | 9606847 | A | 11/1997 |
| CA | 2 211 297 | A1 | 8/1996 |
| CA | 2 273 458 | | 1/2000 |
| CA | 2 302 548 | A1 | 5/2000 |
| CA | 2 211 297 | C | 8/2002 |
| CN | 1174620 | A | 2/1998 |
| CN | 1098510 | C | 1/2003 |
| CZ | 9702296 | A3 | 12/1997 |
| CZ | 294 347 | B6 | 12/2004 |
| DE | 195 02 613 | | 1/1996 |
| DE | 199 22 862 | A1 | 5/1999 |
| EP | 0 024 184 | A2 | 2/1981 |
| EP | 0 631 247 | A2 | 12/1994 |
| EP | 0 649 102 | A2 | 4/1995 |
| EP | 0 744 786 | A1 | 11/1996 |
| EP | 0 806 024 | A1 | 11/1997 |
| EP | 0 924 657 | A2 | 6/1999 |
| EP | 0 806 024 | B1 | 9/1999 |
| EP | 1 028 551 | A2 | 8/2000 |
| EP | 1 045 346 | A2 | 10/2000 |
| EP | 1 059 742 | A1 | 12/2000 |
| EP | 1 059 742 | A4 | 5/2001 |
| EP | 1 231 577 | | 8/2002 |
| FI | 973046 | A | 9/1997 |
| GB | 2 151 054 | | 7/1985 |
| GB | 2 161 008 | | 1/1986 |
| GB | 2 161 629 | | 1/1986 |
| GB | 2 284 913 | | 6/1995 |
| HU | 9800695 | A2 | 7/1998 |
| JP | 10512984 | T | 12/1998 |
| JP | 2002-530006 | T | 9/2002 |
| NO | 973355 | A | 9/1997 |
| NO | 316247 | B1 | 12/2003 |
| PL | 321544 | A1 | 12/1997 |
| RU | 2132569 | C1 | 6/1999 |
| RU | 2144264 | C1 | 1/2000 |
| RU | 2145116 | C1 | 1/2000 |
| RU | 2174258 | C2 | 9/2001 |
| SK | 101397 | A3 | 2/1998 |
| SK | 284750 | B6 | 11/2005 |
| WO | WO 93/10508 | | 5/1993 |
| WO | WO 95/24689 | | 9/1995 |
| WO | WO 96/00950 | | 1/1996 |
| WO | WO 96/23289 | | 8/1996 |
| WO | WO 98/58509 | | 12/1998 |
| WO | WO 99/23594 | | 5/1999 |
| WO | WO 99/34599 | | 7/1999 |
| WO | WO 99/42964 | | 8/1999 |
| WO | WO 99/51313 | | 10/1999 |
| WO | WO 00/28680 | | 5/2000 |
| WO | WO 00/31982 | | 6/2000 |
| WO | WO-A-00/41428 | | 7/2000 |
| WO | WO-A-00/49731 | | 8/2000 |
| WO | WO 00/67213 | | 11/2000 |
| WO | WO 00/79467 | | 12/2000 |
| WO | WO 01/00291 | | 1/2001 |
| WO | WO 01/01379 | | 1/2001 |
| WO | WO 01/03786 | | 1/2001 |
| WO | WO 01/48712 | | 7/2001 |
| WO | WO 01/54091 | | 7/2001 |
| WO | WO 01/74461 | | 10/2001 |
| WO | WO 01/76710 | | 10/2001 |
| WO | WO 02/055163 | | 7/2002 |
| WO | WO 02/101486 | | 12/2002 |
| WO | WO 02/102483 | | 12/2002 |
| WO | WO 02/103550 | | 12/2002 |
| WO | WO 03/005743 | | 1/2003 |
| WO | WO 03/008057 | | 1/2003 |
| WO | WO 03/019486 | | 3/2003 |
| WO | WO 03/027970 | | 4/2003 |
| WO | WO 2005/031666 | | 4/2005 |
| WO | WO 2006/009791 | | 1/2006 |
| WO | WO 2006/085269 | | 8/2006 |
| WO | WO 2006/138064 | | 12/2006 |
| WO | WO 2008/030928 | | 3/2008 |

OTHER PUBLICATIONS

US Office Action dated Apr. 3, 2003 issued in U.S. Appl. No. 09/967,326.

US Office Action Final dated Oct. 20, 2003 issued in U.S. Appl. No. 09/967,326.

US Office Action (Advisory Action) dated Feb. 4, 2004 issued in U.S. Appl. No. 09/967,326.

US Office Action dated Feb. 25, 2004 issued in U.S. Appl. No. 09/967,326.

US Notice of Allowance dated Sep. 20, 2004 issued in U.S. Appl. No. 09/967,326.

US Office Action dated Nov. 2, 2006 issued in U.S. Appl. No. 11/014,150.

US Notice of Allowance dated Feb. 8, 2007 issued in U.S. Appl. No. 11/014,150.

US Office Action dated Aug. 6, 2007 issued in U.S. Appl. No. 11/014,150.

US Office Action Final dated Mar. 26, 2008 issued in U.S. Appl. No. 11/014,150.

US Office Action (Examiner Interview Summary) dated Aug. 28, 2008 issued in U.S. Appl. No. 11/014,150.

US Office Action Final dated Dec. 3, 2008 issued in U.S. Appl. No. 11/014,150.

US Office Action Final dated Jul. 30, 2009 issued in U.S. Appl. No. 11/014,150.

US Notice of Allowance dated Feb. 2, 2010 issued in U.S. Appl. No. 11/014,150.

US Office Action (Miscellaneous Communication to Applicant—No Action Count) dated Mar. 23, 2010 issued in U.S. Appl. No. 11/014,150.

(56) References Cited

OTHER PUBLICATIONS

US Notice of Allowance dated Jul. 8, 2010 issued in U.S. Appl. No. 11/014,150.
US Miscellaneous Communication dated Jul. 21, 2010 issued in U.S. Appl. No. 11/014,150.
US Miscellaneous Communication dated Sep. 9, 2010 issued in U.S. Appl. No. 11/014,150.
US Office Action Final dated Dec. 15, 2008 issued in U.S. Appl. No. 11/888,326.
US Office Action dated Jun. 27, 2008 issued in U.S. Appl. No. 10/871,876.
US Office Action Final dated Feb. 12, 2009 issued in U.S. Appl. No. 10/871,876.
US Office Action (Advisory Action) dated Apr. 27, 2009 issued in U.S. Appl. No. 10/871,876.
US Office Action dated Jul. 29, 2009 issued in U.S. Appl. No. 10/871,876.
US Office Action Final dated Jan. 20, 2010 issued in U.S. Appl. No. 10/871,876.
US Office Action dated Jul. 8, 2010 issued in U.S. Appl. No. 10/871,876.
US Office Action dated Dec. 23, 2010 issued in U.S. Appl. No. 10/871,876.
US Notice of Allowance dated Oct. 13, 2011 issued in U.S. Appl. No. 10/871,876.
US Office Action Final dated Jul. 31, 2002 issued in U.S. Appl. No. 09/882,558.
US Office Action Final dated Feb. 21, 2003 issued in U.S. Appl. No. 09/882,558.
US Notice of Allowance dated May 9, 2003 issued in U.S. Appl. No. 09/882,558.
US Office Action dated Feb. 15, 2006 issued in U.S. Appl. No. 10/672,307.
US Office Action (Examiner Interview Summary) dated Jun. 20, 2006 issued in U.S. Appl. No. 10/672,307.
US Office Action dated Sep. 21, 2006 issued in U.S. Appl. No. 10/672,307.
US Office Action dated May 8, 2007 issued in U.S. Appl. No. 10/672,307.
US Office Action Final dated Oct. 11, 2007 issued in U.S. Appl. No. 10/672,307.
US Office Action dated May 1, 2008 issued in U.S. Appl. No. 10/672,307.
US Office Action (Examiner Interview Summary) dated Nov. 19, 2008 issued in U.S. Appl. No. 10/672,307.
US Office Action (Examiner Interview Summary) dated Feb. 27, 2009 issued in U.S. Appl. No. 10/672,307.
US Notice of Allowance dated Jul. 6, 2009 issued in U.S. Appl. No. 10/672,307.
US Office Action (Miscellaneous Communication to Applicant—No Action Count) dated Jan. 5, 2010 issued in U.S. Appl. No. 10/672,307.
US Notice of Allowance dated Jan. 22, 2010 issued in U.S. Appl. No. 10/672,307.
US Notice of Allowance dated May 10, 2010 issued in U.S. Appl. No. 10/672,307.
US Miscellaneous Communication dated Jun. 15, 2010 issued in U.S. Appl. No. 10/672,307.
US Office Action dated Oct. 9, 2009 issued in U.S. Appl. No. 11/155,702.
US Office Action (Restriction Requirement) dated Jul. 14, 2010 issued in U.S. Appl. No. 11/155,702.
US Office Action Final dated Dec. 7, 2010 issued in U.S. Appl. No. 11/155,702.
US Office Action dated Apr. 6, 2011 issued in U.S. Appl. No. 11/155,702.
US Notice of Allowance and Allowability dated Sep. 12, 2011 issued in U.S. Appl. No. 11/155,702.
US Allowed Claims dated Dec. 27, 2011 issued in U.S. Appl. No. 11/155,702.
US Notice of Allowance and Allowability dated Dec. 27, 2011 issued in U.S. Appl. No. 11/155,702.
US Notice of Allowance and Allowability dated Jun. 15, 2012 issued in U.S. Appl. No. 11/155,702.
US Office Action dated Sep. 2, 2010 issued in U.S. Appl. No. 11/698,329.
US Office Action Final dated Feb. 4, 2011 issued in U.S. Appl. No. 11/698,329.
US Office Action dated Apr. 13, 2012 issued in U.S. Appl. No. 11/698,329.
U.S. Office Action dated Aug. 22, 2002 issued in U.S. Appl. No. 09/882,559.
U.S. Office Action Final dated Jan. 27, 2003 issued in U.S. Appl. No. 09/882,559.
US Notice of Allowance dated Jul. 16, 2003 issued in U.S. Appl. No. 09/882,559.
US Office Action dated Aug. 17, 2010 issued in U.S. Appl. No. 11/518,342.
US Office Action Final dated Feb. 3, 2011 issued in U.S. Appl. No. 11/518,342.
US Notice of Allowance dated Apr. 5, 2011 issued in U.S. Appl. No. 11/518,342.
US Allowed Claims dated Sep. 28, 2011 issued in U.S. Appl. No. 11/518,342.
US Notice of Allowance dated Sep. 28, 2011 issued in U.S. Appl. No. 11/518,342.
US Notice of Allowance dated Mar. 30, 2012 issued in U.S. Appl. No. 11/518,342.
Third Party Submission for U.S. Appl. No. 13/330,551 dated Jun. 18, 2012.
PCT International Search Report dated Sep. 23, 2003 issued in PCT/US02/31061.
PCT International Written Opinion dated Nov. 10, 2003 issued in PCT/US02/31061.
PCT International Preliminary Examination Report dated Jan. 19, 2004 issued in PCT/US02/31061.
AU Examiner's Report No. 1 dated Aug. 30, 2007 issued in AU Application No. 2002348579.
AU Examiner's Report No. 2 dated Sep. 22, 2008 issued in AU Application No. 2002348579.
AU Examiner's Report No. 3 dated Dec. 18, 2008 issued in AU Application No. 2002348579.
AU Examiner's Report No. 4 dated Mar. 30, 2009 issued in AU Application No. 2002348579.
AU Examiner's first report dated Jun. 17, 2011 issued in AU Application No. 2009212922.
AU Examiner's report No. 2 dated Sep. 22, 2011 issued in AU Application No. 2009212922.
CA Examination Report dated Sep. 7, 2010 issued in Ca Application No. 2,461,881.
CA Examination Report dated Jun. 13, 2011 issued in CA Application No. 2,461,881.
CA Examination Report dated May 3, 2012 issued in CA Application No. 2,461,881.
EP Examination Report dated Aug. 3, 2004 issued in EP Application No. 02 782 084.4.
EP Office Action dated Nov. 18, 2005 issued in EP Application No. 02 782 084.4 (9 pages).
EP Summons to Attend Oral Proceedings EP Office Action dated Nov. 24, 2006 issued in EP Application No. 02 782 084.4.
EP Result of Consultation Office Action dated Mar. 22, 2007 issued in EP Application No. 02 782 084.4.
EP Result of Consultation dated Jul. 5, 2007 issued in EP Application No. 02 782 084.4.
EP Extended Search Report dated Jun. 6, 2007 issued in EP Application No. 07 005 397.0.
EP Examination dated Nov. 7, 2007 issued in EP Application No. 07 005 397.0-2221.
EP Summons to Attend Oral Proceedings dated Apr. 14, 2008 issued in EP 07 005 397.0-2221.
EP Result of Consultation dated Jan. 28, 2009 issued in EP Application No. 07 005 397.0-2221.

(56) References Cited

OTHER PUBLICATIONS

EP Decision to Refuse a European patent application dated Mar. 3, 2009 issued in EP Application No. 07 005 397.0-2221.
EP Commencement of Proceedings before the Board of Appeal dated Jul. 30, 2009 issued in EP Application No. 07 005 397.0-2221.
EP Communication of the Registry dated Apr. 20, 2010 issued in EP Application No. 07 005 397.0-2221.
EP Communication of the Registry dated Jun. 24, 2010 issued in EP Application No. 07 005 397.0-2221.
EP Summons to oral proceedings pursuant to Rule 115(1) EPC dated Aug. 8, 2011 issued in EP Application No. 07 005 397.0.
EP minutes of Oral Proceedings dated Dec. 6, 2011 issued in EP Application No. 07 005 397.0-2221.
EP decision dated Feb. 1, 2012 issued in EP Application No. 07 005 397.0-2221.
EP Extended Search Report dated Jan. 30, 2008 issued in EP 07 015 979.3-2221.
EP Communication re Examination dated Jun. 6, 2008 issued in EP 07 015 979.3-2221.
Ep Summons to Attend Oral Proceedings dated Apr. 30, 2009 issued in EP 07 015 979.32221.
RU Office Action dated Sep. 12, 2006 issued in RU Application No. 2004/109515/09 (010378) (including list of references therein as provided by Russian Associate).
RU Office Action dated Feb. 8, 2007 issued in RU Application No. 2004/109515/09.
PCT International Search Report dated Sep. 19, 2005 issued in PCT/US2005/021350.
PCT International Preliminary Report on Patentability and Written Opinion dated Sep. 18, 2005 issued in PCT/US2005/021350.
PCT International Preliminary Examination Report dated Sep. 11, 2003 issued in PCT/US2002/18861.
PCT International Search Report dated Oct. 29, 2002 issued in PCT/US02/188861.
PCT Written Opinion dated Apr. 8, 2003 issued in PCT/US02/18661.
AU Examiner's First Report dated Mar. 9, 2006 issued in AU Application No. 2002347362.
CA Office Action dated Jun. 4, 2007 issued in CA Application No. 2,454,581.
CA Office Action dated Sep. 5, 2008 issued in Ca Application No. 2,454,581.
CA Office Action dated Sep. 3, 2009 issued in CA Application No. 2,454,581.
CA Office Action dated Oct. 29, 2010 issued in CA Application No. 2,454,581.
EP Supplementary Search Report dated Dec. 4, 2008 issued in EP 02 752 049.3-2221.
EP Examination Report dated Mar. 16, 2011 issued in EP 02 752 049.3-2221.
RU Advisory Office Action dated May 26, 2006 issued in RU Application No. 2003136277/09 (039251).
RU Advisory Office Action dated Sep. 19, 2006 issued in RU Application No. 2003136277/09 (039251).
RU Grant of Patent dated Apr. 9, 2007 issued in RU Application No. 2003136277/09 (039251).
PCT International Search Report dated Jan. 19, 2005 issued in PCT/US2004/031315.
PCT International Preliminary Report on Patentability and Written Opinion dated Jan. 17, 2005 issued in PCT/US2004/031315.
AU Examiner's First Report dated Sep. 17, 2009 issued in AU Application No. 2004277242.
AU Examiner's report No. 2 dated Sep. 7, 2010 issued in AU Application No. 2004277242.
CN First Office Action dated May 16, 2008 issued in 2004800276444.
CN Second Office Action dated Apr. 24, 2009 issued in 2004800276444.
CN Third Office Action dated Oct. 16, 2009 issued in 2004800276444.
CN Fourth Office Action dated May 28, 2010 issued in 2004800276444.
EP Examination Report dated Jul. 20, 2006 issued in EP Application No. 04 788 976.11238.
EP Summons to Attend Oral Proceedings dated Jan. 30, 2009 issued in EP 04 788 976.1.
EP extended Search Report dated Oct. 21, 2009 issued in EP 09 15 9225.3 (EP 2 083 402).
EP Communication re Examination dated Jun. 16, 2010 issued in EP 09 15 9225.3 (EP 2 083 402).
PCT International Search Report dated Sep. 29, 2006 issued in PCT/US2006/021230 (WO 2006/138064).
PCT International Preliminary Examination Report and Written Opinion dated Dec. 17, 2007 issued in PCT/US2006/021230 (WO 2006/138064).
AU Examiner's First Report dated Oct. 11, 2010 issued in AU 2006259733.
AU Examiner's Report No. 2 dated May 3, 2011 issued in AU 2006259733.
CN First Office Action dated Oct. 16, 2009 issued in 200680021769.5.
CN Second Office Action dated Dec. 16, 2011 issued in 200680021769.5.
CN Third Office Action dated Jun. 25, 2012 issued in 200680021769.5.
EP Examination Report dated May 4, 2009 issued in EP 06 760 619.4-1238.
PCT International Preliminary Examination Report dated Aug. 22, 2003 issued in PCT/U502/18875 (WO02/103550).
PCT International Search Report dated Sep. 12, 2002 issued in PCT/US02/18875 (WO02/103550).
PCT Written Opinion dated Feb. 24, 2003 issued in PCT/US02/18875 (WO02/103550).
AU Examiner's First Report dated Mar. 23, 2007 issued in AU 2002322096.
AU Examiner's Second Report dated Oct. 23, 2007 issued in AU 2002322096.
AU Notice of Opposition dated Apr. 6, 2009 issued in AU 2002322096.
AU Statement of Grounds and Particulars dated Jul. 3, 2009 issued in AU 2002322096.
AU Notice Opposition has been Withdrawn dated Aug. 19, 2009 issued in AU 2002322096.
European Supplementary Search Report dated Dec. 4, 2008 issued in EP 02 756 187.7-2221.
European Examination Report dated Mar. 2, 2009 issued in EP 02 756 187.7-2221.
RU Advisory Office Action dated May 31, 2006 issued in RU 2003136278/09 (039240).
RU Resolution on Granting dated Oct. 4, 2006 issued in RU 2003136278/09 (039240).
PCT International Search Report dated Mar. 13, 2008 issued in PCT/US2007/077714 (WO08/030928).
PCT International Preliminary Report on Patentability and Written Opinion dated Mar. 10, 2009 issued in PCT/US2007/077714 (WO08/030928).
AU Examiner's first report dated Aug. 5, 2011 issued in AU 2007292255.
AU Examiner's report No. 2 dated Nov. 21, 2011 issued in AU 2007292255.
EP Examination Report dated Jun. 24, 2009 issued in EP 07 841 947.0.
EP Examination Report dated Nov. 25, 2009 issued in EP 07 841 947.0.
Patent Abstracts of Japan vol. 2000, No. 22, Mar. 9, 2001 & JP 2001 146058 A (Sato Corp), May 29, 2001 abstract.
Anonymous: "EM5007W Multimedia Cassiopeia-Yellow", Casio.com, [Online], Aug. 2, 2001, XP002430868, Retrieved from the Internet: URL:http://web.archive.org/web/20010801654446/www.casio.com/personalpcs/product.cfm?section=19&product=1972> [retrieved on Apr. 24, 2007], 1 page.
Anonymous: "E-125 Cassiopeia", Casio.com, [Online] XP002430869, Retrieved from the Internet: url:http://web.archive.

(56) References Cited

OTHER PUBLICATIONS org/web/20011004012420/www.casio.com/personalpcs/product.cfm?section=19&product=3553, 1 page.

Artobolevsky, I.I. (1976) *Polytechnic dictionary*, Moscow, Soviet Encyclopedia, p. 426.

Author unknown, "Call My Agent", *Business Week*, Mar. 6, 2000, p. 105.

Author unknown, "Smart Cubicles" *Business Week*, Mar. 6, 2000, p. 110.

Author unknown, "The Tube" *Business Week* Mar. 6, 2000, p. 106.

Gigaset CL4 SIMpad siemens.com, description [Online] Jun. 25, 2001, XP002430870 Retrieved from Internet: URL:http://web.archive.org/web/20010625204821/www.mysiemens.com/MySiemens/CDA/Standard/Frameset/0.1649.3_SIMPADCL4_0_0_61_0,FF.html, 3 pages.

http://de.wikipedia.org/wiki/SIMpad (1 page, in German).

Internet/Intranet Information Appliance: Brilliant 15 Screen in Compact, Space saving Design, DT Research, Inc., www.dtresearch.com Oct. 2000, 2 pages.

Laptop.pdf as copied from Wikipedia (http://en.wikipedia.org/wiki/Laptop), 22 pages, [Retrieved from the Internet on Nov. 23, 2008], 22 pages.

Norenkov et al. (1998) "Telecommunication technologies and networks", Moscow, Publishing House of the Moscow State Technical University named after Bauman, 7:30.

Palermo, Vincent, "Near-filed magnetic comms emerges", Digital TV DesignLine.com, 5 pages.

Palm™ m100 Specifications, www.palm.com [Retrieved from Internet on Sep. 6, 2006], 7 pages.

PCI Local Bus.pdf as redirected from Mini PCI from search on Wikipedia (http://en.wikipedia.org/wiki/MiniPCI), [Retrieved from Internet on Nov. 29, 2008], 15 pages.

"Mobile Gaming System Policies", State of Nevada wireless gaming regulations, http://gaming.nv.gov/documents/pdf/techpolicy_06may18.pdf, [Retrieved from Internet on Sep. 6, 2006], 5 pages.

The definition of graphical, *The American Heritage*® Dictionary of the English Language, *Third Edition*, copyright 1992 by Houghton Mifflin Company.

Wireless LAN.pdf from Wikipedia (http://en.wikipedia.org/wiki/Wireless_LAN), [Retrieved from the Internet on Nov. 23, 2008], 12 pages.

Wireless network.pdf from Wikipedia (http://en.wikipedia.org/wiki/wireless_network), [Retrieved from Internet on Sep. 24, 2009] 4 pages.

Wireless router.pdf from Wikipedia (http://en.wikipedia.org/wiki/Wireless_router), [Retrieved from the Internet on Nov. 29, 2008], 3 pages.

* cited by examiner

VIRTUAL LEASH FOR PERSONAL GAMING DEVICE

CROSS-REFERENCE TO RELATED APPLICATIONS

The present application is a continuation of and claims priority from co-pending U.S. patent application Ser. No. 11/155,702, filed Jun. 16, 2005, entitled "VIRTUAL LEASH FOR PERSONAL GAMING DEVICE," which is a continuation-in-part of U.S. patent application Ser. No. 10/871,876, filed Jun. 17, 2004, which is now U.S. Pat. No. 8,087,988, issued on Jan. 3, 2012, entitled "PERSONAL GAMING DEVICE AND METHOD OF PRESENTING A GAME." U.S. patent application Ser. No. 11/155,702, filed Jun. 16, 2005, entitled "VIRTUAL LEASH FOR PERSONAL GAMING DEVICE," is also a continuation-in-part of and claims priority from U.S. patent application Ser. No. 10/672,307, filed Sep. 26, 2003, which is now U.S. Pat. No. 7,918,728, issued on Apr. 5, 2011, entitled "PERSONAL GAMING DEVICE AND METHOD OF PRESENTING A GAME," which is a continuation-in-part of U.S. patent application Ser. No. 09/882,558, filed Jun. 15, 2001, which is now U.S. Pat. No. 6,628,939, issued on Sep. 30, 2003, entitled "PERSONAL GAMING DEVICE." All of the above-referenced patent applications are incorporated by reference herein in their entirety and for all purposes.

TECHNICAL FIELD

The present invention relates generally to gaming machines and systems, and more specifically to mobile gaming systems and devices.

BACKGROUND

Gaming is an increasingly popular industry, with casinos and other gaming establishments continually seeking new and exciting ways to present games for play. Many games are generally presented on large free-standing gaming devices, such as the well known slot machines, video poker machines and the like. Other games can be presented at something other than a gaming device, such as the table games of craps, blackjack and roulette. In addition, games such as keno and bingo may be played in areas specially configured to present the game to players (e.g., at areas where personnel pick up keno cards and called numbers are displayed on large displays).

A substantial disadvantage to the way such games are currently presented is that a player may participate in a particular game only at certain specified locations and/or on specific gaming machines or tables. For example, in order to play video poker or a particular slots game, such as "Red White and Blue," a player may be required to travel through a large hotel and/or casino to a specific gaming area where an actual video poker or "Red White and Blue" gaming machine is located.

Casinos and other gaming operators generally desire to provide to their customers greater accessibility to gaming devices and the opportunity to play games, however, such that improved availability and convenience in gaming is desired. To this end parent U.S. Pat. No. 6,628,939 and patent application Ser. Nos. 10/672,307 and 10/871,876 address systems and methods for providing games on a wireless game player, such as a hand-held "Personal Gaming Device" ("PGD"). Of course, added issues can arise whenever players are permitted to engage in gaming events from mobile and/or remote locations, such as through the use of such a PGD. Security for any casino owned PGDs, increased fraud prevention, flexibility in PGD use, and player authentication and verification are only a few examples of such added issues.

While existing systems and methods for providing mobile gaming devices and appropriate supporting gaming systems have been adequate, improvements are usually welcomed and encouraged. In light of the foregoing, it is desirable to develop more detailed methods and systems that provide for improved functionality in mobile gaming involving PGDs, and in particular for such methods and systems to include enhanced security and player authentication features while remaining at similar or better levels of flexibility.

SUMMARY

It is an advantage of the present invention to provide improved mobile gaming systems and methods. This is accomplished in many embodiments by providing within or about a gaming machine or system support for at least one mobile gaming unit or PGD. According to many embodiments of the present invention, the disclosed systems and methods can involve the use of a PGD, a gaming machine and/or a gaming system adapted for accepting a wager, playing a game based on the wager and granting a payout based on the result of the game. The present invention also involves various methods of presenting a game to a player via the PGD, reconciling game results, verifying a PGD for use, authorizing a particular player and/or area of use, and controlling gaming application use on the PGD, among others.

In one or more embodiments, the PGD can include a display screen, a processing unit including a processor and a memory, and a wireless communication interface associated with the processing unit. The wireless communication interface is adapted to receive data and provide it to the processing unit, and is also adapted to transmit data provided by the processing unit. In one or more embodiments, the received information comprises game data generated at a remote location that is used by the gaming device to present a game to the player. In some embodiments, the PGD can be an item that is owned and provided by the casino or gaming establishment, while other embodiments can include the use of a player owned device as the PGD. Further embodiments to a gaming system involving a combination of casino or establishment owned PGDs and player owned PGDs are also provided.

In some embodiments, the PGD is a hand-held device having a body that houses the processing unit and other electronics. The PGD may include a card reader for reading a magnetic stripe card, a smart card, or other source of encoded information, such as credit card information. The PGD may also include a speaker for outputting sound to a player. In one embodiment, the PGD is detachable from or operable independent of remote devices or networks. In other words, a network connection may or may not be present or be required when the PGD is being operated. In one embodiment, data may, instead of or in addition to being transmitted via the wireless communication interface, be transmitted and/or received through another type of communication interface, such as a cabled RS-232, USB or IEEE-1394 connection, or an infrared transmitter/receiver. The PGD preferably includes means for a player to provide play input. In one embodiment, the display may be touch-sensitive, such as through a touch screen. The PGD may also include buttons or include a microphone for accepting voice input.

In one embodiment, the PGD is associated with a gaming system including a game data server. The processing unit receives game data from a remote location, such as the game data server, via the wireless communication interface and utilizes the game data to present a game to the player, including presenting game video information on the display. In one embodiment, the gaming device includes a player input and the processing unit transmits said input to a remote location via the wireless communication interface. In one embodiment, a PGD interface serves as an interface between the PGD and one or more devices, including the game data server. The PGD interface may also be associated with other networks and devices, including an Internet gateway, a hotel reservation system, a funds transaction network, or other networks and devices. In this manner, a player may use the PGD to gain access to services, browse the Internet, and engage in other activities or obtain information than simply playing a game.

In various embodiments, if a player wishes to play a game on the PGD, the player is required to place a bet or ante to participate in a game involving potential winnings (i.e. a casino-type game or wagering game). In that event, a player provides credit, such as by swiping a credit card or a player tracking card associated with a player financial account. Credit may also be transferred through other means, such as from an associated free-standing gaming machine having existing credit thereupon. If the player credit is verified, then the player is permitted to play a game or games on the PGD, as selected by the player. The game server generates game data regarding the game to be played, such as video and sound data. This information is transmitted to the PGD, where game video and sound are presented to the player. As necessary, a player may provide input regarding player decisions relating to the game, such as via a touch-sensitive screen or button(s).

In some embodiments, the PGD stores resident game code. This game code is useful in presenting a game, but alone may be incapable of presenting a game. In such instances, a game server can be configured to generate information regarding game results. The game results data is provided to the PGD and used with the resident game code to present a game. In one embodiment, such game result data or information comprises numerical data generated at least in part by one or more pseudo random number generators. The game results data or information may also include paytable or other such data as required to enable the process. In one embodiment, a player may "pre-purchase" game play. In this embodiment, a player provides payment for wagers. The amount of the payment, coupled with the size of the wager for each game, determines the number of games the player may play. The game server is configured to generate game results data for the number of games the player has paid for. The game results data may be transmitted to the PGD via a wireless communication link. In another embodiment, the game results data is stored on a portable storage device such as a smart card or portable memory module that is capable of being read by the PGD.

One embodiment of the invention comprises a method of activating a PGD. Activation information is generated at a first location, such as by a game server. This activation information is transmitted, such as via a network of wireless transmitters. If the PGD detects the activation information, the PGD is activated, and if not, the device is or remains deactivated. In one embodiment, the activation information is either transmitted at intervals, or is transmitted continuously and confirmed at various intervals. In another aspect of the present invention, a game device is provided for selective display of a pre-purchased game of chance. The game device includes a communication interface adapted to communicate with a central gaming system to selectively receive gaming data controlling the play and outcome of the pre-purchased game of chance, generated at a first time. The unit includes a display screen, one or more input mechanisms, and a microprocessor device. This processor is configured to: 1) commence play, selectively activated by operation of the one or more input mechanisms, of the pre-purchased game of chance using the gaming data at a selected second time after the first time; and 2) selectively display on the display screen the generated outcome of the game of chance.

Accordingly, in this aspect of the present invention, one or more games of chance are pre-purchased and pre-executed on the central gaming system (e.g., a backend server), at the first time, the play and outcome of which can subsequently played and viewed on the remote gaming device at a second time, after the first time. The pre-purchased games of chance, thus, are fully executed in a secure gaming environment or system (e.g., a central gaming system), and then transferred, in the form of pre-viewed gaming data, to the PGD for a complete replay execution of the play and outcome of the games of chance at the leisure of the player on the PGD. In essence, the play and outcome of the pre-purchased games of chance are "known" and ratified at the server side prior to play and viewing on the PGD. Once the pre-viewed gaming data is transferred to the PGD, this gaming device is simply applied, possibly remotely, to view the play and outcomes of the games of chance.

According to some embodiments, a video clip (or clips) of the gaming play and outcome is transferred or downloaded to the PGD or other mobile gaming device from the server for time-shifted replay thereof at the second time. Under such embodiments, the PGD is essentially relegated to a viewing mechanism that eliminates any player input, other than perhaps just pressing a button to enable one to view what happens in the next 'frame sequence' of the video clip.

In another specific embodiment, a method for executing pre-purchased gaming play for a portable PGD is provided including selectively generating pre-viewed gaming data, on a central gaming system, representing the play and outcome of one or more pre-purchased games of chance, the last game of which is generated at a first time. Next, selectively communicating the pre-viewed gaming data from the central gaming system to the gaming device; and reconciling post-viewed gaming data from the gaming device, viewed at a time-shifted second time after the first time, with the central gaming system for authentication of the post-viewed gaming data.

In one specific embodiment, the selectively communicating event includes communicating the pre-viewed gaming data through a removable communication interface adapted for communication between the central gaming system and the gaming device. The selectively communicating event further includes storing, via a reader device, the pre-viewed gaming data onto a storage unit of the removable communication interface, and the reconciling post-viewed gaming data event includes retrieving, via the reader device, the post-viewed gaming data from the storage unit of the removable communication interface. In one configuration, the communication interface can include a removable peripheral and/or storage device adapted for selective communication between the PGD and the central gaming system. The removable peripheral is adapted to transfer at least a portion of the gaming data therebetween to effect the play and outcome of the game of chance. Further, the removable peripheral/storage device can be a smartcard, an E-key dongle, a memory stick, and/or a Secure Digital card, among other items.

In yet another specific embodiment, a method for executing gaming play on a remote gaming device including selectively receiving pre-viewed gaming data on the gaming device. The pre-viewed gaming data being executed on central gaming system, and representing one or more pre-purchased games of chance, the last game of which is executed at a first time. The method further includes receiving input instructions, from one or more input mechanisms of the gaming device, to commence play of the pre-viewed gaming data. This data represents the play and outcome of the one or more pre-purchased games of chance executed by the central gaming system. Finally, the method includes displaying the play and outcome of the one or more pre-purchased games of chance on a display screen of the gaming device, at a second time after the first time, wherein the pre-viewed gaming data thereafter constituting post-viewed gaming data.

Various embodiments of the invention comprise methods for verifying the PGD for use and for reconciling game outcomes. In various embodiments, biometric information such as a player fingerprint is read at the personal gaming device and used to verify the entitlement of the player to financial transactions and/or entitlement to play a game. In one embodiment, the outcomes of games played at the PGD are transmitted to a game or financial server. These actual outcomes are reconciled against the outcomes as determined from the generated game results data. The reconciliation step confirms the player loss or win associated with the play of the game or games.

In still further embodiments, a game server configured to generate game seeds having data regarding predetermined game outcomes for each of a number of wager based games can be included as part of an overall gaming system. Such a game server can also be configured to transmit game seeds to a storage device for use by a personal gaming device during future game play thereupon. An authentication server in communication with said game server can be configured to establish a virtual leash with a personal gaming device, with such a virtual leash being adapted to authenticate or verify a user of the personal gaming device, a location of the personal gaming device, or both. In addition, a relevant hand-held personal gaming device can also include a memory containing at least one command download of computer code to be executed by a processor of the personal gaming device. Such a command download of computer code can include enough code for the personal gaming device to process and display independently a game play at a display of the personal gaming device based on a game seed.

In one or more of the foregoing embodiments, a virtual leash can be used to verify or authenticate a number of items, such as a proper player, a proper location for a respective personal gaming device, and others. A repeated checking of such one or more items can be performed, whereby wager based gaming at the personal gaming device is suspended or terminated if such items cannot be authenticated or verified on a repeated basis. Such repeated checking can be considered a "heartbeat," with system alerts, alarms, player warnings and/or termination or suspension of a gaming session taking place depending upon the nature of a heartbeat violation.

Other methods, features and advantages of the invention will be or will become apparent to one of skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for mobile gaming through the use of a PGD. These drawings in no way limit any changes in form and detail that may be made to the invention by one skilled in the art without departing from the spirit and scope of the invention.

DETAILED DESCRIPTION

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

In general, the present invention comprises a PGD that is adapted to present a game for play by a player. In a preferred embodiment of the invention, at least one game comprises a game of chance, and more particularly, such a game requiring that a player place a monetary wager in order to be entitled to play the game, whereupon one or more game outcomes can result in a monetary or other award being granted to the player. In one or more embodiments, the PGD is associated with a gaming machine, gaming server and/or gaming network as part of an overall gaming system, as set forth below. The following detailed description then provides for three basic types of PGD processes. First various serial PGD processes are described, after which alternative video clip based PGD processes are discussed, followed by various command download PGD processes, including those involving game "seeds." Finally, functionalities that can be used with any of the serial, video clip or command download process types are given. Such functionalities include the use a virtual leash to restrict a PGD to a particular player and/or location, as well as specialized free standing gaming machines that operate as PGD docking stations.

Personal Gaming Devices

Figure 1:
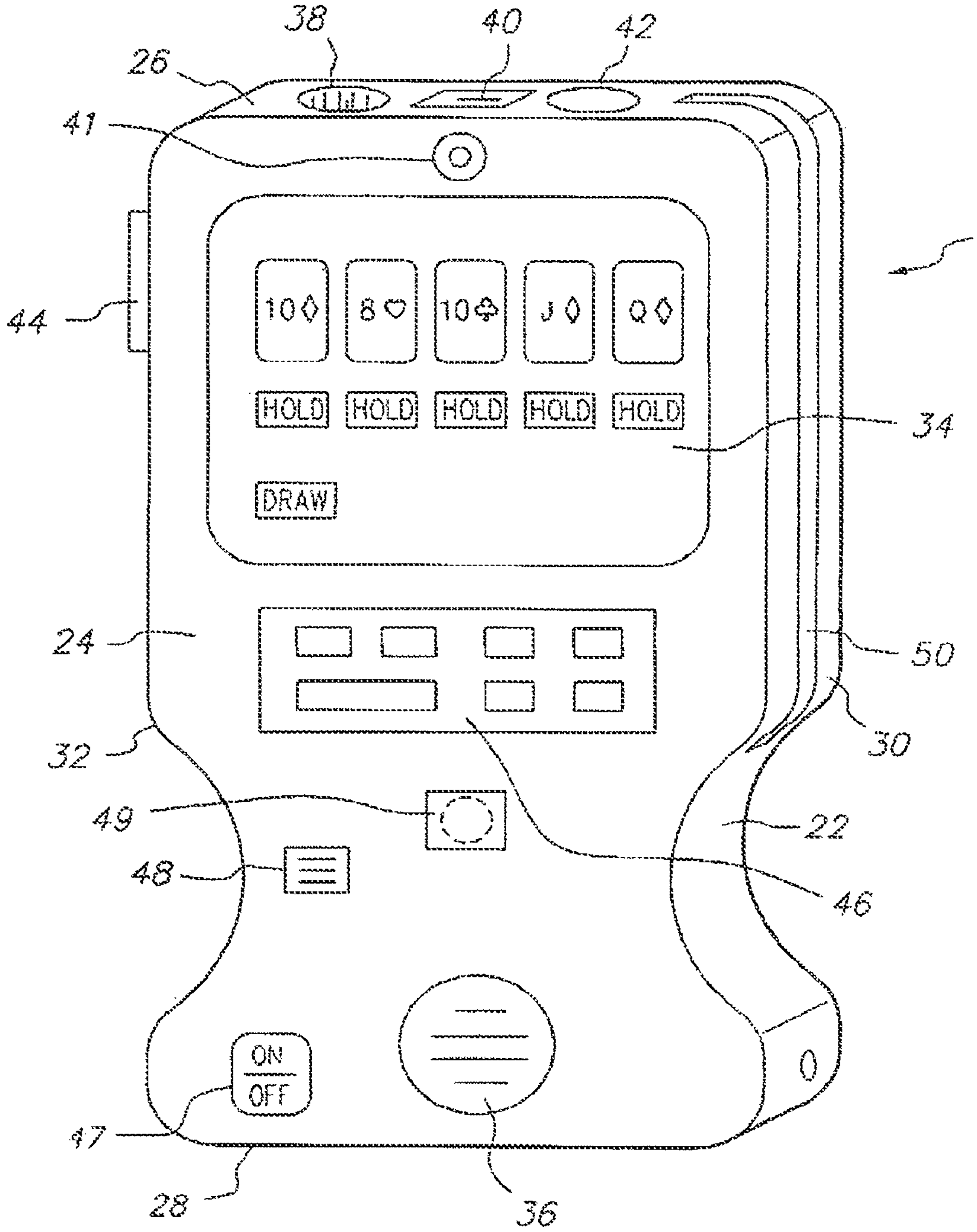
FIG. 1 is a perspective view of an exemplary PGD in accordance with an embodiment of the invention.

FIG. 1 illustrates an exemplary personal gaming device ("PGD") 20 in accordance with one embodiment of the invention. In general, the PGD 20 includes a body or housing 22. The body 22 may be constructed from a wide variety of materials and in a wide variety of shapes. In one embodiment, the body 22 is constructed from one or more molded polypropylene or other plastic components. The body 22 may be constructed of metal or a wide variety of other materials. As illustrated, the body 22 is generally rectangular in shape, having a front side or face 24, a rear side or face (not visible), a top end 26, a bottom end 28, a first side 30 and a second side 32. Preferably, the body 22 defines an enclosed interior space (not shown) in which a variety of components are located.

In a preferred embodiment, the PGD 20 is adapted to present video and sound game data to a player. As illustrated, the PGD 20 includes a display 34. The display is located in the front face 24 of the body 22, thus facing upwardly towards a player. In a preferred embodiment, the display 34 comprises a liquid crystal display ("LCD"), and in particular, an LCD permitting touch-screen input. It will be appreciated that other types of displays may be provided. PGD 20 also includes a sound generating device in the form of at least one speaker 36. In one embodiment, the speaker 36 is positioned beneath a top or cover portion of the body 22 having one or more perforations or apertures therein through which the sound may readily travel. As illustrated, the speaker 36 is located near the bottom end 28 of the body 22, generally opposite the display 34. It will be appreciated that the speaker 36 or additional speakers may be provided in a wide variety of locations, such as at one or both sides 30, 32 of the body 22.

In a preferred embodiment, the PGD 20 is adapted to send and/or receive data from another device. As such, the PGD 20 includes one or more data input and/or output devices or interfaces. In one embodiment, the PGD 20 includes an RS-232 data port 38 for transmitting and accepting data, such as through a cable extending between the PGD 20 and another device, such as a computer. In one embodiment, the PGD 20 includes a USB data port 40 for transmitting and accepting data, also through a cable. In one embodiment, the PGD 20 includes an infrared data transmitter/receiver 42 for transmitting information in wireless, infrared light form.

In a preferred embodiment, the PGD 20 includes another wireless communication device 44, such as a wireless communication device/interface operating at radio frequency, such as in accordance with the IEEE-802.1x or the Bluetooth™ standard.

Preferably, a player is permitted to provide input to the PGD 20, such as for playing a game. As stated above, one means of input may be through the display 34. The display 34 may also be arranged to accept input via a stylus or other device. In one embodiment, the PGD 20 includes a keypad 46. In one or more embodiments, the keypad 46 is a sealed keypad having one or more keys or buttons which may be activated by a player, such as by depressing the button with their finger. The PGD 20 can include a microphone 48 arranged to accept voice input from a player. Other input devices may alternatively be provided or be provided in addition to those input devices described. For example, a player may be permitted to provide input through a joystick (not shown). The joystick may comprise a control element associated directly with the body 22 of the PGD 20. Alternatively, the joystick may be separate from the PGD 20, and then be placed in communication therewith, such as by plugging in the joystick to a data port of PGD 20. A smart card reader, optical reader or other input device may be provided for reading information from another element, such as a card, ticket or the like. PGD may also include a keyboard or mouse.

In one embodiment, the PGD 20 includes an image collection device 41, such as a camera. The image collection device 41 may be used, for example, to capture the image of a user or player of the PGD 20. This image information may be used for security or authentication purposes, as set forth in greater detail below. The PGD 20 may also include a fingerprint scanner 49. In one embodiment, as illustrated, the fingerprint scanner 49 may be located behind or beneath a user input button, such as a "spin" or "draw" button. In this manner, a player's fingerprint may be obtained without the user or player having to consciously participate. As described below, a player's scanned fingerprint information may be used for authentication purposes. Such a scanning device may be similar to that offered by AuthenTec, Inc. of Melbourne, Fla. The PGD 20 may include a card reader 50. As illustrated, the card reader 50 is located in a side 30 of the body 22 of the PGD 20. In a preferred embodiment, the card reader 50 comprises a magnetic stripe reader for reading information from a magnetic stripe of a card. The card reader may also be adapted to write or store data to a smart card or portable memory module.

As illustrated, the card reader 50 includes a slot that is positioned in the side 30 of the PGD 20. The PGD 20 may be battery-powered, such as with a rechargeable battery pack. An ON/OFF button 47 may be provided for controlling the power to the PGD 20. As set forth in greater detail below, the PGD 20 may be docked at or otherwise associated with a free-standing gaming machine or other gaming device. At such times that the PGD 20 is docked, the internal battery of the device can be recharged for later use in an undocked or "remote" mode, as will be readily appreciated. Appropriate detection provisions, warnings and safeguards for a low battery status in PGD 20 while in such a remote mode can also be provided.

Figure 2:
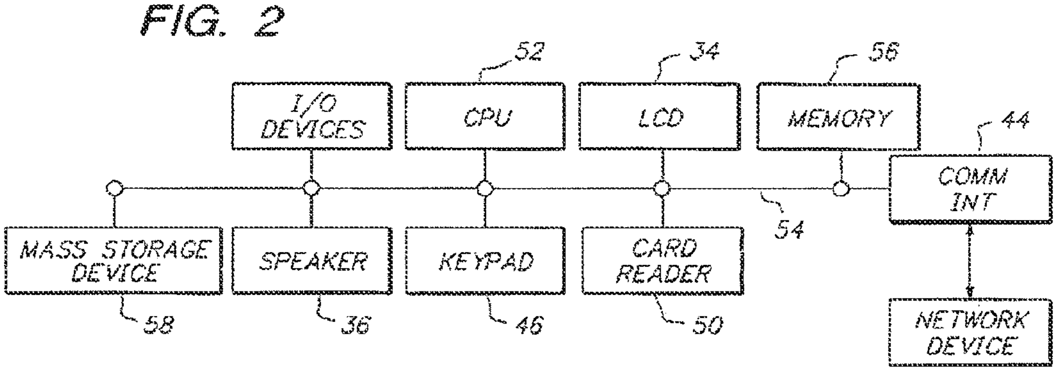
FIG. 2 is a block diagram of an exemplary component arrangement of the PGD illustrated in FIG. 1.

Preferably, PGD 20 includes control means for controlling the operation of the device, including accepting input and providing output. One embodiment of such a control means is illustrated in FIG. 2. As illustrated, PGD 20 preferably includes a computing environment serving as the control means. The computing environment includes a central processing unit 52. The central processing unit 52 preferably comprises a microprocessor, such as those well known and manufactured by such companies as Intel, AMD, Transmeta and Sun Microsystems, Inc. The central processing unit 52 is associated with a bi-directional system bus 54. The system bus 54 may contain, for example, thirty-two address lines for addressing a video memory or main memory. In addition, the system bus 54 preferably includes a thirty-two or sixty-four bit data bus for transferring data between and among components associated with the bus 54. Alternatively, multiplex data/address lines may be used instead of separate data and address lines.

The display 34 is coupled to the bus 54. In one embodiment, a video memory (not shown) is provided in association with the bus 54. The video memory may be dual-ported video random access memory. The video memory is preferably coupled to and arranged to drive the LCD display 34. Of course, the video memory might be coupled to a CRT or other suitable display device. A memory 56 is associated with the system bus 54. In one embodiment, the memory 56 comprises dynamic random access memory ("DRAM"), synchronous DRAM or other forms of random access memory. The memory 56 may have other forms as well, such as electronically erasable programmable read only memory ("EEPROM"). Preferably, the memory 56 is of the type that permits data to be written thereto and read therefrom. A mass storage device 58 is preferably also accessible via the bus 54. The mass storage device 58 may be of the read-only type (such as a CD or DVD optical drive) or may be of the read-and-write variety such as flash memory, compact flash, or CD/DVD-R/W drives.

As illustrated, the variety of input and output devices can be associated with the system bus 54, and thus the other components associated with the bus. As illustrated, the speaker 36, keypad 46 and card reader 50 are associated with the system bus 54. A variety of data input/output devices ("I/O Devices") may also associated with the system bus 54, such as, though not specifically illustrated, the RS-232 port 38, the USB 40, and the infrared communication transmitter/receiver 42. As will be appreciated, these devices/elements may operate in accordance with different protocols and have different architectures, and have appropriate interfaces provided for communicating with the system bus 54. For example, the infrared transmitter/receiver may have different layers, including a physical layer including the light-emitting device, and link and other layers which include software and/or hardware, as is known. A variety of other input/output devices may be associated with the PGD 20, as now known or later developed.

Preferably, as stated above, the PGD 20 includes a wireless, radio frequency, communication interface operating in accordance with the IEEE 802.1x or Bluetooth™ standards. The architectures/protocols of such wireless communication interfaces are well known and thus will not be described in detail herein. In general, however, such an interface 44 permits two-way data communication. As described in detail, the PGD 20 may be permitted to communicate with a wide variety of devices/systems, including at least one device associated with a gaming network. In accordance with the invention, the PGD 20 can send data and receive data, including program code, through the communication interface 44 (or the other input/output devices, such as the infrared transmitter/receiver). As one example described in more detail below, a gaming server may transmit requested code for an application via a transceiver to the communication interface 44 of the PGD 20. The received code may be executed by the central processing unit 52 as it is received and/or be stored in the memory 56 for later execution. In one embodiment, the PGD 20 may include a mass data storage device (not shown) such as a hard drive, CD-ROM or the like. In one or more embodiments, the memory 56 may comprise a smart card or similar easily removable (and replaceable) device. In such event, data, such as operating code, may be associated with the PGD 20 via a CD-ROM placed in a CD-ROM drive or by insertion of a coded smart card or portable memory module.

Although the foregoing exemplary PGD 20 is fairly specific with respect to many details, it will be readily appreciated that a wide variety of similarly suitable devices can also be used as a PGD. Other exemplary PGDs and features thereof are provided in commonly owned U.S. Pat. No. 6,846,238, issued to Wells and entitled "Wireless Game Player," which is incorporated herein by reference in its entirety and for all purposes. Additional features and applications for a suitable PGD can also be found in commonly owned U.S. patent application Ser. No. 10/937,990 by Nguyen, et al., entitled "Apparatus and Methods for Wireless Gaming Communications," which is also incorporated herein by reference in its entirety and for all purposes. It will be appreciated that not all items and features of the above and incorporated PGDs may be required for a given PGD or associated system, and that other items and features not disclosed may also be included. In some cases, a PGD can be provided by the casino or gaming operator, such as through sales, rentals or checkout procedures, while in other instances, a suitable PGD can be an outside device that is provided by the player or another third party. Such a privately owned outside PGD can be, for example, a personal desk assistant ("PDA"), laptop, iPod®, cell phone, or any other similarly suitable device. As discussed herein, it will be understood that use of the term "PGD" can refer to the exemplary PGD 20 disclosed above, as well as any other suitable device that can serve as a PGD for any purpose of the present invention, and that such a device or devices may or may not be portable or hand-held. Further, while use of the terms "portable" and "mobile" gaming device are used, it is understood that use of other suitable non-portable PGDs may be substituted in relevant instances.

General PGD Gaming Systems

Figure 3:
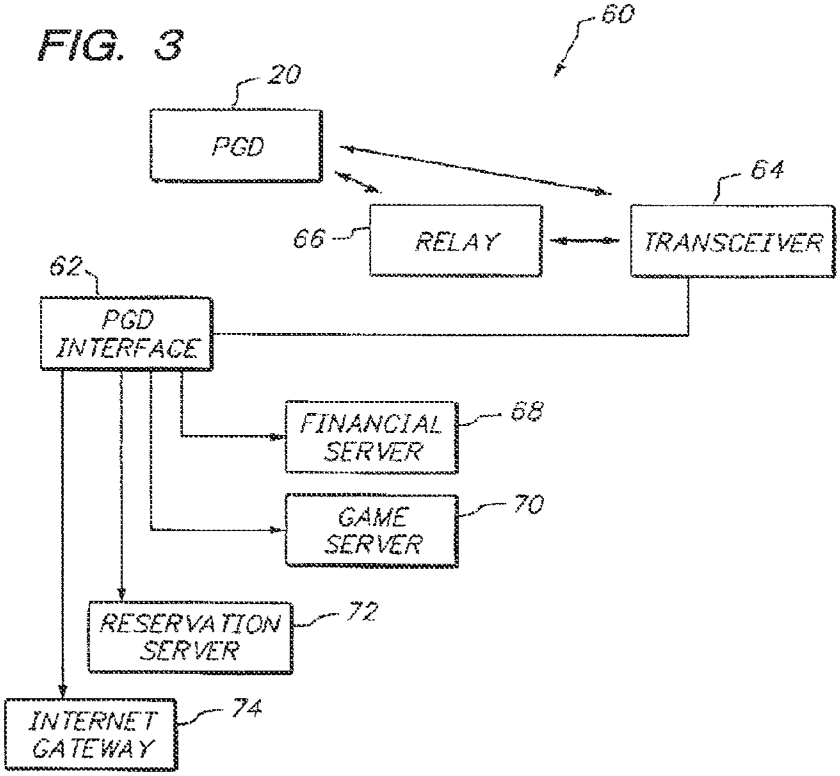
FIG. 3 is a schematic of an exemplary gaming system including a PGD in accordance with the invention.

In one or more embodiments, the PGD 20 is associated with a gaming system. In a preferred embodiment, the PGD 20 is only operable or at least incapable of presenting certain functions or features unless associated with such a system. An exemplary gaming system 60 in accordance with one embodiment of the invention is illustrated in FIG. 3. As illustrated therein, the gaming server 60 includes a personal gaming device interface 62. This PGD interface 62 serves as a gateway to data communications between the PGD 20 and various networks, servers and other devices. In one embodiment, data communications between the PGD 20 and the PGD interface 62 is via a transceiver 64 associated with the PGD interface 62. In general, the transceiver is arranged to receive information from the PGD interface 62 and transmit it to the PGD 20 and/or receive information from the PGD 20. As illustrated, a PGD 20 may communicate directly with the transceiver 64. It will be appreciated, however, that limitations may exist as to the range over which such data can be accurately transmitted. Therefore, in one or more embodiments, one or more relays 66 may be provided for receiving and re-transmitting the data to the appropriate location.

Figure 9:
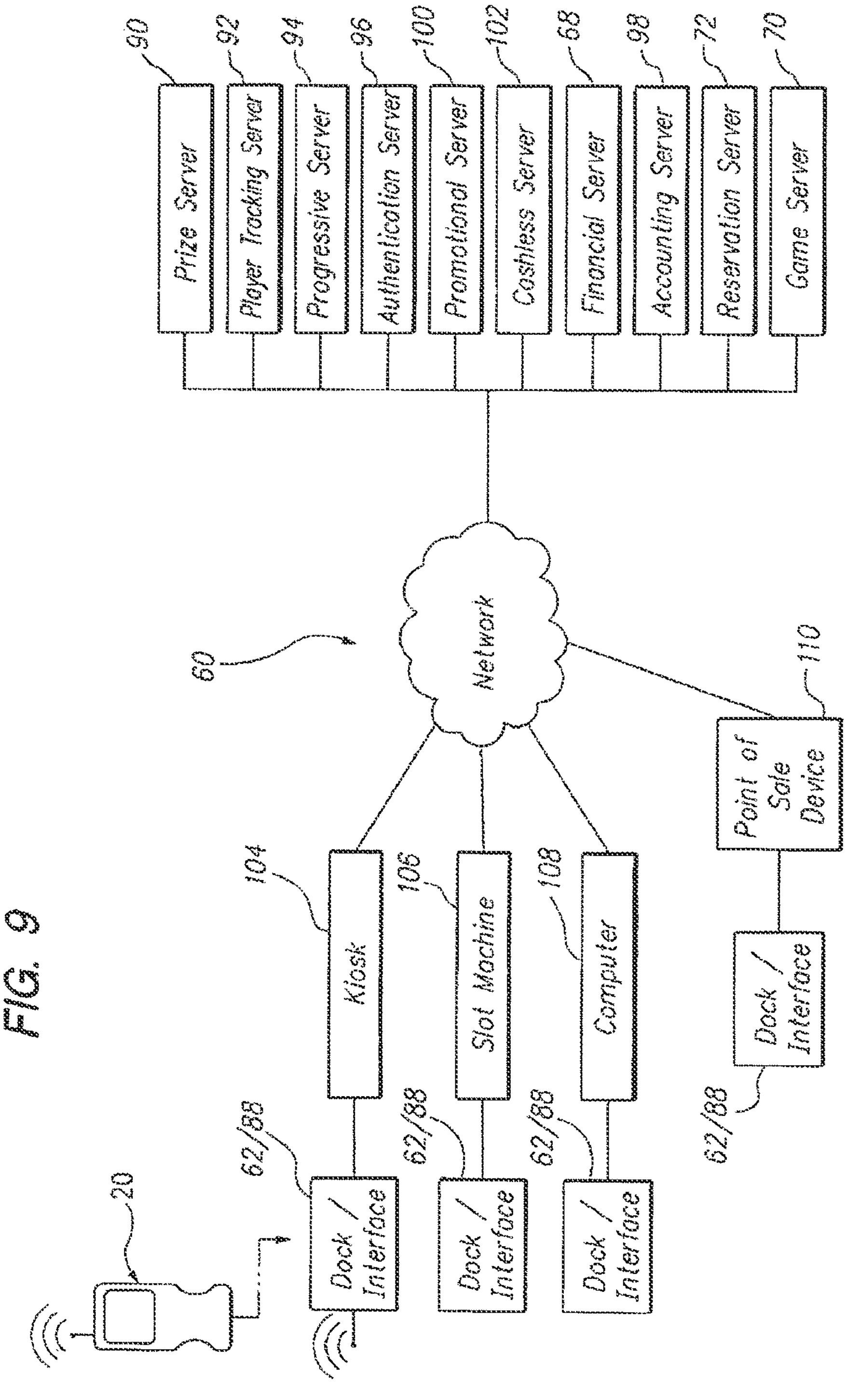
FIG. 9 illustrates yet another embodiment of a system in accordance with another embodiment of the invention.

As stated above, in a preferred embodiment, the PGD interface 62 serves as a gateway or interface between the one or more PGDs 20 and one or more other devices, systems or networks. The interface 62, whether in the form of a wireless interface or a docking station (as described in more detail below), may be associated with or reside in a kiosk, slot or other type of gaming machine, a point of sale device, a personal computer or the like. As illustrated, in one embodiment, the PGD interface 62 is associated with a financial server 68 either via a direct link (as illustrated in FIG. 3) or via a network (as illustrated in FIG. 9). The financial server 68 may be a computer or be associated with a computer having a processing unit and one or more data files. The financial server 68 is preferably arranged to confirm financial transaction data. For example, in order for player to be permitted to play a game using the PGD 20, the player may be required to place a bet. In one embodiment, the bet may be placed using a credit card. In such event, the player may swipe their credit card using the card reader 50 associated with the PGD 20. This data may be transmitted to the financial server 68 for confirmation (and as is known in the art, generation of financial transaction data, such as a transaction date, time and value).

In one embodiment, the system 60 includes a game server 70. As illustrated, the game server 70 is associated with the PGD interface 62, either directly or via a network. In one or more embodiments, the game server 70 is, or is associated with, a computing device, such as a processor adapted to execute game code. Preferably, the game server 70 is arranged to provide game data to the PGD 20 via the interface 62. This game data may comprise video data for generating an image on a display 34 of the PGD 20, and sound data for generating sound emitted by the speaker 36. The game server 70 is preferably also adapted to receive input from a player, such as a player selection during the play of a game. In one embodiment, a reservation server 72 is connected to the PGD interface 62, either directly or via a network. The reservation server 72 may be arranged to accept reservation selections, and provide information regarding available hotel rooms, rates, shows, restaurants and the like for use by a player of the PGD 20 in making a reservation selection.

While the PGD 20 may communicate with other devices via direct network links as illustrated in FIG. 2, the PGD 20 may communicate with a variety of other devices via a network, as illustrated in FIG. 9. For example, the PGD 20 may communicate with a prize server 90, a player tracking server 92, a progressive server 94, an authentication server 96, an accounting server 98, a promotional server 100, and a cashless transaction server 102, among others in addition to the gaming server 70 and financial server 68, via a network. As will be appreciated, such servers can be separate physical devices, or some or all may be integrated onto a single physical device, such as where each "server" comprises one or more programs or modules adapted to control a given function or service type on one comprehensive physical device. Each server may reside in any of a variety of locations, and some servers may reside in locations separate from others. Of course, one typical location can be in a back room or other secured location accessible only to casino personnel. Other possible server locations can include, for example, on a free standing gaming machine itself, on a kiosk, or at a remote location away from the casino or gaming establishment. As set forth below, a PGD 20 may communicate with these other devices via a wireless communication link with the wireless communication interface 62 or, referring to FIG. 8, via a direct connection with a docking station 88. Referring to FIG. 9, the interface 62 and/or docking station 88 may in turn be associated with or integrated into a kiosk 104, a slot or other type of gaming machine 106, a personal computer 108, or a point of sale device 110 or the like. These devices may then be connected to or associated with a network.

In one embodiment, as illustrated in FIG. 2, the PGD interface 70 is connected to an Internet gateway 74. This Internet gateway may comprise a computing device that is coupled to the Internet, such as through an Internet service provider. In one embodiment, as illustrated in FIG. 9, the Internet may comprise or be part of the network that allows the PGD 20 to connect to a variety of other devices, such as the servers. In another embodiment, the network may comprise a dedicated gaming network with which these devices are associated. The PGD interface 62 may be arranged to facilitate communication between devices, systems and networks operating in accordance with differing protocols. For example, the PGD interface 62 may be arranged to communicate with the PGD 20 in accordance with a wireless IEEE 802.1x standard. On the other hand, the PGD interface 62 may be arranged to communicate with the financial, game, reservation and other servers operating in accordance with an IEEE 1394 ("Firewire") protocol, or Ethernet or the like. In addition, the PGD interface 62 may be arranged to communicate with the Internet gateway 74 in accordance with a PPP or SLIP protocol.

As will be appreciated, the data that is transmitted to and from the PGD 20 is preferably provided with an address or other identifier of the intended destination of the information. This address information is used by the PGD interface 62 for directing data received from a PGD 20 to a particular destination, such as the game server 70. Likewise, data which is directed to a PGD 20 preferably has an address associated therewith for identifying the particular intended destination. It will be appreciated that more than one PGD 20 may be associated with the interface 62, such that a unique address or identifier is necessary to properly associate data with its intended destination. In one or more embodiments, the PGD 20 may be programmed with a specific address or other security information, such as a password to prevent association of unauthorized devices with the system 60. In one embodiment, each PGD 20 may implement a data encryption/decryption scheme such as RSA or DSA. Some or all of the information or data that is transmitted to or from the PGD 20 may be encrypted to prevent its interception and use by unauthorized users. The encryption/decryption key(s) may be associated with the PGD 20 with a module or similar removable device. A user may be required to obtain a module in order for the PGD 20 to function.

Various methods of using a personal gaming device such as the PGD 20 illustrated in FIG. 1 will now be described. First, a player obtains a PGD 20. In one arrangement, a casino may allow a player to check out a PGD 20. For example, a casino may have a central desk or station at which a player may obtain a PGD 20. In one embodiment, a player may be required to leave a deposit to check the device out, helping ensure that the player will return the PGD when they are done using it. In some embodiments, a player may be required to rent the device, such as by paying a fee for the time during which the player uses the PGD or has it checked out. As an alternative, a player may also be permitted to purchase a PGD from a casino or other gaming establishment. This option can be particularly useful where players wish to have or own their own PGDs, and where a casino or gaming operator wishes to have a more secure system with only a set kind of PGD and/or PGD programming.

In still other embodiments, a player may be permitted to use his or her own device, such as an outside PDA, laptop, iPod®, cell phone, or other similar device, as noted above. In such instances, a player would be required to provide a separate outside device capable of supporting the necessary system software. The player would then preferably need to go through the process of having one or more system programs downloaded to his or her outside PDA or other device. Having obtained a casino PGD or had his or her own device properly programmed, the player may be able to use the device at a variety of locations, including at a kiosk, slot machine, casino area, personal computer or the like (see FIG. 9). It will be readily appreciated that the process of obtaining a PGD might be applied to any of the three primary types of PGD processes: serial, video clip, and command download.

Process Type I: Serial PGD Processes

Once a player or user has obtained an appropriately programmed PGD, the user may be permitted to engage in one or more activities. In one embodiment, some activities may be presented by the PGD itself. For example, software code may be stored in the memory 56 for execution by the processing unit 52 of the PGD for permitting certain functions, such as the playing of music, display of "how to use" or "help" information and the like. In some embodiments, however, the number of functions that are fully supported by an appropriate PGD are limited. This limits the total amount of memory that the PGD needs to have, which can be advantageous where a particular device is limited with respect to memory. In such circumstances, one or more functions or activities can be supported only by associating the PGD with a gaming system, such as that which is illustrated in FIG. 3.

In one embodiment, when the PGD is turned on, such as with the ON/OFF button 47 of exemplary PGD 20, the PGD is adapted to send a signal to the PGD interface 62 or other device for establishing a communication link. Once this communication link is provided, data may be transmitted to and from the PGD 20 and the other networks/systems/devices. Once a communication link is established, master menu information may be transmitted from the PGD interface 62. For example, casino personnel may generate menu information and load it into a memory associated with the PGD interface 62. Upon a PGD 20 establishing a communication link with the PGD interface 62, the menu information may be transmitted to the PGD 20 for display thereon.

A player may then select one or more activities or functions from the displayed menu. Input may be provided by touching an area of the screen 34 associated with a menu item, providing keypad entry, or in other manners. In one embodiment, a player may be permitted to engage in activities or obtain services at no charge. For example, a player may be permitted to access the Internet using a PGD, such as a casino provided PGD 20, at no charge to the player. The player may also be permitted to obtain show, ticket, hotel, restaurant and other information and place reservations and the like at no charge.

In one or more embodiments, a player is required to pay to engage in one or more activities. In a preferred embodiment, a player is required to place a bet or ante in order to play one or more games. Of course, one or more games may be provided for free. Alternatively, a player may be required to place a bet or ante if the player is to be entitled to an award or winning if the outcome of the game is a winning outcome. In another embodiment, the casino or other party may give away prizes. For example, a player may be permitted to play in one or more complimentary games, with the player being awarded a prize (money, a hotel night stay, free dinner or the like) in the event the player is a winner of the game.

In the event the player is required to place a bet or desires to place a bet, the player may do so in a variety of manners. In one embodiment, the player may provide credit or value using a credit card. As described above, the player may swipe their credit card with the card reader 50. Data read from such a player card may be transmitted from the PGD 20 to a financial server for verification. In another embodiment, a player may place a deposit with the gaming operator and be provided with a player card. For example, if a player checks out a casino owned PGD 20, the player may place a monetary deposit or credit deposit for such a use. The deposit may be associated with a player account and/or a player card. The deposit data may be stored in a master database, with a particular file being assigned an identifier. That identifier may be stored on the player card. Later, the player may swipe their player card. The read identifier may be transmitted and the deposit data obtained from the corresponding file. A variety of other methods may be provided for a player to provide credit or value. For example, a player may be provided with an encoded ticket (bar code or the like), smart card or other element having data that provides verification of a player credit or payment. Similar methods may be used where the player uses his or her own separately owned PGD, such as through downloaded financial programs relating to credit accounts, as will be readily appreciated.

In one embodiment, the player may select the amount of the bet or ante by providing input to the PGD 20. For example, once a player has selected a game for play, a gaming server may transmit bet screen data. The bet screen may indicate to a player that the player may bet anywhere from 1 to 5 credits, each credit having a value (such as $0.25 US, $1.00 US or the like). The player may select the desired bet. Upon receiving the data, the game server may instruct the player to provide the necessary credit, such as by swiping the credit card. In one embodiment, a player may create a bank of credits from which the player may place bets. For example, a player may be permitted to place a large deposit with the operator or may use their credit card to create a large deposit. This deposit may be associated with an account of the player. The total credit of the player may be displayed by the PGD. Such an arrangement may be similar to that of current gaming machines were a player may provide a $20 bill to generate 20 $1 credits, with the number of credits indicated to the player. Once verification has been provided of the player bet or ante, the player may be permitted to play the game. In a preferred embodiment, the game data is generated by the game server 70 and transmitted to the PGD. FIG. 1 illustrates an embodiment of an exemplary PGD 20 that is displaying a screen of a game of video poker, the screen displaying cards and instructions to the player. The player may provide input to the game server 70 as necessary. In one embodiment, a player may be permitted to raise their bet or ante, or otherwise place other bets, during the course of the game. In such event, the player may provide credit as described above.

Depending on the outcome of the game, an award or winning may be provided to the player. In one embodiment, a winning is associated with an account of the player or may be credited to the credit card account of the player. In another embodiment, the PGD 20 may include a ticket printer or other device for issuing an element having the value associated therewith (or at least data regarding the value the player won). At the end of a game or group of games, the result(s) are uploaded to the accounting server (if a communication link is present), or stored in a secure memory for later upload and reconciliation (if a communication link between the PGD and the accounting server is not present). A player may play any number of games, switch to other activities, or return the PGD 20 at any time.

In one or more embodiments, means may be provided for ensuring that the PGDs 20 are returned and not stolen. First, in one embodiment, the PGDs 20 may be restricted to use in a particular area. For example, use of the devices may be permitted only in a particular game room. By monitoring the exits, the theft or loss of the PGDs 20 may be controlled. In another embodiment, a "fence" may be created which, if the PGD 20 is crossed over, results in one or more security measures being activated. The fence may comprise one or more emitters that emit a signal detectable in a restricted area by the PGD 20. Upon detecting the signal, the PGD 20 may be arranged to generate a loud audible signal (such as by speaker 36) warning that the PGD 20 is being removed from the authorized area. The PGD 20 may also be arranged to display a warning message to a player. In one embodiment, a memory of the PGD 20 may be erased, preventing further use of the device (without returning it back to the gaming operator for resetting the device) and protecting the gaming operator by preventing the player from obtaining any critical information which would otherwise be associated with the device. In another embodiment, operation of the PGD 20 is simply disabled when a network or communication connection is not present. In this manner, the PGD 20 is operable only within a limited, defined perimeter. Further details of these embodiments are provided in greater detail below.

In this regard, one advantage of some embodiments of the PGD 20 is that it may be configured so that gaming code is not stored or resident at the PGD 20, except during use. In particular, gaming code that is utilized to present and play the game can be stored remotely, such as at the game server 70. The game data may be transferred to the PGD 20 only upon authorization for presenting a game. Therefore, even theft of the device would not result in the thief obtaining proprietary, important game code in such embodiments. Of course, other embodiments may include times where game code, portions of game code and/or other pertinent system programs can remain stored on the PGD, particularly where theft or inspection of such code, programs, or portions thereof would not be particularly troublesome to the gaming operator. For example, portions of code that simply instruct the PGD on how to display a certain type of game, but do contain any random number generator ("RNG") functionality, other game result program code, or other sensitive proprietary code may be better off being left on a PGD for future use, so as to minimize the amount of downloading that is required for a given game or gaming session.

In one or more embodiments of the invention, the PGD 20 may be "customized" for a particular player. In one embodiment, a player may create a player account. This account may not only include credit information, but may include player preference information. For example, a player may designate that they prefer to play a particular game and place bets in a particular denomination. These preferences may be indicated by a player on a sign-up sheet that is then used to create the account, or by input to a program interface that players may use to generate their accounts. The PGD 20 may be customized in other manners. For example, the PGD may be configured to display information via a graphical user interface. The color(s) of elements of the interface may be personalized. In addition, menus, "button" layout and the like may also be customized. In one embodiment, the player preferences may also be stored on a player card or other portable input device.

For example, at the time a player creates a player account, they may input their preferences. These preferences may be stored on a portable card. The player may use the PGD 20 to read the personal information and configure itself accordingly. In one embodiment, the player is issued a player card that includes information regarding his or her player account. When the player swipes their player card using the card reader 50 of the PGD 20, information may be provided regarding the player account, such as the account number. The player account may then be accessed and the information therein be used to personalize the PGD 20. For example, the player account information may be used by the PGD interface 62 to generate a personalized menu for display, or to automatically present the favorite game of the player as customized with the default bet of the player.

Additional embodiments of the invention will be described with reference to FIGS. 4-7. These figures illustrate an embodiment of a method of presenting a game using a gaming device, such as the PGD 20 described above. Various other features of the invention are illustrated therein and will be described below in conjunction with this method, it being understood that the features may be implemented alone or other combinations and method of use. Although the various method steps disclosed are presented in a certain order, it will be appreciated that other orders are also possible or even preferable. For example, while it is disclosed that a player may purchase credits and then the identity of the player is verified and/or authenticated, a reverse order of these steps may be preferable in some cases.

Figure 4:
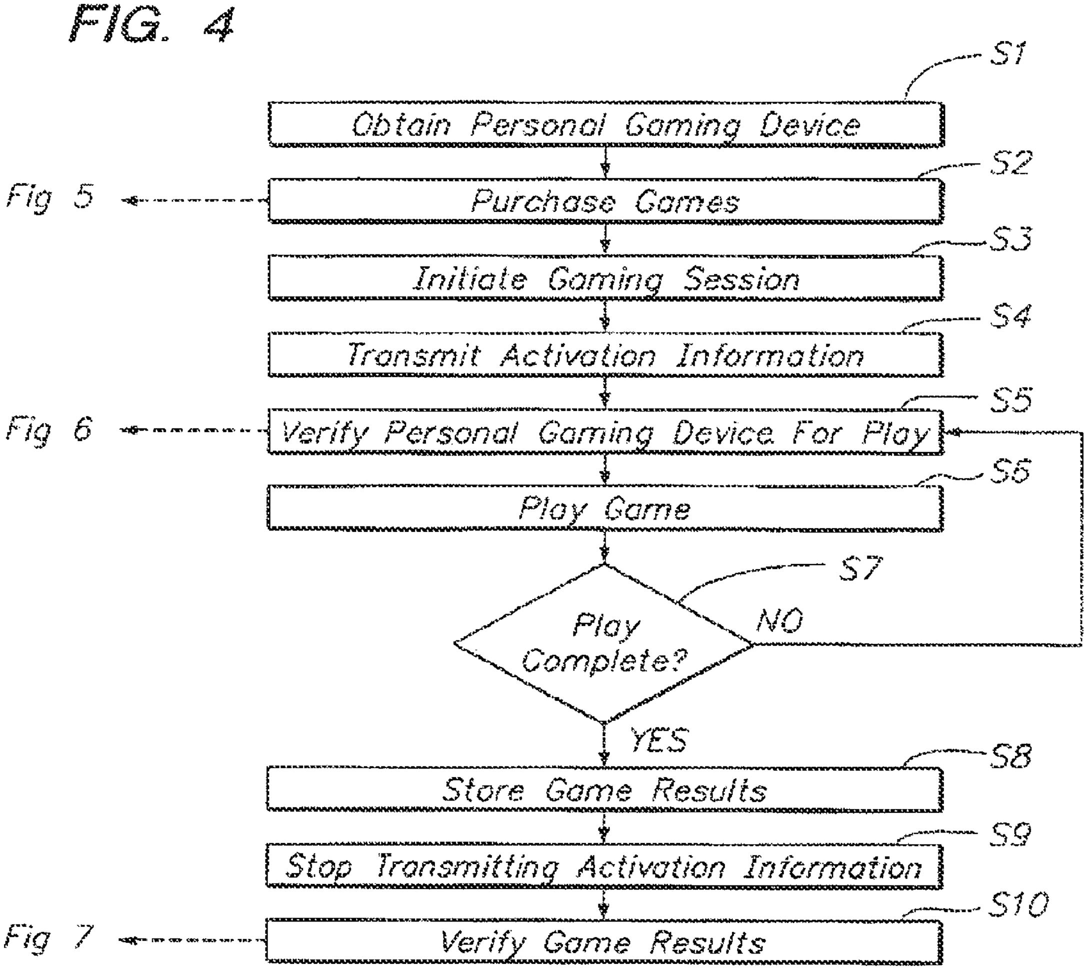
FIG. 4 is a flowchart illustrating an exemplary method of presenting a game with a PGD in accordance with one embodiment of the invention.

FIG. 4 illustrates one method of presenting a game in accordance with the invention. As indicated, the method may be implemented via a system 60 such as that described above, the system including one or more PGDs 20. As illustrated, a method of the invention starts with a step S1 in which a player obtains a gaming device. The gaming device may be of a variety of types, such as the PGD 20 as described above, a PDA, laptop, cell phone or other suitable electronic device. The device may or may not be portable, and may be located remote from other devices of the system. In addition, the PGD may be one that is provided by or purchased from the casino or other gaming operator. Alternatively, the PGD may be one that is from outside the system ordinarily, such as one that is owned and provided by the player. Third party providers of suitable PGDs may also be an alternative in some instances.

Figure 5:
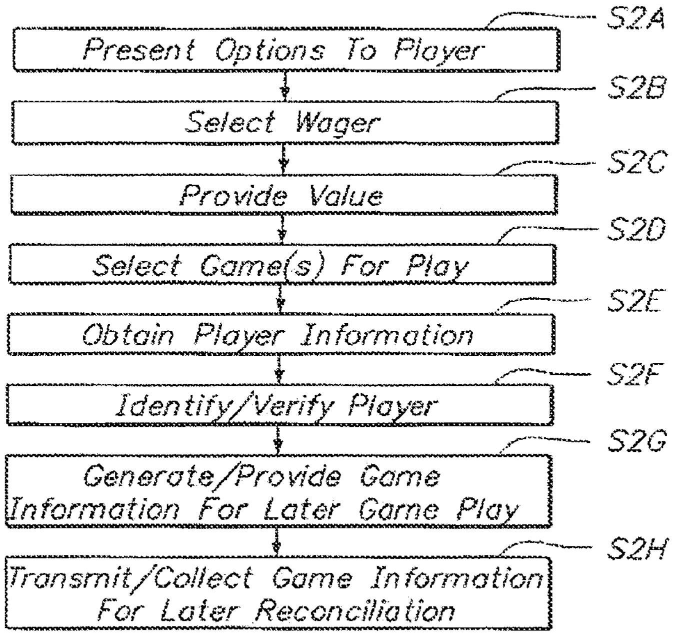
FIG. 5 is a flowchart illustrating an exemplary method of purchasing games for play on a PGD.

In a step S2, a player purchases or otherwise obtains the right to play one or more games. One such method will be described in detail with reference to FIG. 5. As illustrated in FIG. 5, in a step S2A, the player is preferably presented with at least the option to purchase one or more game play events. As illustrated, the player may also be presented with a variety of other options, such as options relating to a player account. As described above, a player may have an account that the player uses to provide value, such as for purchasing games or placing wagers. The account may be associated with a bank or other financial entity, or may be associated with the casino or game presenter. In the embodiment illustrated, the player is presented the option to (a) reconcile an account; (b) purchase games; (c) review or make an inquiry regarding an account; (d) withdraw cash or (e) deposit cash. Options (a) and (c)-(e) will not be described in detail herein, as they may be implemented in a variety of fashions. These options may, however, be associated with various methods permitting a user to access an account, make deposits, make withdrawals, obtain account information and the like.

If the player selects option (b), then in a Step S2B, the player is permitted to purchase one or more games or game events. This function may be accomplished in a variety of manners. In one embodiment, this selection causes the PGD 20 to connect to the game server 70. Preferably, the player then selects or inputs the amount to be wagered. For example, the player may elect to play $100.00 worth of games. In a step S2C, the player provides value representing the amount the player has elected to wager. As described above, a player may use a credit card to provide this payment. If the PGD 20 is so configured, such as by including a bill validator or coin acceptor, the player may also use currency. In one embodiment, the player may utilize a player financial account established with a casino or other game provider. The provided value may comprise other than monetary value, such as player points or other indicia which the game provider will accept.

In a step S2D, the player selects one or more games to play. In one embodiment, the player may be presented with a menu of games to select from. A player may select a single game or multiple games for play. In one embodiment, the player may be provided with information regarding the number of games to be played in relation to the amount bet. For example, a player may elect to wager $100.00 playing games of video poker. The player may then be requested to indicate how much they wish to wager on each particular game. For example, the player may be required to indicate whether they wish to wager $0.25 or $1.00 per game, or a default bet may apply to one or more of the games. If the player selects or the default bet is $1.00 per game and the player has wagered $100.00, then the game server may indicate to the player that they are entitled to play 100 games of video poker.

It will be appreciated that the general purpose of the above-described steps is to define the number of games that the player wishes to play and has provided a wager or payment to play. As described, the number of games may vary dependent upon a number of factors, including the total amount the player wishes to wager and the amount of the wager per game or cost to play each game. Thus, the steps may vary depending on various factors. For example, game play packages may be offered for player selection. A game play package might comprise the option to play 25 video poker games at $1.00 per game for a certain wager, such as $25.00, or even at a discount. In this example, the player may only need to select one of the game play packages and provide the appropriate wager.

Next, the identity of the player and/or the right of the player to play the game may be verified. In one embodiment, in a step S2E, certain information regarding the player is obtained. As illustrated, this information comprises biometric information, such as a fingerprint of the player. In a step S2F, the collected information is used to identify the player and/or verify their entitlement to play the games. In one embodiment, this comprises comparing the collected biometric information with stored biometric information. For example, when a player sets up his or her financial account with the casino, or in order to check out a PGD 20, the player may be required to provide biometric information. This information is stored for use in the verification process. It will be appreciated that other information may be used to identify the player and/or verify entitlement to play a game. For example, verification may be accomplished through use of identifiers such as passwords or the like. Other biometrics may be used, such as a retina scan, facial features (such as via capture of the player image with the camera 41), or via other authentication.

In one embodiment, the verification step includes verifying that the player is of legal age to play the game. In one embodiment, only players whose age has been verified are allowed to set up an account or obtain or play on a PGD 20. In this configuration, verification is assured once the biometric information of a player matches that which is on file, since the player could not access the account or device without being legal age in the first instance. This prevents, for example, adolescents from using the PGD 20 of another to play a game, as well as preventing third parties other than the authorized player from using a valid PGD 20. Such player verification or authentication procedures might be facilitated by one or more system servers or components, such as, for example, authentication server 96 of FIG. 9.

In a step S2G, the game server 70 provides game information. In one embodiment, as described above, this may comprise the download of game code to the PGD 20. The game code may comprise actual executable code that enables the PGD 20 to present the game or games the player selected. In one embodiment of the invention, base game code can be stored on or reside at the PGD 20. This game code might not by itself permit the PGD 20 to present a game. In this configuration, additional code or data must be supplied to the PGD 20 in order for the PGD 20 to present the game. In other embodiments, further use of the storage and computing capabilities of the PGD may be desired, such that the base game code stored at the PGD may be greater, and in some cases enable a substantial or full ability of the PGD to play and present a game. Such instances may involve a command download of one or more entire programs from the system server, as set forth in greater detail below.

In one embodiment, the gaming server 70 is configured to transmit game result and/or paytable information. The game result information preferably comprises randomly generated game outcome data which, when provided to the PGD 20, causes the PGD 20 to present a game having the particular outcome associated with the outcome data. For example, the game outcome data may comprise random number generated results, such as a numerical code which, when provided to the gaming code, causes the gaming code to present a game having that corresponding outcome. In the case of a "slot" type game, the outcome code may represent the winning outcome "three cherries." In other embodiments, the outcome code may comprise more detailed data for use presenting the game using the game code. For example, the data may represent certain cards to be dealt to the player in the game of Blackjack, as well as the possible additional cards that may be selected by the player based upon the cards they wish to discard. It will be appreciated that the data provided to the PGD 20 by the game server 70 may depend upon the number of games to be played. For example, in the example provided above in which a player has elected to wager $100.00 on $1.00 per bet games, the gaming server must provide information regarding at least 100 games. Information for further games may be desirable, however, such as where a player is permitted to change his or her wager level, and/or where additional games can be played with accumulated winnings on the first 100 games purchases and played.

As indicated, the data may also comprise paytable data. This data is useful is calculating the outcome and/or payoff of a winning outcome. It will be appreciated that the paytable is generally independent of the outcome of the game, but may vary depending upon the amount wagered. Thus, the paytable is necessary to compute the amount won when players may select differing wager amounts. In one embodiment, additional data is provided to the PGD 20. This data may include biometric data regarding the player and/or global positioning system ("GPS") data. Once the data or information has been provided to the PGD 20 in step S2H, the gaming server 70 preferably sends information to the financial server 68 for later reconciliation. This information may comprise, for example, data regarding the win or loss associated with each game for which data was provided to the PGD 20. In this manner, as the player plays the games, the win and loss associated with each game can be tracked and verified.

Referring again to FIG. 4, in a step S3, the player initiates a gaming session. The player obtains a PGD, such as exemplary PGD 20 or any other suitable gaming device, such as those described above. The player may be required to obtain the PGD from a particular source, may simply turn on the device or the like in order to initiate the session. In a preferred embodiment, in a step S4, communication is initiated between the game server 70 and the PGD. In one embodiment, information is transmitted from the game server 70 to the PGD which, when received by the PGD, maintains the PGD in a mode in which it will present a game. As such, the information may be referred to as "activation information." The information may comprise data that is intermittently transmitted to the PGD. The interval between information transmissions may vary, but may be 5-30 seconds.

Such an embodiment can be considered a "serial" action-by-action process involving the PGD and server, such that the PGD is essentially a sophisticated display for the remote server, which is the entity that is truly running the subject game or games. Alternative "command download" embodiments involving the full download of one or more system programs to the PGD for extended "offline" gaming are provided in greater detail below. Under either form of embodiment, the activation and/or program command download information is transmitted via a wireless communication link. Preferably, the transceiver 64 and various relays 66 are configured, including in their number, location and power, to create a "game zone" within which the PGD will receive the activation information. Preferably, outside of this zone, the activation and/or download information is not received by the PGD.

In some embodiments, and particularly those involving a "serial" process, when the PGD does not receive activation information for a certain period of time, the PGD is configured to automatically prevent further game play. In this manner, a user of the PGD is not permitted to engage in game play other than in certain designated areas, such as a proscribed gaming zone or in a casino. In some embodiments, certain features of the PGD 20 may remain activated independent of the activation information. For example, various other menu features such as those permitting the player to preview games and the like may still remain active. When the player is playing games via other than a casino provided PGD 20, such as an outside privately owned PDA or the like, various features thereof may remain activated, such as those which are independent of game play.

Figure 6:
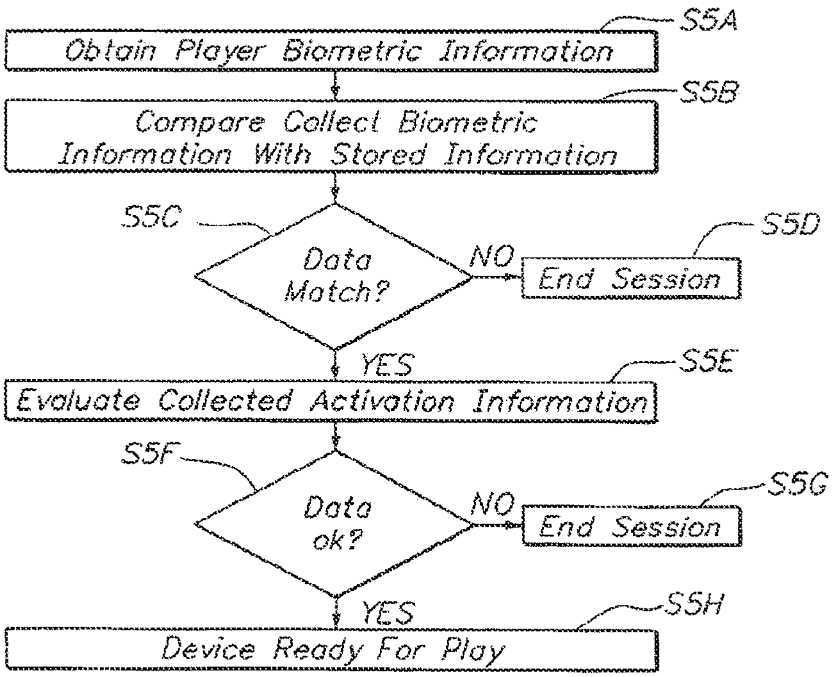
FIG. 6 is a flowchart illustrating one exemplary method of verifying a PGD for game play in accordance with the invention.

In one embodiment, in a step S5, the PGD is verified for game play. FIG. 6 illustrates one example of such a method, it being understood that other methods may be used. Referring to FIG. 6, in a step S5A, biometric and/or other verifying information is obtained from the player. In one embodiment, this may comprise reading fingerprint information using a fingerprint reader 49 at the PGD. In addition, in one embodiment, GPS data is obtained by the PGD regarding the location of the PGD. In a step S5B, the biometric information is preferably compared to the previously obtained biometric information (see step S1G, FIG. 5). If in a step S5C, the biometric information does not match, then the session is ended in a step S5D. In other embodiments, if the biometric information does not match, the player may be requested to, one or more additional times, try to match the biometric information, such as by rescanning their fingerprint.

If the biometric information matches, then in a step S5E, the activation information from the game server 68 is evaluated. This may comprise evaluating the quality or time of receipt of the information and determining if certain standards or requirements are met. If the activation information does not meet the requirements, then in a step S5G, the session is terminated. If the activation information does meet the requirements, then in a step S5H, the PGD is verified for game play. Referring to FIG. 4 again, in a step S6, the player is then permitted to engage in game play. In one embodiment, one of the games selected by the player for play is presented to the player. Preferably, at a step S7, it is determined if additional games remain to be played and if the player wishes to continue playing. If so, then the PGD is preferably re-verified in step S5 before the next game is presented for play.

As described above, in one embodiment, when a game is presented for play, the PGD uses resident game code along with downloaded game data in order to present the game. The game data may comprise data representing certain "outcomes" for the games to be played. If the player wishes to stop playing or all games have been played, then in a step S8, the results of the game or games played are preferably stored at the PGD. These game results are transmitted to the game server 70 for verification. In a step S9, once game play has ceased, the game server 70 stops transmitting activation information, thus preventing any further use by the player of the PGD in playing games in some embodiments, particularly those involving a "serial" game play process between PGD and server.

Figure 7:
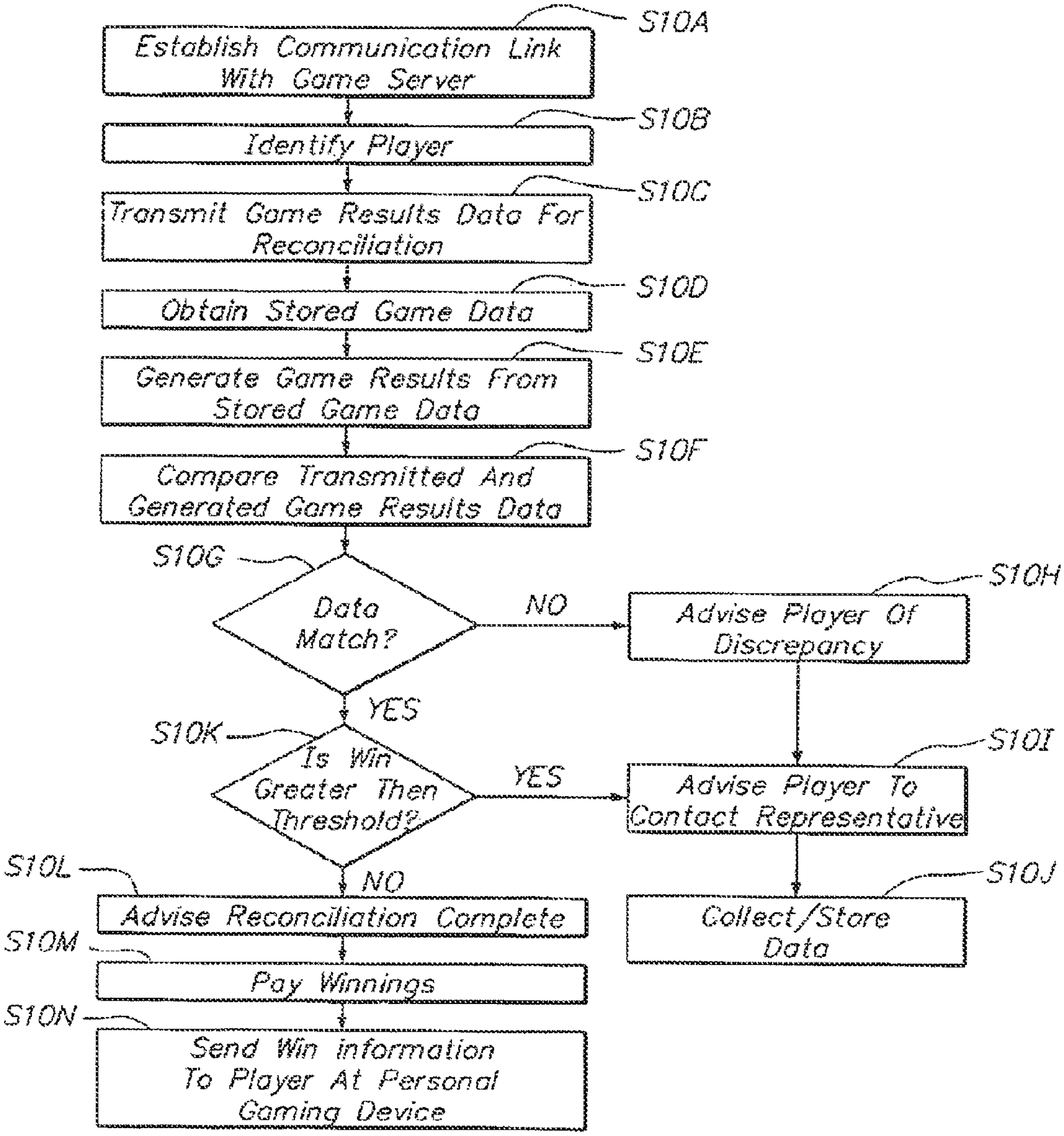
FIG. 7 is a flowchart illustrating an exemplary method of verifying game outcomes in accordance with an embodiment of the invention.

In a step S10, the game results are preferably verified. FIG. 7 illustrates one embodiment of such a method. In a step S10A, the PGD establishes a communication link with the game server 70. In a step S10B, authentication occurs. Preferably, this authentication comprises a player providing a personal identification number ("PIN") or other identifier, such as a biometric (like a fingerprint as described above). If authentication is successful, the authentication server 96 can notify the game server 70, financial server 68, and/or one or more other system components that the current player is approved for play. Then, in a step S10C, the game server 70 preferably establishes a communication link with the financial server 68. The game server 70 transmits the game results data provided by the PGD. This information may vary, but may comprise information identifying the particular PGD or "game set," as well as the results of those games, such as a monetary balance representing win and loss information for each game and/or total win or loss information.

In a step S10D, the financial server 68 retrieves the previously provided session data provided by the game server 70 when the game information was originally generated (see step S1H in FIG. 5). In step S10E, in one embodiment, the financial server 68 generates the results associated with the game data. This may comprise the financial server 68 determining the monetary win or loss associated with each game outcome, as well as the total win or loss for all games. In a step S10F, the financial server compares the outcome data provided by the PGD to the outcome data that is based upon the game server 70 generated game data.

In a step S10G, if the data is not the same, then in a step S10H the player is preferably advised of the discrepancy in the reconciliation. The player is then advised in a step S10I to seek assistance, such as by contacting a casino representative for further investigation of the issue. In a step S10J, the financial server 68 preferably stores the data used to perform the reconciliation for use by the representative in investigating the issue. If the data reconciles in step S10G, then in a step S10K it is preferably determined if the win for a particular game, or the total winnings for a group of games, exceeds a predetermined threshold. If so, the game results are preferably verified a second time. This step may also include additional audit procedures, such as confirming game wins. If this additional reconciliation is not successful, the player may be advised to contact a representative, as in step S10I.

If in step S10K the win amount is under the threshold, then in step S10L the player is advised that reconciliation has occurred. In a step 10M, the player is preferably paid any winnings. Where the player has a game financial account, this may comprise the financial server 68 simply updating the player account information. The player may also be paid winnings in other manners, such as by a ticket, credit to their credit card account or the like. In a step S10N, the financial server 68 preferably sends the win information to the PGD for viewing by a player. For example, the PGD may be caused to display a message such as "Congratulations, you won 1015 credits. Your account has been credited and you now have 1873 total credits."

Figure 8:
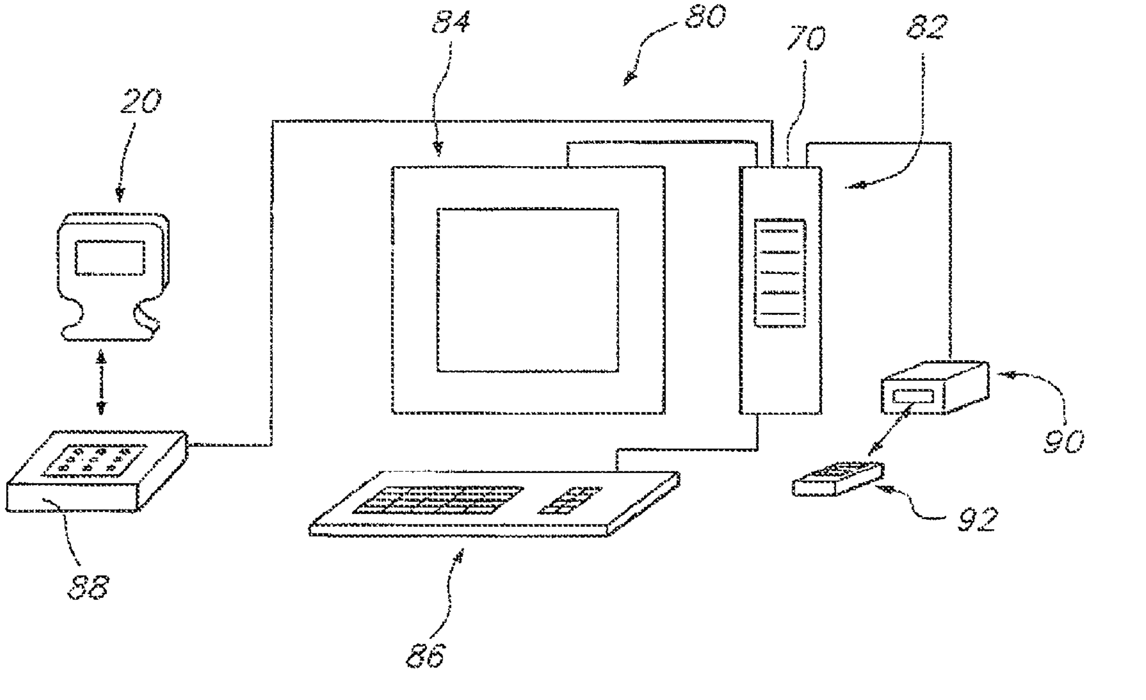
FIG. 8 illustrates an exemplary docking station for use with at least one PGD in accordance with an embodiment the invention.

Additional aspects of the invention will be described with reference to FIG. 8. As described above, in one embodiment, a player essentially purchases the right to play one or more games, and data or information that defines or comprises the outcome of the games is generated for use in later game play. FIG. 8 illustrates a system by which the user may purchase the games for play. As illustrated, the system 60 may include one or more stations 80. The station 80 may comprise a dedicated station, such as kiosk, or may comprise a home computer, or may even take the form of a free standing gaming machine, as discussed below. As illustrated, the station 80 has the form of a desktop computer having a processor 82, a monitor 84 and a keyboard 86. The station 80 may have a variety of other forms. The station 80 is preferably linked at one or more times with the game server 70, such as via the Internet or a dedication communication link.

In one embodiment, the user may utilize the station 80 to purchase games for play. In one embodiment, the station 80 is configured to display menu or other information to the user in purchasing games or engaging in other activities, such as managing their account. In one embodiment, when the player has successfully purchased games for play, the game server 70 may be configured to transmit game result information to the kiosk 70. The game result information may then be directed to a smart card interface 90, where the data may be written to a smart card 92 of the player. Once the data is stored on the card 92, the player may remove it and then input it into a suitable PGD, such as the exemplary PGD 20 as described above. Once input into a gaming device, the information may be read from the card 92 for use in presenting one or more games.

In another embodiment, the station 80 may include a docking station 88. The PGD 20 may be configured to interface with the docking station 88, permitting information to be transmitted between the station 80 and the PGD 20. In one embodiment, the game result information may be provided to the PGD 20 via the docking station 88. In this embodiment, the user may obtain the PGD 20 and then associate it with a docking station 88, or the PGD 20 may already be associated with the docking station 88 and essentially "checked-out" from that location. In some embodiments, the docking station 88 and/or overall station 80 may be in the form of or attached to a free standing gaming machine, as set forth in greater detail below. It will be appreciated that in these embodiments, the exact sequence of steps for implementing a game may differ from those recited in FIGS. 4-7.

In accordance with the invention, a player may be permitted to access a wide variety of goods or services other than those particularly described above via a PGD. For example, a player may be permitted to access a room charges account to view the current room charges associated with their stay at a hotel. A player may be permitted to request their car from a valet service, such as by entering a valet stub identification number. A player may be permitted to obtain a wide variety of other goods, services or information, or engage in a wide variety of other activities.

The PGD of the present invention has numerous advantages. First, a player is permitted to use a PGD to participate in a game at other than a fixed location. The player may play a game at a location that is removed from the location of traditional fixed gaming devices. These locations may include the hotel room of the player, a restaurant, a bar or lounge, a sports book, a hotel/casino pool area, and a wide variety of other areas remote from the fixed gaming devices. Of course, the player may also utilize the PGD to participate in a game in the area of stationary gaming machines, and may even participate in games played on both a PGD and a stationary free standing gaming machine at the same time.

Another advantage of the PGD is that the device is easily transportable. The player may take the device with them as they travel from location to location, such as from a restaurant to a hotel room. Thus, while the player is engaging in other activities, such as eating or moving from one location to another in a casino, the ability of the player to play a game might not be interrupted. Another advantage of the PGD is that its configuration results in ease of use. The PGD is preferably hand-held, and wireless and can thus easily be transported by a player. In addition, the exemplary PGD 20 is simplistic in design to make its use easily understandable by even inexperienced players. In general, necessary acts by a player may be prompted, such as with instructions displayed on the display or provided audibly through the speaker 36. The ability of a player to use his or her own familiar PDA, laptop, cell phone, or other suitable private device in some embodiments is also advantageous.

The PGD 20 is also versatile, and is not limited to presenting only a game for play by a player. As noted, a player or user of the PGD 20 may utilize the PGD to access a wide variety of information and obtain a wide variety of services. The player may access the Internet, obtaining information therefrom (such as news and weather) and may obtain goods and services there through (such as by placing orders with vendors having websites). The player may make room, show or restaurant reservations and obtain hotel/casino information.

One aspect of the invention is a method of presenting games via one or more PGDs in which the devices have resident game code for presenting a game, but which without additional game data will not allow the game to be played. Preferably, the additional game data comprises game result data, such as RNG and/or paytable information. This configuration has the advantage that substantially all of the game code can be stored on the PGD, thus reducing the download times associated with configuration the device for game play. At the same time, however, the PGD will not present games without first receiving the additional data.

A related advantage of the game is the ability of the player to pay for a block of games at a single time. Instead of being forced to confirm payment for each game to be played when it is played, such as by credit card authorization, the player pays for the "game results" for a block of games all at the same time. As one aspect of the invention, the game results may be provided on a game card, such as a smart card. The player may then keep the game results and use them to play games on portable devices (e.g., PGDs) at various times and in various locations. For example, the player may purchase 100 games and the associated "results" may be stored on a player card. The result information may be read by a PGD for use in presenting games to a player. The player may then elect to play additional of the games at a later time, even using a different device. At that later time, the result information may again be read and used to present additional games.

Another advantage of the invention is a configuration that ensures that the PGD is being used in the proper location(s), by the proper player(s) and/or is not being stolen or tampered with. As described, this comprises a system in which activation information is transmitted to the PGD, and where if the information is not received or confirmed, the PGD will not present games for play and/or may even emit an alarm or other alert signal. This prevents, for example, a user from taking the PGD or attempting to use it in unauthorized locations. This can also prevent the illegal or unauthorized use of the PGD, such as by a minor. Further details of such a "virtual leash" type configuration are provided below.

Process Type II: Video Clip Based PGD Processes

Figure 10:
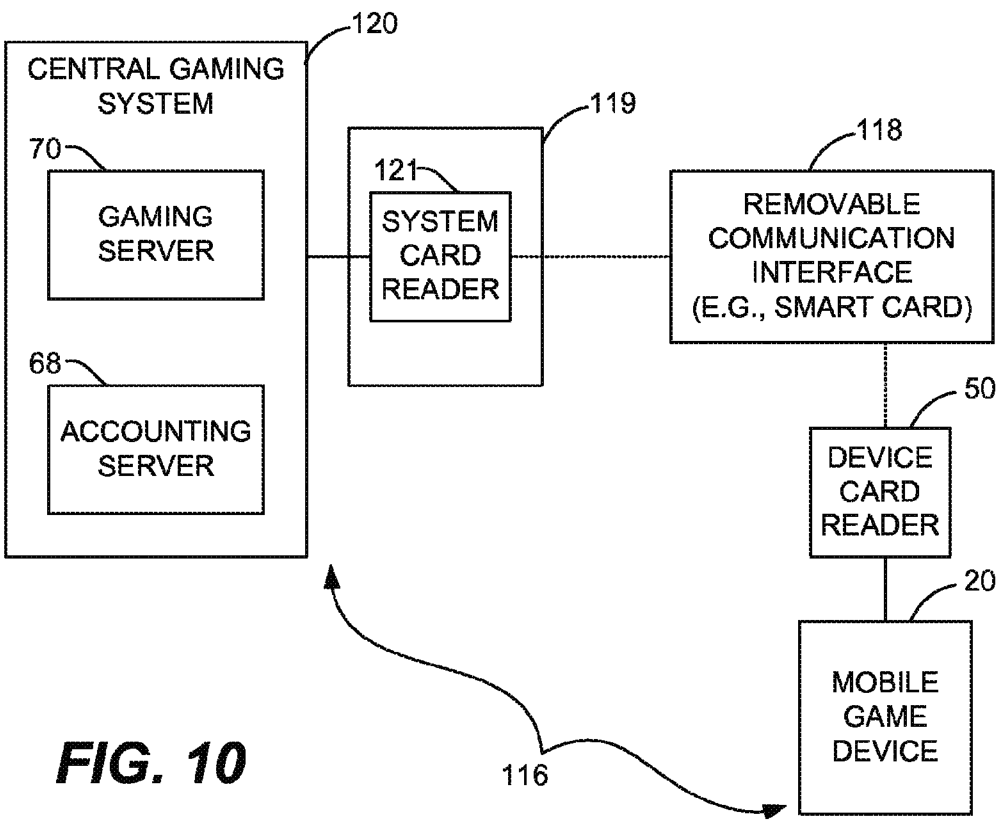
FIG. 10 is schematic of another exemplary gaming system including a remote gaming device and a removable communication interface constructed in accordance with yet another aspect of the present invention.
Figure 11:
FIG. 11 is an enlarged top plan view of an exemplary removable communication interface of the gaming system of FIG. 10, in the form of a smartcard.

In another aspect of the present invention as shown in FIGS. 10 and 11, a mobile gaming system, generally designated 116, is provided for selective display of one or more pre-purchased games of chance. The mobile gaming system 116 includes a remote PGD (such as the PGD 20 represented in FIG. 1) and a communication interface 118 (FIG. 11) adapted to communicate between a central gaming system 120 and the PGD to selectively receive pre-viewed gaming data representing the play and outcome of the one or more pre-purchased games of chance, generated by the central gaming system at a first time. The remote PGD 20 further includes a housing 22 supporting a display screen 34, and one or more input mechanisms 46. A gaming device microprocessor device 52 is included which is configured to: 1) commence play or processing of the pre-viewed gaming data; and 2) selectively displaying on the display screen 34 the play and outcome of the one or more game of chance at a time-shifted second time, after the first time.

Accordingly, in this aspect of the present invention, one or more games of chance are pre-purchased and pre-executed on the central gaming system 120 (e.g., a backend server), at a first time, the play and outcome of which can subsequently played and viewed on the remote PGD 20 at a second time, after the first time. The pre-purchased games of chance, thus, are fully executed in a secure gaming environment or system (e.g., the central gaming system 120), and then transferred, in the form of pre-viewed gaming data, to the remote PGD for a complete replay execution of the play and outcome of the games of chance at the leisure of the player on their remote PGD. In essence, the play and outcome of the pre-purchased games of chance are "known" and ratified at the server side prior to play and viewing on the gaming device. Once the pre-viewed gaming data is transferred to the remote PGD, the PGD is simply applied to view the play and outcomes of the games of chance. Hence, in the most basic level, a video clip (or clips) of the gaming play and outcome is transferred or downloaded to the mobile gaming device from the server for time-shifted replay thereof at the second time. The PGD is essentially relegated to a viewing mechanism that eliminates any player input, other than perhaps just pressing a button to enable one to view what happens in the next 'frame sequence' of the video clip. For example, a plurality of gaming video clips may be pre-generated at the server or backend at a first time. When a patron purchases one or more pre-generated games for viewing at a later second time, this data may be allocated (say randomly) to the PGD in no set order, sequence, etc. The PGD merely plays the video clips, which relate to an event that had already occurred in a secure environment, at the first time. To the player, however, this aspect is unknown and likely of little interest.

This approach significantly reduces the prospect of tampering since the sequential "play" and "outcome", merely in the form of a video clip or session file, are well defined and logged by the server for payout and/or dispute resolution. The security issues, thus, are addressed from the server side. Accordingly, it would be of little benefit for a hacker to "look-ahead" to determine which games might be favorable, since they are unable to "pick" and "choose" a winning video game.

In another aspect of the present invention, nonetheless, the post-viewed gaming data, representing the viewed play and outcomes of the one or more games of chance on the PGD 20, is synced-up or reconciled with the pre-viewed gaming data stored on the central gaming system for authentication of the game results transferred from the PGD. As will be apparent, such data authentication is desirable to significantly reduce the risk of data tampering to an even higher degree. This form of remote gaming is extremely advantageous in that the viewing of the play and outcomes of the games of chance can be performed offline. Briefly, the offline component of play is performed when the PGD 20 is not connected to the backend gaming system during game execution by the player of the mobile gaming device, while an online component of play is performed when pre-purchasing the games of chance, redeeming points, cashing and/or synchronizing with the backend gaming system for play reconciliation, etc. In this manner, all transactions would be performed within a legal casino jurisdiction.

Moreover, the present invention offers a standalone mobile gaming methodology and practice for full-offline game play (i.e., viewing of the play and outcome) without the need for connection through the internet, or any other network connection, or requirement that the player be physically present at the casino establishment during viewing of the play and outcome on the mobile gaming device. Accordingly, gaming on the mobile gaming device can be performed virtually anywhere, even though any type of network connection, such as cellular telephone network coverage, is unavailable.

Referring back to FIG. 10, this mobile gaming aspect of the present invention will now be described in greater detail. In accordance with the present invention, the entire mobile gaming system 116 includes a central gaming system 120 and one or more remote gaming devices, such as exemplary PGD 20. The central gaming system 120 typically includes a master gaming server 70 and a plurality of standalone gaming terminals (not shown) interconnected through a network system or the like. Briefly, while the central gaming system may comprise a large single server device, it is more preferably provided by a plurality of interconnect servers that cooperate to form the central gaming system. As set forth above in FIG. 3, for example, these may include the master gaming server 70, the financial server 68, the reservation server 72, an accounting server, etc. An accounting server, for instance, would be employed to ratify the various credit in/credit out transactions; validate credit card transactions and perform inter-credit facilitation transfers. The server may also allow credit transfer from a gaming device to a traditional device via system negotiation (master server to financial).

As set forth above in reference to FIG. 1, the exemplary PGDs 20 include a housing 22, a display screen 34, one or more input devices 46, a microprocessor device 52, and internal memory 52 to execute gaming, i.e., viewing the play and outcome of the games of chance on the mobile gaming device. It will further be appreciated that while the remote PGD is preferably a personal, mobile or portable gaming device, in this aspect of the present invention, it may also be a desktop computer, or a remote fixed or standalone gaming device as well. Preferably, however, the personal or mobile gaming devices include virtually any electronic communication unit such as a PDA, a cellular telephone, laptop computer, a dedicated mobile gaming device, etc.

While two-way communication between the central gaming system 120 and the mobile gaming devices 20, via communication interface 118, may be provided using the variety of I/O Device techniques already described herein (i.e., wireless interface, RS-232 port 38, USB port 40, etc.), the communication interface 118 (FIG. 11) is preferably freely removable from the PGD. In this aspect of the present invention, the communication interface may be provided by an intermediary, removable communication interface 118 capable receiving and transferring the pertinent pre-viewed game data necessary to perform standalone, off-line gaming between the central gaming system 120 and the mobile PGDs 20 (FIG. 10).

The removable communication interface 118 can, in other words, interface with the central gaming system 120 through a system card reader device 121 located at any dedicated standalone card reader, player terminal or kiosk 119. Similarly, the removable communication interface 118 can interface with any mobile gaming device through a like card reader device 50 thereof. By way of example, through the system card reader 121, the pre-viewed gaming data representing the play and outcome of the pre-purchased games of chance is downloaded to the removable communication interface 118 for storage on the memory unit thereof. The removable communication interface 118 may then be removed and inserted into the card reader 50 of the mobile gaming device or PGD 20, the gaming data of which can be extracted and processed at a selected second time for leisure viewing of the play and outcome of the pre-purchased game of chance. In one specific configuration, at the users leisure, the present invention enables time-shifted viewing of the play and outcome of the games of chance that were fully executed on the game server at an earlier first time.

The present invention, therefore, offers a standalone mobile gaming methodology and practice for full off-line game play execution without the need for a live connection through the internet or any other network connection. The player, in fact need not be physically present at the casino establishment during viewing of the play and outcome on the mobile gaming device. Gaming can thus be performed virtually anywhere, even though any type of network connection, such as cellular telephone network coverage, is unavailable.

The removable communication interface, hence, can in the most basic level be provided by a high capacity, portable memory unit capable of transferring the pre-viewed gaming data from the central gaming system 120 to the mobile gaming device or PGD 20 to effect time-shifted play and outcome, at the second time, and to transfer the post-viewed gaming data from the mobile gaming device back to the central gaming system for data reconciliation thereof. Such conventional memory units include, but are not limited to, compactflash modules, flash drives, memory sticks, smartcards, microdrives, etc.

More preferably, however, it is desirable to provide an intermediary, removable, communication interface 118 capable of increased functionality such as encrypting and decrypting usable data to reduce the risk of data tampering; performing player identity functions for player protection; and GPS location functionality to enable or not enable gaming operation in gaming legal jurisdictions. By way of example, as shown in FIG. 11, the communication interface 118 is preferably provided by a JAVA® based smartcard, E-key dongle, and other microcontroller systems, which incorporates a processor device and internal battery to enable the performance of the above-indicated functionality.

A conventional smartcard is a credit-card sized plastic card with an embedded computer chip 122. The chip 122 can be either a microprocessor with internal memory or a memory chip with non-programmable logic. The chip connection is either via direct physical contact or remotely via a contact less electromagnetic interface. The chips typically applied in smartcards are microprocessor chips and memory chips. Memory chips are the less expensive of the two, but provide a corresponding decrease in data management security. They depend on the security of the card reader for their processing and are ideal when security requirements permit use of cards with low to medium security.

A microprocessor chip, on the other hand, can add, delete and otherwise manipulate information in its memory. Since the encryption and decryption of data is preferred to increase the security function of the smartcards, this chip is preferable. Their ability to download not just data but also applications is quickly advancing. JavaCard smartcards, by way of example, are based on Java technology from Sun Microsystems. Java is an object-oriented, platform-independent, multithreaded, programming environment. Java is the foundation for smart Web and networked services and allows for secure enterprise extension through platform independence. Different systems can talk to each other—from Java-based smartcards to supercomputers—regardless of the underlying hardware or system software.

In accordance with the present invention, the removable communication interface 118 preferably includes one or more security features to promote player authentication and proper location based operation of the mobile gaming device. For example, the player may be required to enter a personal identification number before use of the interface can commence. In another embodiment, a player identification device 123 may be incorporated into the smartcard in the form of a biometric sensor capable of identifying the player. More particularly, the biometric sensor 123 may be a fingerprint sensor, a microphone, or the like.

In addition, the removable communication interface 118 may include a small GPS sensor 124 to verify location of the device. Position verification may be used to insure the mobile gaming device or other PGD 20 is being operated only in legal gaming jurisdictions, and to track lost or stolen devices. When the removable communication interface detects that the mobile gaming device is in a restricted area, or illegal gaming jurisdiction, the program logic may not permit data transfer or game execution to and from the removable communication interface. GPS, which stands for Global Positioning System, is the one of the more accurate systems today capable of identifying the exact position of a GPS sensor on the Earth anytime, in any weather, anywhere. Briefly, using such a sensor, the location of the removable communication interface can be determine within a matter of meters. Other positioning technology includes triangulation techniques.

In another specific embodiment, the mobile gaming device can include a second or secondary communication interface, such as wireless communication interface 44 (FIG. 2), that enables communication with the central gaming system. This may include any wireless communication protocol such as IEEE 802.1x, Bluetooth, IrDA, TDMA, CDMA, GSM and HomeRF. The secondary communication interface may also be provided by any conventional hard wired I/O Device connection or port such as a USB port 40, RS-232 port 38 or general I/O port.

As will be described in greater detail below, the secondary communication interface can be utilized to download larger software applications to the personal gaming device, such as firmware updates, advertising, video updates and control codes relating to the game presentation and game logic for viewing of the selected games of chance. On the other hand, all pre-viewed gaming data, affecting the play and outcome of the one or more games of chance on the mobile gaming device, and all post-viewed gaming data, for data reconciliation with the central gaming system, are preferably transferred through the intermediary, removable communication interface. It will be appreciated, however, that both communication interfaces can be applied if necessary.

Referring now to FIGS. 12A-12D, the general operation and application of this aspect of the present invention will be described. The gaming execution of this aspect of the present invention is considered passive in nature since the entire play session is generated by gaming server 70, at the first time, in the form of pre-viewed gaming data representing the play and outcome of the pre-purchased games of chance, and then downloaded to the mobile gaming device for viewing of the play and outcome at the later second time. The gaming data may in the form of a preset format such as a video clip or a game-presentation logic file such as an mpeg file. In the most basic form, video data relating to the gaming play and results are transferred or downloaded to the mobile gaming device from the server for time-shifted replay thereof at the second time. Consequently, this passive execution embodiment is substantially more secure in that there is significantly less potential for data tampering.

Figure 12A:
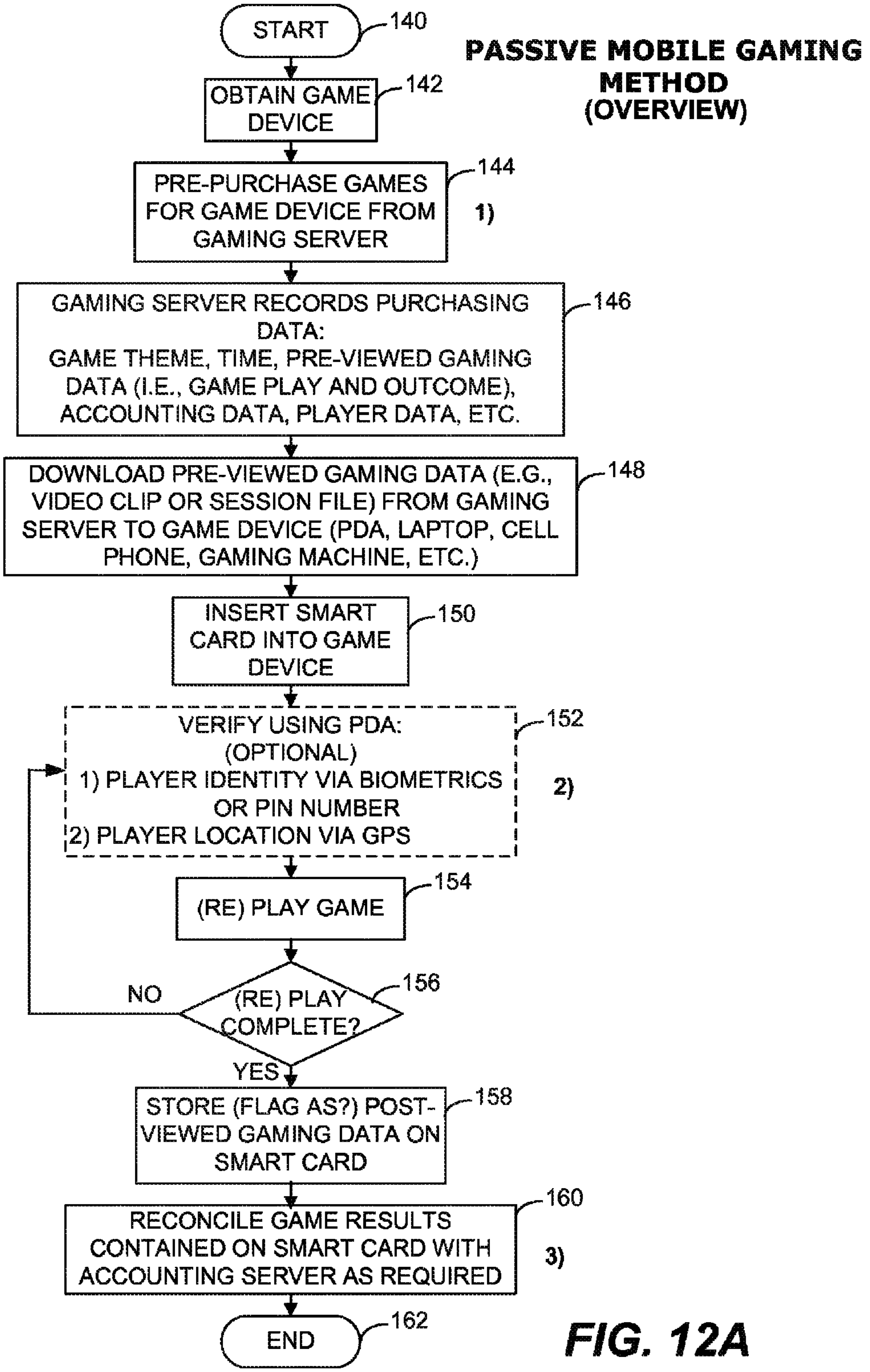
FIGS. 12A-12D are a series of flowcharts depicting various exemplary passive mobile gaming methods for the gaming system of FIG. 10.

As best illustrated in FIGS. 10 and 12A, the operation commences at 140, where a player purchases, rents, leases, etc. a mobile gaming device such as exemplary PGD 20, at 142, for use in connection with the mobile gaming system 116. Once the player opts to pre-purchase one or more games of chance at 144 for viewing on the mobile gaming device, the player may insert their issued removable communication interface 118 (e.g., smartcard) into a system card reader 121. Such card readers 121 are preferably in direct communication with the central gaming system 120, and may be located at the networked gaming terminals, or at standalone devices such as a kiosk 119 or the like. Briefly, in other specific embodiments, as mentioned, the gaming device 20 may also be connected to the gaming system by hard wiring directly to a player terminal or standalone kiosk, through any of the aforementioned wireless protocols (e.g., the secondary communication interface 44).

Upon insertion of the removable communication interface 118 into the system card reader 121, an initial login menu displays on a nearby display screen (not shown) of the player terminal or kiosk, prompting the player to input their selection commands. By way of example, the login menu may prompt the player to first enter a PIN code, or other biometric identity information as discussed. Once these security measures have been satisfied, the player may elect to purchase on more games of chance by inputting the proper prompted information. As will be described in greater detail below, such pre-purchase game parameters may include selecting the number of games of chance desired for pre-purchase, and the type of video game, such as slot games, poker, pachinko, multiple hand poker games, pai-gow poker, black jack, keno, bingo, roulette, craps and card games. Other selectable pre-purchase parameters from the display menu at 144 may include total amount bet (e.g., total dollar amount of number of credits) or the currency denomination bet per game (e.g., $0.25 or number of credit bet per game). At a minimum, at 144, the player must select the game-type, and the number of games desired to be pre-purchased and/or the total amount desired to wager. This game pre-purchase procedure will be described in greater detail below in reference to the flow diagram of FIG. 12B.

Upon selection of the type of game, the number of games to be played, the denomination bet, etc., the play of each game is executed by the central server 70 to generate the pre-viewed gaming data. This data, in the form of an entire data session or video data, represents the entire game presentation, game play and game outcome of the pre-purchased games to be viewed in a time-shifted manner at a later second time. It will be readily appreciated that this form of gaming at a PGD is somewhat different than the action-by-action "serial" process discussed above, as well as the "command download" of computer program(s) process discussed below. In the foregoing "serial" process embodiments, activities generally take place on a constant basis between the central server and the PGD, on an action by action basis, while in the following "command download" process, actual computer programs and code are downloaded to the PGD for operation at the PGD. As noted herein, however, the present "video clip" embodiments involve the download only of .mpeg or other similar preset video files, such that action by action serial processing is not required, and such that substantial processing or computing of game play is not required by the PGD. In this sense, these "video clip" embodiments comprise various advantages and limitations of both of the "serial" and "command download" embodiments.

Within the provided "video clip" embodiments, for record keeping and reconciliation purposes to be conducted at a later time, the pre-viewed gaming data and all purchasing data is recorded on the gaming server 70 records, at 146. Included in the recordation of purchasing data by the central gaming system are: the game selection (e.g., game theme for Little Green Men); the game purchase time data (e.g., Purchased on Sep. 20, 2004); Gaming data expiration date (e.g., 3 months from date of purchase (not to be confused with the "first time" which corresponds to the time that the outcome of the last game of chance in this set of pre-purchased games is generated)); the selected game paytable data (e.g., IGT #1234 (paytable serial number, pre-approved by the Gaming Control Board for Little Green Men, 97% payback, 25-cent denomination, etc.)); the Accounting data (i.e., the total amount bet (e.g., $100 fee paid), and the Game denomination (e.g., $0.25). Also included in this recordation purchase, may be optional data such as the Player Identification data (e.g., John Smith, player ID #3456P, and Jurisdictional Control as required).

Upon completion of the purchasing data recordation, at 146, the pre-viewed gaming data is downloaded to the mobile gaming device 20, at 148. Again, while the term "mobile gaming device" is frequently used for purposes of discussion herein, it will be understood that any suitable mobile, portable or non-portable PGD may be used for purposes of the present invention, as appropriate. As above-mentioned, the pre-viewed gaming data represents the game presentation of the play and outcome of the pre-purchased games of chance. Hence, this downloaded data may be in the form of a video clip of the same or a session file dictating the game presentation and logic gaming data that graphically depicts the play and outcome of the pre-purchased games of chance.

Such information would be necessary to incorporate on the mobile gaming device 20 in order to execute play, and generated and display the outcome and presentation on the mobile gaming device. Thus, the game presentation data and the game logic data corresponding to the selected game theme need not be transferred to the mobile gaming device 20 to effect viewing of the game play and outcome on the display since the gaming data transferred is merely in the form of a video clip, for instance. The amount of downloaded data, therefore, can be significantly reduced. More importantly, data tampering can be significantly curtailed since the downloaded data is essentially "video" data of the play and outcome, as opposed to "raw" data. Accordingly, there is little benefit a player altering the data.

Referring back to FIG. 12A, at 150, the removable communication interface 118 is inserted into the mobile gaming device 20 for transfer of the pre-viewed gaming data thereto from the gaming server. As mentioned, each mobile gaming device 20 includes a card reader 50 suitable for acceptance of the removable communication interface 118, whether it is in the form of a smartcard, an E-key dongle, Flash memory device, or direct download from a venue based machine.

As will be described in greater detail below, at 152 of FIG. 12A, an optional verification event can be required in one specific embodiment. Such use verification provides an additional measure of security requiring the input of player identity information and/or player location information to permit operational play on the mobile gaming device.

The player can then commence off-line operation of the mobile gaming device 20 for viewing of the pre-viewed gaming data, at virtually any venue, barring jurisdictional issues, and at any time. Through the player operation of the one or more input mechanisms 46 of the mobile gaming device 20, viewing of the play and outcome of one or more pre-purchased games of chance can commence. As mentioned, such execution and viewing of the play and outcome "video clip" of the games of chance shown on the display device of the mobile gaming device, the last of which is generated at the second time, after the first time. Accordingly, a time-shifted execution and viewing of the pre-purchased games can be performed virtually any place. At this time, the pre-viewed gaming data becomes post-viewed gaming data, a term of art in this instance for data reconciliation for essentially the same gaming data, unless altered. In other embodiments, after such viewing, the gaming data may be "flagged" as being viewed Referring back to FIG. 12A, after viewing of the play and outcome of each game, at 154, the mobile gaming device 20 determines whether viewing has been entirely completed, at 156. If any viewing of the pre-viewed gaming data still remains, then play may continued until all the remaining games have been exhausted on the mobile gaming device 20. If no game play remains, then the gaming device microprocessor device 52 is directed to store the post-viewed gaming data, at 158, back onto the removable communication interface 118.

As mentioned above, to redeem their account and "settle-up" with the casino operation, especially in the event of a winning game session, the player or user must communicate the post-viewed gaming data back to the accounting server 68 of the central gaming system 120. This is performed by removing the removable communication interface 118 from the mobile gaming device card reader 50 and inserting it into one of the system card readers 121 capable of communicating with the accounting server 68 of the central gaming system 120. These card readers 121, for instance, may be located at the gaming terminals, or at designated kiosks. Briefly, other reconciliation techniques may include ratification by phone code, so generated by the PGD, Internet access with a secret key (generated by the PGD) and/or voice ID over a phone system.

In accordance with the present invention, therefore, the post-viewed gaming data must be reconciled with the pre-viewed gaming data generated by and stored with the central gaming system 120, at 160. In this manner, the data can be authenticated to significantly minimize and/or deter the possibility of data tampering. Briefly, once the post-viewed gaming data is downloaded from the removable communication interface 118, via the system card reader 121, the accounting server 68 recalls the associated pre-viewed gaming data initially downloaded from the gaming server 70 to the removable communication interface 118. Subsequently, after the system generated pre-viewed gaming data game play and outcome (i.e., the game results) are compared with the post-viewed gaming data transferred from the mobile gaming device (e.g., PGD 20) for data reconciliation thereof, the procedure ends at 162. Such data reconciliation, however, will be described in greater detail in reference to FIG. 12D.

Figure 12B:
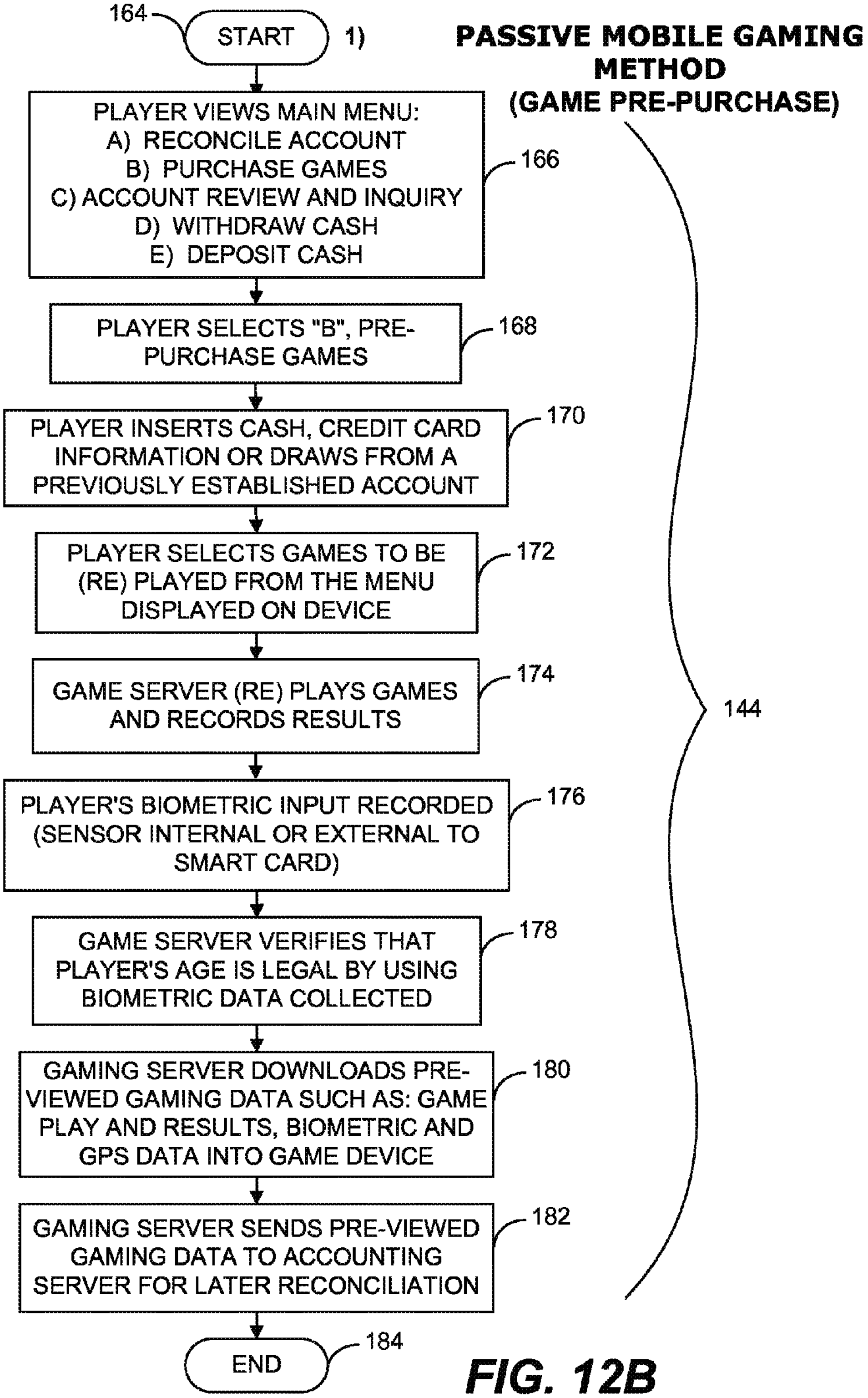

Attention is now directed to FIG. 12B, where the pre-purchase (144) of the one or more games of chance is discussed in greater detail for the passive mobile gaming method of FIG. 12A. As above-mentioned, the player may access the gaming server 70 of the central gaming system 120 at any kiosk, gaming terminal, etc., having a system card reader 121 and display screen coupled to the central gaming system 120. Such an access may also take place at a specialized free standing gaming machine, as described in greater detail below. After commencement of the games pre-purchase at 164, a user friendly menu is displayed on the display screen, similar to that illustrated at 166. In this menu example, to pre-purchase one or more games of chance, the player would select "B", at 168.

At 170, the player is prompted to insert their player's removable communication interface 118 in the designated card reader 121 (e.g., at the kiosk) to establish communication with the gaming server 70. Briefly, at this stage, an optional identity verification procedure may be performed, similar to that at 152 of FIG. 12A. This event will be described in greater detail below.

Referring back to FIG. 12B, on the display screen of the player terminal or kiosk, the gaming server 70 may prompt the player to input the total wager amount desired by the player to wager. For example, the player may decide to wager a total of $100.00. In one specific embodiment, a maximum total amount wager limit may be applied for control wager control purposes such as those instituted by the Gaming Control Board, as well as for the protection of the gaming player. These maximum wager limitations may be customized to the particular player based upon their past gaming activity, credit history, etc., similar to player tracking techniques. Further details of these and other "harm minimization" techniques and features can be found in, for example, commonly owned and co-pending U.S. patent application Ser. No. 10/708,168 by Nguyen, et al., entitled "Player Verification System and Method for Remote Gaming Terminals," which is incorporated herein by reference in its entirety and for all purposes.

Besides the input of the total wager bet, at 170, the player must typically select other certain parameters. For instance, the gaming server 70 may prompt the player to further input the currency denomination (e.g., $0.25), the number of games desired for pre-purchase and/or further input as may be required. Generally, given three (3) parameters selections, the fourth (4) can be derived. By way of example, if a fixed bet only configuration be selected or offered, the player may be prompted to selected the desired fixed denomination to bet, and the number of games for pre-purchase during the pre-purchase event of the present invention. Since the denomination bet per game will be fixed, the total wager amount will of course be the product of the fixed denomination bet and the number of games to be played. Alternatively, in these fixed bet configurations, during this pre-purchase event, the player may input the total wager amount and either the total number of games they elect to pre-purchase, thus determining the fixed bet amount, or the fixed bet amount, in which the total allowed games to play will be determined.

Subsequently, at 172 of FIG. 12B, the display screen of the kiosk or gaming terminal prompts the player to make payment for their total wager amount. Using conventional techniques, payment may be performed through cash insertion through a bill validator or coin acceptor, ATM, or credit card information input or swiping the card at a card reader located on the gaming machine or kiosk. Moreover, should the player have a player tracking account or account with the gaming establishment, they may simply withdraw the appropriate funds from the previously established account. Once the payment has been made, at 172, the player may be prompted to select the type of game of chance desired for game pre-purchase and play. For instance, at 174, the player may select from among, for example, various slot games, poker, pachinko, multiple hand poker games, pai-gow poker, black jack, keno, bingo, roulette, craps and other card games.

In more complex applications, however, more than one type of game may be selected for game pre-purchase. In these multi-game pre-purchase selections, whether applying fixed or variable betting, the parameter selections become even more complex in that player may divide their total wager bet per selected game, and then be prompted input the above-mentioned selection parameters. A menu, at 174, may prompt the player to select one or more of the available games. The player may select (via the touch screen or via buttons) more than one game type, and the total wager amount they desire to bet per selected game type. For example, the player may desire a total wager of thirty dollars ($30) for Little Green Men; fifty dollars ($50) for Red White & Blue; and twenty dollars ($20) for Triple Play Poker.

In this multi-game selection embodiment, the menu selection order may not follow that shown in FIG. 12B. It will be appreciated, however, that while display and description of the methodology throughout the specification is in one particular order, this need not be the case. For example, as just mentioned, the game selections may be made before the wager amounts, etc., without departing from the true spirit and nature of the present invention. Moreover, although the player may have input a total wager amount at 170, they are not required to bet their total wager amount input. In this situation, the player may have a credit meter or the like for their remaining total wager amount. For example, beginning with a hundred dollar ($100) total wager input at 170, if the player elected to play twenty (20) games, two (2) lines per game, and one dollar ($1) denomination bet for a total of forty dollars ($40), they would have a surplus of sixty dollars ($60) that would be credited to their account.

Referring now to 176 and 178 of FIG. 12B, the player may be required to input their player identity to authenticate and verify proper use of the removable communication interface 118 during the game pre-purchase procedure. In this configuration, the identification sensor or device may be located at the kiosk or terminal, or on the removable communication interface. In other configurations, such player identity procedure may be performed at many other instances of the pre-purchase procedure. Regardless, this optional authentication and verification of the player, prior to completion of the game pre-purchase procedure, can be performed for security purposes. A more detailed description will follow in the Verification and Game Play procedure of FIG. 12C, since such system, features and procedures are similar. Once all the required identification and security parameters have been satisfied, at 178 of FIG. 12B, the gaming server 70 immediately generates the play and outcomes for the one or more games of chance using numbers randomly generated by the gaming server, as well as the game logic and presentation, etc. for the selected games. Preferably the entire session or video clip contained in the pre-viewed gaming data is generated and stored on the gaming server, prior to downloading onto the gaming device.

In other specific embodiments, packages of pre-generated games, in pre-viewed gaming data form, of any predetermined number (e.g., 10, 50, 100, etc.) may be available. Depending upon the number of games desired and/or package selected by the player, the server may randomly select one of perhaps 10,000 available packages of pre-generated games of one-hundred games. Hence, this selected package would contain pre-viewed gaming data of the play and outcome (video clips) of one-hundred games executed sequentially by the gaming server. Thus, in this embodiment, the generation of the pre-viewed gaming data is not just-in-time of the game purchase. Such pre-generated packages may be available for download, even in situations where the player actually purchases less than then maximum number of games available in the package. For example, a package of fifty pre-generated games may be purchased, although the player only pre-purchases thirty games. In this instance, data tampering would be substantially curtailed since the purchased games would constitute the pre-viewed gaming data of the sequence of the first thirty games. Again, even if a hacker could "look ahead," he or she could not successfully change the sequence of the "video clip."

The generated pre-viewed gaming data is then downloaded to the gaming device at 180. Other optional data accessed that may be down loaded onto the gaming device, at 180, together with the pre-viewed gaming data include the biometric identification information, GPS location verification data, as well as any other pertinent player tracking information including advertising data. Along with this pre-viewed gaming data presently generated or pre-generated, the corresponding paytable serial number for the one or more selected games, pre-approved by the Gaming Control Board, the percentage payback and the denominations accepted for betting, the game session accounting data can be calculated, as well. At 182, the gaming server 70 sends the pre-viewed gaming data, and all other pertinent gaming data to the accounting server 68. At the end of the pre-purchase of games, at 184, the system returns to 146 of FIG. 12A, where the relevant data is stored on the accounting server for subsequent data reconciliation thereof.

Referring back to 152 in FIG. 12A and FIG. 12C, the optional identity and location verification procedure can commence before play of the mobile gaming device 20. This player identity and location verification procedure is similar to that of game pre-purchase event 176 of FIG. 12B performed at the gaming terminal or kiosk during game pre-purchase. For example, as mentioned and as shown in FIG. 11, the removable communication interface 118 (in the form of a smartcard) optionally includes a biometric identification sensor 123, such as fingerprint recognition sensor, and/or a GPS sensor 124 or positioning device using last known positioning or triangulation. Such identity and/or location verification or "virtual leash" procedures may also take place during game play, as detailed below.

A fingerprint offers a reliable and inexpensive means of authenticating the identity of an individual. This is far more secure than PINs or passwords, which are subject to being compromised or forgotten. By linking the player directly to the transaction process through their fingerprint, a typically more reliable proof is given that the authorized player is indeed present—not just someone who happens to know a short string of numbers or letter. This capability has been engineered by companies such as biometric Associates www-.biometricassociates.com in Timonium, Md. and fingerprint Cards AB www.fingerprint.se in Stockholm, Sweden into a complete, embeddable fingerprint identification system that can be inserted into a variety of access devices requiring player authentication. Their product performs all sensor, processor and decision-making functions within the module, greatly simplifying the incorporation of biometric recognition into small, mass-produced products such as smartcards and radio frequency identification ("RFID") tokens. Of course, other suitable fingerprint sensors, processors and devices may also be used or substituted, as may be applicable.

Briefly, in one example, one or more fingers of the player must first be registered so that the fingerprint sensor 123 on the removable communication interface 118 can recognize the fingerprint pattern. This is accomplished in conjunction with an external enrollment station that activates and controls the process. As the player places their fingertip on the fingerprint sensor 123, it detects and captures the small variations in finger surface-capacitance and creates a three-dimensional electrical image of the fingerprint's unique papillary pattern. These signals are verified and then programmed under the control of the enrollment station into protected memory on the communication interface 118. Such information may also be downloaded to the communication interface as part of the pre-viewed gaming data during the game pre-purchase procedure. Upon completion of the enrollment process and/or download of the pre-viewed gaming data, the module is "locked" and subsequent placement of any finger on the sensor triggers the verification process. This involves comparing the previously stored "registered" template with fingerprint image using a special programmed algorithm.

While the described biometric sensor device is incorporated into the removable communication interface, standalone fingerprint sensors available that can plug into PCs or laptop computers to provide fingerprint images. A greater description of a finger print reader as an identification device is also provided in co-owned U.S. Pat. No. 6,488,585, issued Dec. 3, 2002, to Wells, et al., entitled "Gaming Device Identification Method and Apparatus," which is incorporated by reference herein in its entirety and for all purposes. Other types of verification methods such as a PIN number or a password may be used separately or in combination with biometric identification methods. Other biometric identification methods that may be used with the present invention include but are not limited to feature identification using a camera, retinal pattern identification using a retinal scanner, voice pattern identification input using a microphone and hand-writing recognition using a hand writing input pad.

Figure 12C:
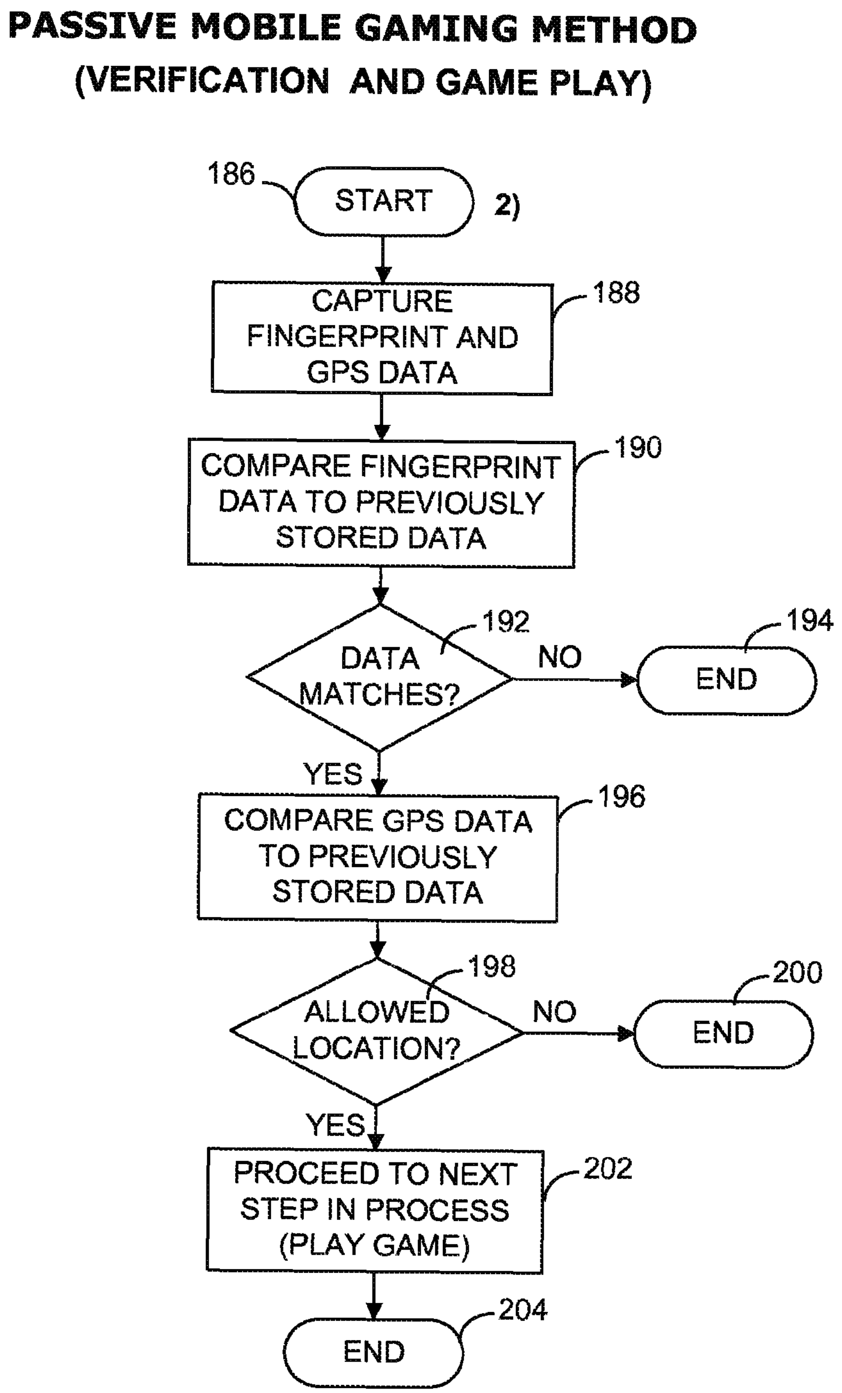

Accordingly, after the start of this verification procedure at 181 of FIG. 12C, the player may be required to first place their designated finger atop the finger print sensor 123 for capture of the fingerprint data at 188. As mentioned, the capacitive array sensor chip detects and captures small variations in finger surface capacitance and creates a three-dimensional electrical image of the unique pattern of the fingerprint. Using the communication interface microprocessor, this three-dimensional image is then compared to that three-dimensional electrical image registered during the enrollment procedure, at 190. In the case of a fingerprint enabled smartcard, if the data does not match at 192, the player is locked out of use of the communication interface at 194. If the data results do match, at 192, the person holding the card (not just someone who happens to know the PIN) is verified as its authorized player.

In addition, the mobile gaming device, such as PGD 20, and/or the removable communication interface 118, as mentioned, may have a small GPS device or sensor 124 to verify location of the device. Position verification may be used to insure the mobile gaming device is used only in legal gaming areas of the casino and to track lost or stolen devices. When the gaming terminal or kiosk detects that the mobile gaming device is in a restricted area, it may discontinue communications with the mobile gaming device. Accordingly, at 196, the GPS data calculated at the present position of use of the communication interface 118 can be compared to those jurisdictions were gaming is legal. Such information can also be downloaded onto the communication interface as part of the pre-viewed gaming data during the game pre-purchase procedure.

In the case of a GPS enabled smartcard, if the current position GPS data does not match at 198 with the legal jurisdiction GPS data, the player is locked out of use of the communication interface at 200. If the current position GPS data results do match, at 198, with the legal jurisdiction GPS data, potential use can commence. That is, once the fingerprint of the authorized player has been verified, and the legal gaming jurisdiction has been verified, the "smart chip" component on the card is automatically activated to proceed and establish protected communications with the host system, at 202.

For additional security, the mobile gaming device may have an encrypted serial number (code), which is used to verify and authenticate the mobile gaming device. An electronic key may be used with the device. With an electronic key system, the mobile gaming device cannot be activated until the key is inserted into a receptacle on the gaming device. Moreover, in some instances, a player may not want their identity revealed for privacy protection. For those players desiring such anonymity, the player may be identified as a unique ID (e.g., player s/n 12345). This unique ID can be selected by the player, generated randomly by the central gaming system, or assigned as per the device. The player is then known to the secure financial server. Many other forms of security may be applied as well. Those skilled in the art may implement other conventional security techniques known in the field to secure data without departing from the true spirit and nature of the present invention.

The game play on the mobile gaming device 20 will now be described in greater detail. As mentioned, once the player has satisfied all identity and jurisdictional verifications required by the removable communication interface 118, the player may commence play at 202 of FIG. 12C, which corresponds to 154 of FIG. 12A. In accordance with the present invention, as indicated, the mobile gaming device 20 may optionally offer fixed betting and/or variable betting schemes. Either betting scheme, however, would have to be selected at the game pre-purchase, since the only interaction of the player, during viewing of the pre-viewed gaming data on the mobile gaming device is starting and stopping the viewing session. Hence, the betting schemes cannot be altered during viewing of the gaming data since, as mentioned, this is essentially a time-shifted event that has already been consummated.

Accordingly, to commence viewing of the play and outcome of the pre-viewed gaming data, at the second time, the player merely executes the "PLAY" input mechanism 46, either for each game or just once. Since the player is merely viewing a video clip, such as an mpeg file, of the play and outcome, the only player interaction may be to start and stop the viewing of the pre-viewed gaming data. For example, to simulate a slot game experience, one of the input buttons can represent the slot handle or spin buttons to commence spinning of the slot reels for each game. Once the reels stop and the game is over, the player may be required to activate the "play" button to commence viewing of the video clip. Other potential games requiring no player interaction that are suitable for viewing of the play and outcome in this manner included, but are not limited to, pachinko, keno, bingo, and roulette.

Incidentally, during the generation of the pre-viewed gaming data, the gaming server can graphically insert an accounting meter of the account of the player into the video clip for display, in the same manner as the presentation of the play and outcome of the game. Again, this secure technique only transfers "video" data as opposed to "raw" data, and thus, significantly deters data tampering. As indicated above, once the pre-viewed gaming data is actually viewed by the player at the second time, the gaming data will be flagged as being viewed by the player. Subsequently, this post-viewed gaming data is then stored on the removable communication interface 118, at 158 of FIG. 12A, for data reconciliation.

Figure 12D:
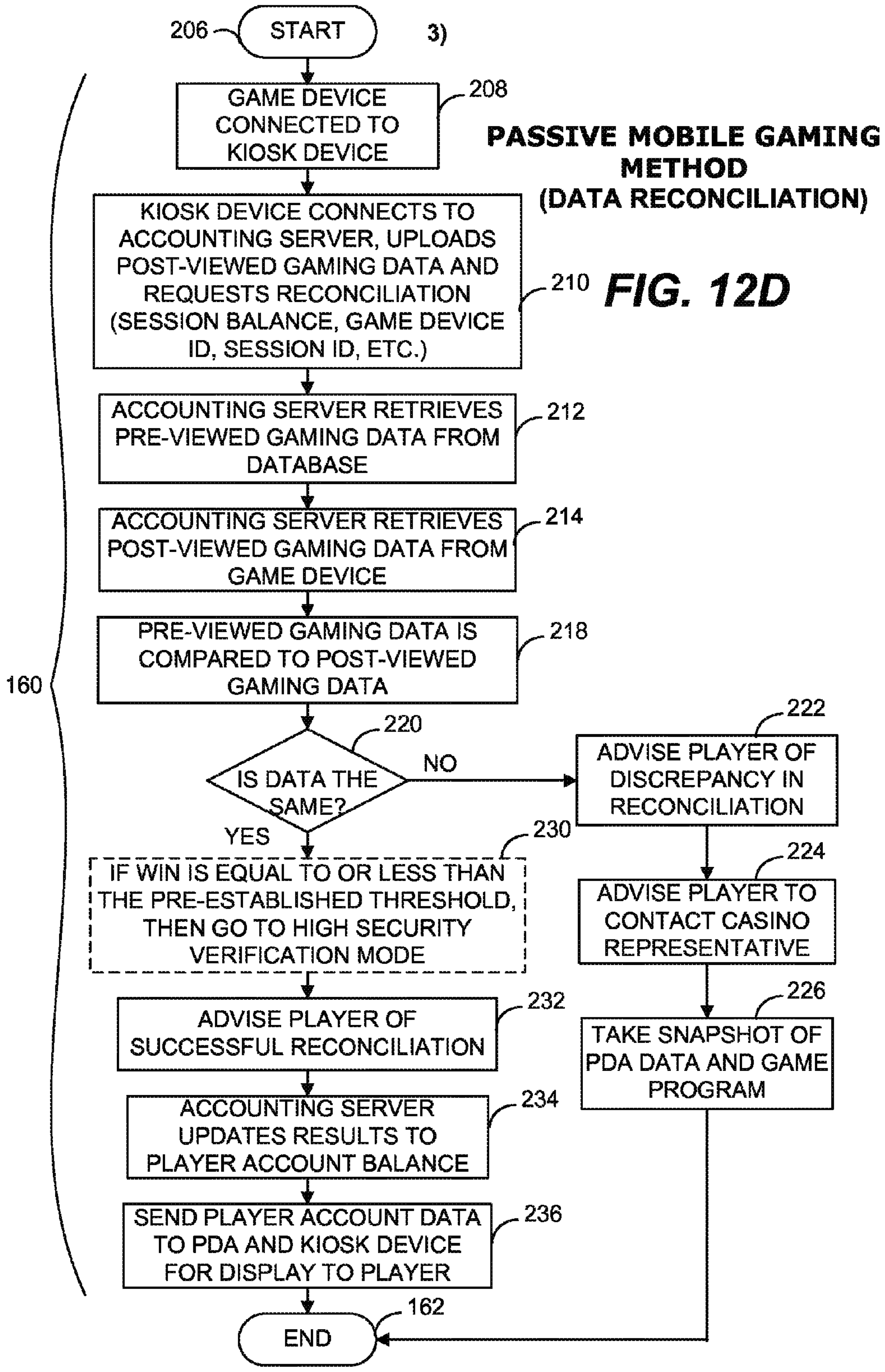

Turning now to the Data Reconciliation procedure of FIG. 12D, which commences at 206, the player initially inserts their removable communication interface 118 into the system card reader 121. As previously indicated in the game pre-purchase procedure and/or the game play procedure, the player may be required to input player identification data, at 152, such as a PIN number, code, fingerprint, and/or other biometric information. After the identification and verification procedure are satisfied, communication is established between the kiosk, free standing gaming machine (as detailed below), or other game terminal where the removable communication interface 118 is located.

At 208, the list of menu options, similar to 166 of FIG. 12B, is displayed on the display screen adjacent or near the system card reader 121. In this example, to reconcile their account, the player selects "A", in which the accounting server 68 begins upload of the post-viewed gaming data contained on the removable communication interface 118, at 210. As mentioned, this post-viewed gaming data should be the identical data, albeit flagged, as that of the pre-viewed gaming data.

Applying conventional data identification techniques, the accounting server 68, at 212, retrieves the corresponding pre-viewed gaming data that was originally downloaded to the removable communication interface during the game pre-purchase procedure at 180 of FIG. 12B. At 214, the post-viewed gaming data is uploaded and retrieved for reconciliation at 218. A comparator of the accounting server 68 then compares the previewed gaming data to the post-viewed gaming data for data discrepancies. Should a data discrepancy be detected, at 220, the accounting server 68 informs the player of the discrepancy during this reconciliation procedure, at 222. For example, an audible alarm may sound and/or inform the player on the kiosk of terminal display screen. The player may also be advised to contact a casino representative to determine the origin of the data discrepancy, at 224. For further security reasons, a snapshot of the mobile game device card data and game program may ensue, at 226.

If the comparator determines that the pre-viewed gaming data and the post-viewed gaming data are identical, at 220, the accounting server 68 determines whether the number of wins are equal to or less than the pre-established maximum theoretical number of wins, at 230. If this query, at 230, is positive, the accounting server 68 is placed in a higher security verification mode since an error has occurred and since a secure transaction is about to commence (i.e. updating play related/win information) at 234.

Should it be determined, at 230, that this is not the situation, the accounting server 68, at 232, informs the player of the successful data reconciliation procedure. The account balance of the player is then updated at 234. At 236, this information is then forwarded to the kiosk or gaming terminal display where the player is playing and/or to the PGD of the player through secondary communication interface 118. The operation for the mobile gaming procedure then ends at 162.

Process Type III: Command Download PGD Processes

Yet another basic type of PGD process generally involves downloading large portions of software to the PGD for gaming on the PGD. Such instances may involve a command download of one or more entire programs from the system server. Instead of the serial transmission of code from a game server and financial server to a portable device, or the transfer of fixed video clips, a command download of an entire game from the server to the PGD can be provided. Such a transfer can involve some or all of the game software being transcoded to a suitable computer language, such as, for example, Java®, for a download from a central server to a PGD. Although the example of Java® is being provided here for purposes of illustration, it will be understood that other suitable languages for such a purpose might also be used. In this manner, processing and individual game play computations can be handled by the PGD itself, rather than the cumbersome process of line by line or section by section transmission of game play from the server to the device.

The use of such a widely recognized and used computer language permits downloads to be made directly to devices of many different manufacturers or vendors, such that players can also be permitted to provide a wide variety of their own PDAs or other suitable devices as PGDs, as noted above. The central server can be the main device that notes that a particular PGD is requesting a particular version of a game to be downloaded, such as a Java® based version of a game, for example. The central server can also be adapted to recognize exactly what kind of download a particular PGD requires, such that appropriate downloads and or transcoding can take place to support that particular PGD. Where needed, additional translation software, such as that which is provided by Citrix Systems, Inc., of Fort Lauderdale, Fla., for example, could be used for the purpose of including even more devices as potential PGDs for use with the overall system.

Because this command download process involves the transfer of large portions of game play code, individual PGDs can be detached from the system for isolated "offline" game play in some cases. As will be readily appreciated, such a detached and offline state simply may not be possible in various alternative serial line by line process embodiments, as provided above. In some embodiments, the entire game software set for a particular game, such as "Red White and Blue" or "Little Green Men," for example, might be sent to various individual PGDs for play, while in others, only major portions of such game software sets might be sent. One critical portion of software that might be retained with a host server or gaming machine could be the RNG, such that actual game play outcomes are predetermined at a controlled device, such as a casino owned and operated server or gaming machine. Similar to the "video clip" types of PGD processes described above, actual game play outcomes could be predetermined using the RNG located at a system server or controlled gaming machine. Such predetermined outcomes can be referred to as "seeds."

Within the context of a command download process, such "seeds" need only be the most basic form of predetermined game outcomes, with nothing more, as opposed to entire video clips of outcomes, game plays and presentations. Similar to the foregoing video clip PGD process type, such seeds are again predetermined game play outcomes, with such predetermined game outcomes preferably being created at a central server or casino controlled device, such as a gaming machine. When using such basic game seeds, the game play and presentation can be made in a wide variety of ways to arrive at the predetermined game outcome or seed. In other words, each seed need only contain enough information for the PGD to determine the outcome of an actual game play, without telling the PGD how to present that outcome. A given command download of gaming software can provide enough information for a PGD to be able to run its own game presentations that ultimately result in game outcomes reflective of any game seeds that have been downloaded. Methods for creating and transferring such game seeds from the central server or other similar device to a PGD can be similar to those given for the various video clip PGD process types, although it will be appreciated that the amount of computer code for a particular game seed can be significantly smaller than the amount of computer code for an entire video clip.

Such command download types of PGD processes can improve on the other types of PGD processes at least with respect to the amount of overall time spent downloading to or communicating with the PGD. Although an initial command download of a particular type of game, such as, for example, an "Elvis" game, a "Wheel of Fortune" game, or a "Little Green Men" game, might take a significant amount of time, such a command download can generally be a one time event for that particular type of game. Actual game plays for that type of game on the PGD might then be made over and over again using the gaming software of that initial command download, with only a limited amount of further downloading or communication with a central server or casino controlled gaming machine. Such further downloading or communication can involve the transfer of game seeds, although it will be readily appreciated that the time needed to communicate basic game seed information can be relatively minimal. Conversely, the time needed to download entire video clips for play on a PGD can be relatively significant in comparison over the long term. For example, at a potential transfer rate of 56 Kbits per second, the transfer of a single game play video clip might take about 30 seconds, the transfer of a full command download of software for a particular game type might take about 10 minutes, and the transfer of a basic game seed might take about 1 second. While the video clip PGD process type might then be generally faster for 20 game plays or less, the command download PGD process type will become significantly faster over the long run for any further number of game plays. Of course, the foregoing example is merely illustrative in nature, and other transfer rates and times may apply given the technology available and the size of the various programs and clips involved.

It is also contemplated that predetermined game outcomes or seeds could be generic to a variety of different specific game types. For example, one or more game seeds or predetermined outcomes could be applied to any of an "Elvis" game, a "Wheel of Fortune" game, a "Little Green Men" game, or various other specific game types. Where such an arrangement is used, it may be preferable to include at least a portion of code in each downloaded game module, such as, for example, a Java® based download, such that the downloaded game module is able to interpret a generic seed and utilize the generic seed in a specific presentation of a game to arrive at a particular game result or outcome for that seed. For example, a given generic seed may represent a favorable 10× payout for its respective given game play. Where that generic game seed is contained on a PGD that is running a "Little Green Men" game, the command download of gaming software on the PGD for that Little Green Men game can be adapted to read the generic seed having a "10×" outcome and present a game result that shows 3 saucers on an appropriate payline, which result matches a 10× payout for that Little Green Men game. However, if the PGD is instead running a "Wheel of Fortune" game, the command download of gaming software on the PGD for the Wheel of Fortune game can be adapted to read that same generic game seed having a "10×" outcome and present a game result that shows, for example, 3 Vannas on an appropriate payline, which result coincides with a 10× payout for that Wheel of Fortune game. Although these two particular examples have been given, it will be readily understood that many other particular game types and outcomes might also be used. Of course, where a given generic game seed represents a "no win" or nothing outcome for a player, the particular game software for any game being played can interpret that generic game seed and then present an appropriate game play and outcome that results in no payout for whatever particular game is being played.

As will also be readily appreciated, many features inherent to processes for predetermined game plays and transfers of such to PGDs can be common to both the video clip and command download PGD process types. Such features can involve ways that discrepancies are resolved. Where a player buys, for example, a block of 10 video clips, game seeds or game outcomes, these outcomes can preferably be recorded to a host server before being transferred to the specific PDA or portable gaming device of the player. Should the player then claim a loss of power, battery failure, or other malfunction, the same exact 10 video clips or games seeds could be downloaded again at a later time, due to the recorded version being stored on the host server. In a preferred embodiment, the official version of any downloaded game outcome is the version that is stored at the host server, for both verification and security purposes. Thus, where a player presents a PGD that displays a final overall amount or game play balance that does not reconcile with the amount stored on the host server, the amount stored on the host server can be the amount to be officially recognized. Disputes over differing amounts could be handled in a manner similar to other gaming machine or casino malfunctions or discrepancies.

Such a foregoing feature can be particularly applicable to "slots" types or other similar types of games involving a single game activation resulting in a final game outcome. For game types that may involve some form of player interaction, such as, for example, a video poker or video blackjack type of game, it may become impractical to provide players with multiple opportunities to play the same games over and over until optimum plays become evident and can be made accordingly with repeat opportunities. Such types of games may require more advanced features to protect both players and gaming establishments from the consequences of power outages, device failures and/or malfunctions. Such additional features may include a provision for flash RAM or other memory devices capable of retaining game results in the event of a power loss and/or the ability to transfer game results to a host server or system after each individual game play, among others.

In addition to the ability of the system to effect a direct transfer of game seeds, video clips, or blocks of either form of predetermined game outcomes from a system server or other host device to a PGD, either form of predetermined game outcomes can also be stored on a separate memory unit, such as that described in commonly owned and co-pending U.S. patent application Ser. No. 10/937,989 by Nguyen, et al., entitled "Apparatus for Pre-Determined Game Outcomes," which is incorporated herein by reference in its entirety and for all purposes. As is noted therein, a portable and preferably removable memory apparatus, such as a smart card, cartridge, "memory stick," USB memory peripheral, or other such device, may include a player identification and one or more predetermined game outcomes associated with the player identification. The portable memory apparatus may communicatively couple with a gaming apparatus, such as a PGD, provide one or more predetermined game outcomes to the gaming apparatus, communicatively couple and decouple from the gaming apparatus, and physically couple and decouple from the gaming apparatus or PGD.

In addition to various electronic forms of portable memory apparatuses, such as, for example, memory "sticks," cartridges, smart cards, and the like, portable game plays can also involve the use of prepaid tickets or other tangible media. Such prepaid tickets or other tangible media may contain specific coded information that corresponds to particular game outcomes. Alternatively, a prepaid ticket may unlock game plays that are already stored on a PGD or other portable gaming device. For example, in some embodiments block downloads of large numbers of predetermined game plays or seeds may be made all at once to a given PGD, despite not all or even none of the game seeds having been paid for in advance. In a particular embodiment, each command download of a specific game software can be accompanied by a block download of 100, 1000 or even more game seeds, whether paid for or not. Individual game plays might occur after a player pays for them, which might be accomplished through a prepaid ticket that is readable by a PGD peripheral, for example.

Subscription and/or anonymous game play might also be possible through the use of such advance downloads of unpaid seeds. For example, two players might be registered to play on the same given PGD, which PGD might have many unpaid for game seeds previously downloaded and stored thereupon. When Player 1 decides to play on the PGD, he or she logs into a player account specifically designed for him or her on the device, which device may also be adapted to recognize Player 1 through a variety of "virtual leash" methods and devices, as noted below. Player 1 then plays a number of games as desired using the unpaid for seeds previously stored on the device, upon which the player account for Player 1 is then specifically charged or noted for such plays. Player 2 may later similarly log on to the same PGD for other game plays that also draw from the block of unpaid for game seeds, upon which the account for Player 2 is then charged for such plays. Remaining downloaded game seeds or plays from those previously made in bulk that are never used might never be charged, or in the alternative, refunded if a precharge is used for such seeds or game plays, as may be appropriate. In such embodiments, it may be preferable to include added security for any game seeds, and particularly for unpaid game seeds, such that unscrupulous players are not able to reverse engineer and analyze such unpaid game seeds before electing to pay for them. Such security might involve various encryption and hash techniques, as well as specific code that cannot be understood without an appropriate system key, among other methods, as will be readily appreciated.

Specific examples of potential scenarios involving gaming systems and PGDs adapted for a command download process will now be provided, with it being understood that such examples are merely illustrative and in no way limiting in nature. In one situation, "Paul Player" enters a casino with his own personal PDA that is adapted to execute and display Java® programs. Upon seeing that his PDA might be usable with a suitable gaming system installed within the casino, Paul approaches a downloadable games desk and confirms that his own personal PDA is able to run downloadable games of chance for wagering purposes at the casino. At this point, a connection is made between his personal PDA and a download interface at the downloadable games desk. Such an interface can be hard wired or wireless, as will be readily appreciated. Paul then selects one or more game types to download, which can include, for example, Little Green Men, Wheel of Fortune, and/or various other types of games, after which a command download of gaming software for each game takes place from a system host to his PDA.

After one or more games are downloaded to his own PDA, Paul is then able to decide how many actual game plays he would like to purchase. For example, Paul might purchases 10 game plays for $1 per game, after which a block of game seeds can then be downloaded to Paul's PDA. As noted above, such game seeds can be specific to a specific game type, such as Little Green Men, or such game seeds might be generic, such that they can be played on a variety of game types. Paul then also decides to purchase or check out several separate memory units having game seeds stored thereupon, in the event that he wishes to play further beyond the 10 games that he has already purchased. Although it may be required that Paul purchase any game plays stored on such memory devices at the time of taking them from the games desk, some embodiments might involve a checkout procedure for such memory sticks or units, whereby charges are not made until the game seeds stored thereupon are actually downloaded for play. For example, where Paul checks out 5 memory units, each having 10 games stored thereupon, and where Paul only plays the games on 2 of the memory units, no charge would be made to Paul or against his account when he then returns the other 3 memory units with their game seeds stored intact. Of course, full charges might also be made at the time of checkout, if desired.

In any event, Paul then takes his own personal PDA with downloaded game software stored thereupon and leaves the downloadable games desk. He then goes to a restaurant within the casino and plays 5 of the games while waiting for a table. After his meal, Paul heads for a hotel lobby within the casino to wait for his friends, where he plays the other 5 games. While roaming the casino floor with his friends later, Paul inserts two of the portable memory units, playing all 10 games stored on each one, after which he hits a moderately sized win and decides to stop playing. Later, Paul returns to the downloadable games desk to claim his overall winnings and to return the unused memory units. Upon verification of the three memory units indeed being unused, a refund can be provided, or no charge might be made against Paul's account, as might be appropriate. Verification can be made of the overall balance reflecting his winnings on his PDA, at which time Paul might then be paid, such as by crediting his account, providing him with a ticket voucher, or simply paying him in cash, in the event that the downloadable games desk might also be part of a cashier cage at the casino.

With one or more of his favorite games being downloaded to his own personal PDA, Paul might then return to the casino or a similar suitably adapted gaming establishment in the future and be able to play more of those same games with the same command download that was originally made. For example, Paul might return the next day and purchase 20 game seeds, either by direct download or onto a portable memory device, after which Paul can play games using those game seeds for their outcomes using the same command download software that was downloaded to his device during his previous visit. Such command downloads of gaming software for particular games could then reside on his PDA for as long as Paul wished for them to remain there, further facilitating ease in play during many future returns to the casino.

Of course, it may be preferable that such software be resistant to reverse engineering, that various shrinkwrap licenses preventing such reverse engineering be required of any player who accepts a command download to his or her own PDA, and/or such a command download of software might also be written so as not to contain any trade secrets or critical gaming code, in the event that it is reverse engineered in any event. For example, RNG and/or other critical game determinative functions or processes might be reserved for performance by a central server or other suitable system device, such that the only software that is transferred to a PDA or other PGD generally relates only to game presentation and other display code. Such game presentation and display code can be non-sensitive with respect to potential reverse engineering or outside analysis, but may be substantial in nature, such that it is preferable to have command downloads to allow such code to reside on PGDs, rather than on the host system for a serial PGD process.

Specialized Gaming Machines

Figure 13A:
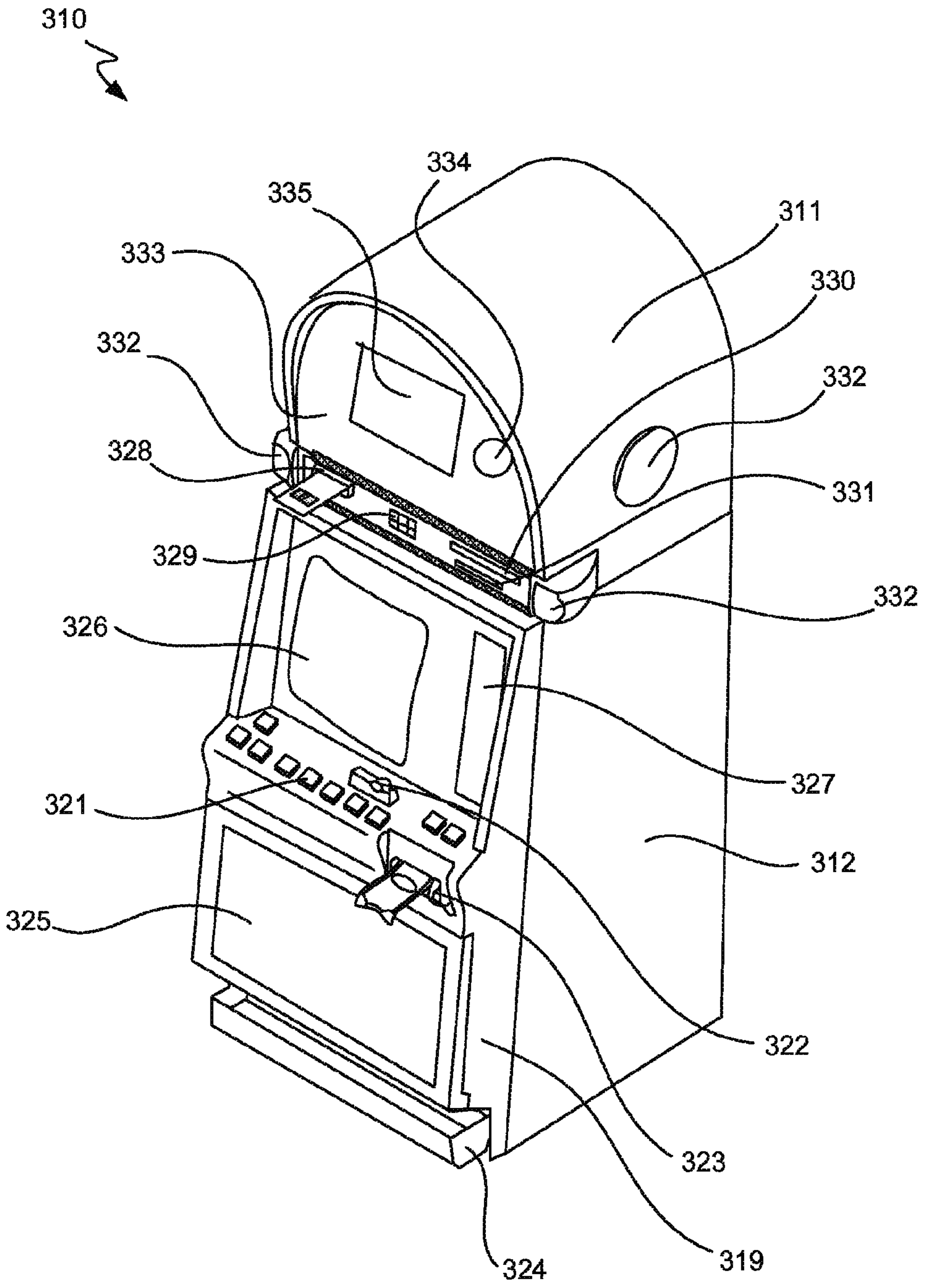
FIG. 13A illustrates in perspective view an exemplary gaming machine adapted to accept wagers and present games of chance.

As noted previously, various downloads of gaming code or video clips, or simple serial process interactions can be made with a variety of system components, from direct connections to a centralized server or to a secondary outlet or interface for such a server. Such a secondary outlet, interface or even server can be a free standing gaming machine itself. Turning now to FIG. 13A, an exemplary free standing gaming machine adapted to accept wagers and present games of chance is illustrated in perspective view. Gaming machine 310 includes a top box 311 and a main cabinet 312, which generally surrounds the machine interior (not shown) and is viewable by users. This top box and/or main cabinet can together or separately form an exterior housing adapted to contain a plurality of internal gaming machine components therein. Main cabinet 312 can include a main door 319 on the front of the gaming machine, which preferably opens to provide access to the gaming machine interior. Attached to the main door are typically one or more player-input switches or buttons 321, one or more money or credit acceptors, such as a coin acceptor 322 and a bill or ticket validator 323, a coin tray 324, and a belly glass 325. Viewable through main door 319 is a primary video display monitor 326 and one or more information panels 327. The primary video display monitor 326 will typically be a cathode ray tube, high resolution flat-panel LCD, plasma/LED display or other conventional or other type of appropriate video monitor. Alternatively, a plurality of gaming reels can be used as a primary gaming machine display in place of display monitor 326, with such gaming reels preferably being electronically controlled, as will be readily appreciated by one skilled in the art.

Top box 311, which typically rests atop of the main cabinet 312, may contain a ticket printer 328, a key pad 329, one or more additional displays 330, a card reader 331, one or more speakers 332, a top glass 333, one or more cameras 334, and a secondary video display monitor 335, which can similarly be a cathode ray tube, a high resolution flat-panel LCD, a plasma/LED display or any other conventional or other type of appropriate video monitor. Alternatively, secondary display monitor 335 might also be foregone in place of other displays, such as gaming reels or physical dioramas that might include other moving components, such as, for example, one or more movable dice, a spinning wheel or a rotating display, among others. It will be understood that many makes, models, types and varieties of gaming machines exist, that not every such gaming machine will include each of the foregoing items, and that many gaming machines will include other items not shown. Such gaming machines are made by many manufacturers, such as, for example, IGT.

With respect to electronic gaming machines in particular, the electronic gaming machines made by IGT are provided with special features and additional circuitry that differentiate them from general-purpose computers, such as a laptop or desktop PC. Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A more detailed description of many such specializations in electronic gaming machines relative to general-purpose computing machines and specific examples of the additional or different components and features found in such electronic gaming machines can be found at, for example, commonly owned and copending U.S. patent application Ser. No. 10/995,636 by Nguyen, et al., entitled "Class II/Class III Hybrid Gaming Machine, System And Methods," which is incorporated herein by reference in its entirety and for all purposes.

With respect to the basic gaming abilities provided, it will be readily understood that gaming machine 310 can be adapted for presenting and playing any of a number of gaming events, particularly games of chance involving a player wager and potential monetary or other payout, such as, for example, a wager on a sporting event or general play as a slot machine game, a keno game, a video poker game, a video blackjack game, and/or any other video table game, among others. While gaming machine 310 can typically be adapted for live game play with a physically present player, it is also contemplated that such a gaming machine may also be adapted for game play with a player at a remote gaming terminal. Other features, functions and devices may also be used in association with gaming machine 310, and it is contemplated that the present invention can be used in conjunction with a gaming machine or device that might encompass any or all such additional types of features, functions and devices.

Figure 13B:
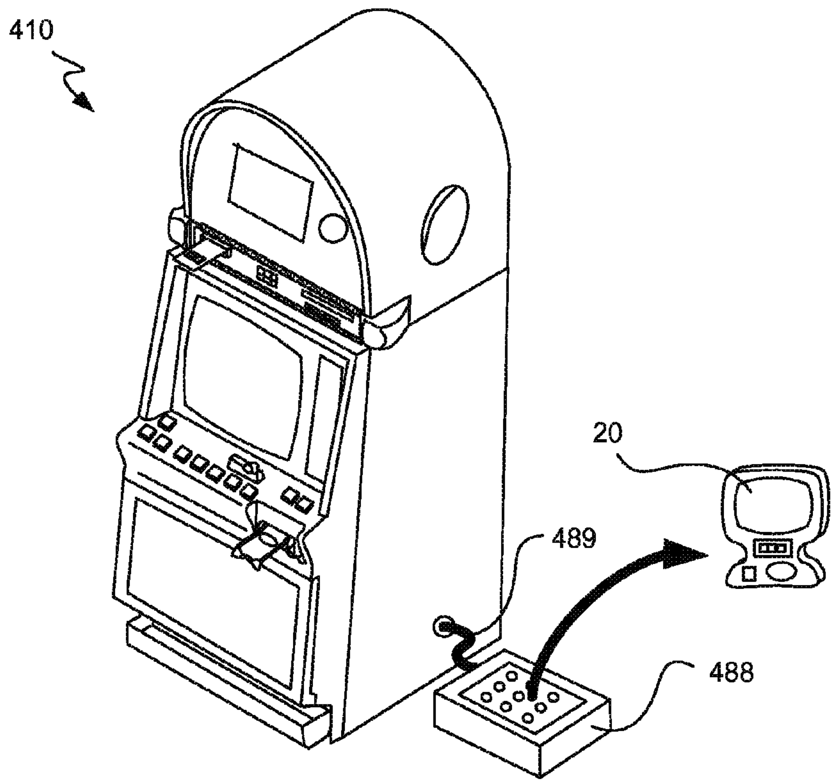
FIGS. 13B and 13C illustrate in perspective view two exemplary specialized gaming machines having associated PGD docking stations in accordance with various embodiments of the invention.
Figure 13C:
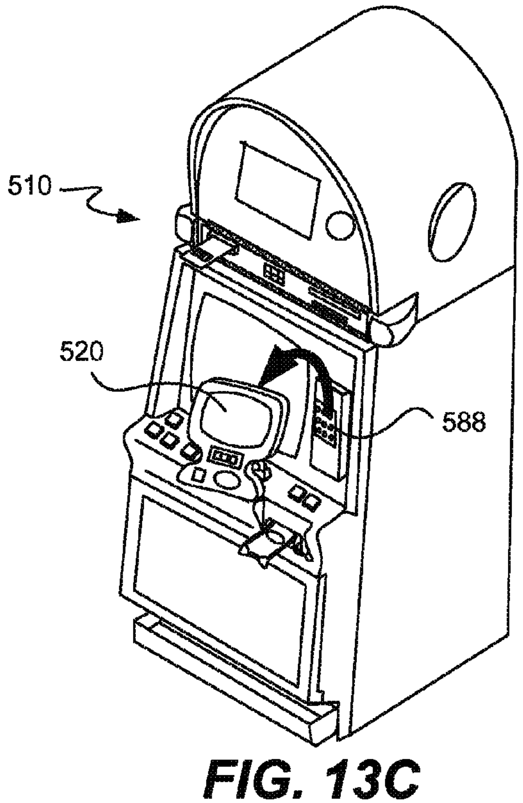

One item that is specifically contemplated for use with the present invention involves a free standing gaming machine that incorporates a docking station for a PGD, such as that which is noted above. Referring next to FIGS. 13B and 13C, two exemplary specialized gaming machines having associated PGD docking stations in accordance with various embodiments of the invention are illustrated in perspective view. Turning first to FIG. 13B, free standing specialized gaming machine 410 can be substantially similar in nature to gaming machine 310, with the notable exception being the presence of docking station 488. In particular, gaming machine 410 can include a docking station 488 that stands alone and separate from the gaming machine, such that it can be identical or substantially similar in nature to docking station 88 as described above. Accordingly, any suitable PGD 20 adapted for use in the overall supporting gaming system could be used with such a gaming machine 410 having docking station 488. A suitable connection, such as hard-wired connection 489 can connect docking station 488 with gaming machine 410, and any associated added software, hardware and wiring (not shown) that may be required to incorporate such a docking station 488 into a free standing gaming machine 410 can also be included. Alternatively, gaming machine 410 may simply be a conduit through which docking station 488 connects to a remotely located overall gaming system, such as that which is described with respect to FIG. 8 above.

Referring next to FIG. 13C, free standing specialized gaming machine 510 can also be substantially similar in nature to gaming machines 310 or 410, with the notable exception being the presence of integrated docking station 588. In this embodiment, integrated docking station 588 can be built into the gaming machine itself, such that an associated PGD 520 can physically dock at the docking station 588 and remain with the gaming machine 510. As shown, a specialized PGD 520 is in the process of being removed from integrated docking station 588. Such a specialized PGD can be substantially similar in nature to any regularly suitable PGD, such as PGD 20 described above, with one notable difference being that specialized PGD 520 is particularly adapted to be docked at and remain with docking station 588, such as by a physical pin, lock, latching mechanism or the like (not shown). In a general sense, integrated docking station 588 and specialized PGD 520 can be substantially similar in nature to docking station 488 and PGD 20 above, although several added features and capabilities may be preferred.

As one possible additional feature, specialized PGD 520 may be further adapted to operate in a different manner when it is in a "docked" mode or position at an associated host gaming machine, such as specialized gaming machine 510. For example, PGD 520 may operate as a secondary or other added display to gaming machine 510 when it is docked at integrated docking station 588. Such a secondary display mode for the PGD 520 may be particularly preferable where integrated docking station 588 has been implemented in place of a regular secondary or other added display. Where, as in the particular case of specialized gaming machine 510, docking station 588 does not displace such a secondary or added display, such as where an information panel has been displace, PGD 520 may serve as still another secondary, tertiary or further additional display. Such a display could be used to display even more information to the player, such as, for example, bonus information, player tracking, paytable, advertising and/or other useful information. When no game play is currently taking place at gaming machine 510, docked PGD 520 might also be used as part of an attract mode, such as a general machine attract, or a specific attract mode pointing out the detachability of PGD 520. For example, PGD 520 might display an attract mode message to the effect of "Take Me to Any Authorized Remote Location to Play Games Through This Slot Machine!"

Of course, where such a PGD 520 is indeed undocked from gaming machine 510, then its display will preferably operate as a primary game display for any games being played at the PGD 520, as described in detail above. In various embodiments, each PGD 520 might be owned and operated by the actual casino or other sponsoring gaming operator, particularly where specialized hardware is needed to attach, dock and possibly lock each PGD 520 to a specialized integrated docking station 588 at a gaming machine 510. Alternatively, docking station 588 might also be adapted to interface with separate privately owned PDAs and other potential PGDs, such that players might also be permitted to provide their own personal and portable gaming devices. In other embodiments, particularly where detachment of a PGD 520 from an integrated docking station 588 simply to allow an outside PDA to interface with the docking station might be impractical, specialized gaming machines might be provided having an integrated docking station 588 and proprietary PGD, as well as an associated wired docking station 488 to interface with outside PGDs.

While it will be understood that the various systems and implementations disclosed herein can involve the use of a general docking station 88 or a specialized docking station 488 adapted for use with a specialized gaming machine, such that outside PDAs and other suitable PGDs might be used, the following discussion will apply specifically to those embodiments where proprietary PGDs docked at integrated docking stations at specialized gaming machines are used. As noted above, such embodiments can involve the use of a PGD having two primary modes, docked and undocked. While the PGD can serve as a secondary device when it is docked, such as a secondary or other added visual and/or audio display, it is preferably detachable for use in remote gaming by authorized player. In some embodiments, such a detached PGD can involve the use of a "floating" gaming license to operate a gaming machine. As is known in the art, a given gaming establishment will tend to have a set number of licenses for a given type of gaming machines, such as, for example, Class III gaming machines. In order not to exceed its set limit of a certain type of gaming machines, each detachable PGD can be adapted to operate under a floating license, such that there is an acceptable overall number of gaming machine licenses for a given type of gaming machine class in use at a given time.

In some embodiments, this can be accomplished by creating a one-to-one association between each proprietary PGD and each specialized free standing gaming machine to be used with the PGD system. Under such an arrangement, a given PGD 520 is to be docked at, detached and checked out from a given associated specialized gaming machine 510, and can then only be returned to that given gaming machine. While the PGD is detached from the gaming machine and in use, the associated free standing gaming machine would not be available for play by any other player, and a simple message such as "Gaming Machine Currently Unavailable: In Remote Use" can be displayed at the free standing gaming machine. Preferably, the free standing gaming machine would become available when the remotely located PGD is not in use, or at least when the player checking out and detaching the PGD has logged off. In this manner, the license to operate a particular gaming machine, such as, for example, a Class III gaming machine, would remain with the free standing gaming machine and its particular associated detachable PGD at all times, such that only one or the other may be played at a given time.

Under such an embodiment, a player checking out the PGD from a free standing gaming machine may return the PGD to the specific associated free standing gaming machine himself or herself, or may be allowed to drop off the PGD at any of a number of designated locations. Further, such a player might be permitted to take the detached PGD to some off premises locations, such as to his or her associated hotel room, where leaving the PGD at the hotel room might be acceptable. Similar to that which is noted above, the free standing gaming machine might be made available for live in person play upon such an event as a player leaving a restricted gaming area with a detached and checked out PGD. Of course, it may be desirable to require players to belong to a program and place a deposit before they would be allowed to detach and check out a proprietary PGD, such as to prevent or deter theft or any other form of delinquent use of a checked out PGD. Such embodiments involving one-to-one correspondence between proprietary PGDs and free standing gaming machines may be inconvenient in some regards, however, as players may not want to return to the free standing gaming machine at the end of their gaming sessions. Where such PGDs are then left at appropriate drop off locations, there can be some down time before each PGD is matched up and redocked at its associated free standing gaming machine, thus rendering such PGDs as unavailable to other players in the interim.

In other embodiments, a more complex system can be established that does not require a one-to-one association between each proprietary PGD and an associated free standing gaming machine. Under such embodiments, a plurality of suitable PGDs and a plurality of specialized gaming machines can be incorporated into an overall system where any PGD can be docked at any specialized gaming machine. In this manner, PGDs can be more readily redocked at gaming machines once the player checking out a PGD has elected to terminate an association with that gaming machine, since casino personnel would then be able to dock any PGD that may be handy onto a gaming machine that is ready for redocking. Under such a system, it may be preferable to have extra PGDs, such that gaming machines having their remote sessions terminated and ready for redocking can have replacement PGDs redocked quickly, without a need to locate a specific PGD for each machine.

While such arrangements may be more convenient from the perspective of players and casino personnel in charge of overseeing the docking of PGDs to gaming machines, such a system may be more complex from the standpoint of tracking gaming machine licenses to ensure that the given number at any particular time does not exceed the permissible maximum for the casino or gaming establishment. In such a system, it may become desirable to render each PGD as unauthorized to and/or even incapable of running wager based games thereupon unless an associated free standing gaming machine has virtually transferred or associated its license to the PGD. In this manner, each PGD may be operable for a number of functions at any time, but can only be used for wager based gaming when an associated free standing physical gaming machine has been rendered as temporarily unavailable for live gaming at the physical gaming machine itself. Of course, other suitable arrangements for ensuring that a given casino or gaming establishment does not violate its various gaming machine licensing requirements with the appropriate governing regulatory body or board might also be implemented, and it is contemplated that such other arrangements also be included for use with the inventive PGD systems disclosed herein.

In general, the use of a docked PGD and specialized gaming machine arrangement, such as that shown in FIG. 13C, allows for a traditional gaming experience at the slot machine as well as a seamless transition to a mobile gaming experience within a controlled environment. As alluded to above, during the time that the specialized PGD 520 is docked at its associated gaming machine 510, an authorized player may decide to check out the PGD for play in a remote fashion by selecting an option to "undock" the PGD. This may be accomplished via various devices, such as, for example, an on-screen button, external button, or a latching lever type device that will create a notification event to the MGC of the gaming machine and/or a central system server. Such a request to undock a PGD 520 may require several modal changes in both the host gaming machine 510 and the PGD 520, as well as a system level notification. At the host gaming machine 510, the main game screen and any associated gaming displays can be switched to a simple "in remote level operation" style of display, to identify that the slot machine is being played remotely, as noted above.

In addition, remote display software can be initialized, re-directing main screen displays to the PGA via a wireless connection. Although transcoding might then take place to scale the display, sound, encryption, and other game functions appropriately to the capability of the PGD, it is preferable that such transcoding has already been accomplished, particularly where the same proprietary PGDs are reused within the system. Where each PGD is associated with a given free standing gaming machine on a one-to-one basis, such transcoding for any game capable of being played on the free standing gaming machine is preferably made to the associated PGD when it is first installed to the gaming machine. Thereafter, future command downloads to the PGD may be unnecessary, except where new versions or patches for the specific game software might be provided. Where various PGDs might be used interchangeably with different associated system capable free standing gaming machines, and particularly where such various free standing gaming machines might have varying different game types playable thereupon, it may still be preferable for each PGD to have many or all possible game types transcoded and downloaded via command downloads.

Where there are too many game types for such an arrangement involving multiple transferable PGDs, such that storage of each possible game type at a PGD is impractical, it may be preferable to adapt each transferable PGD such that it can perform an initial interface with its newly docked to gaming machine as may be appropriate. Such an initial interfacing might involve the PGD and/or free standing specialized gaming machine querying each other as to the games capable of being played on one another. Where a matching downloaded game cannot be found at the PGD for a game capable of being played at the free standing gaming machine, an appropriate command download for such a missing game or games can then take place between the new host gaming machine and the newly docked PGD. Where a host specialized gaming machine is capable of playing only one particular game type, such as, for example, Little Green Men, then only one command download might be necessary, or none at all where the newly docked PGD already has a downloaded module for the Little Green Men game. Multiple command downloads may become necessary where multiple games are possible at the new host gaming machine, such as, for example, in the case of various Game King types of gaming machines.

As noted above, when a player decides to undock and check out a PGD from its docked free standing gaming machine, a variety of activities may need to take place at the PGD, the gaming machine, and the central system server. In some embodiments, wireless network connectivity will preferably have been previously established between the PGD and the casino network or system, such that the overall network or system can recognize the PGD once it has been detached from its host gaming machine and is operating in remote mode, possibly in cooperation with the gaming machine from which it was detached. As noted above, a floating license for the game might be transferred to the PGD. Where a central game server is to take over the job of serving the remote gaming session, rather than the free standing associated gaming machine, then the gaming session can be transferred accordingly.

A request to undock the PGD might also require an affirmative identification of a player to confirm that the player is authorized to undock the PGD and operate it remotely, as well as an authentication mechanism to electronically "leash" the PGD to that particular player for continued remote use. This may include fingerprint, voiceprint, facial recognition, other biometric identifiers, and/or a variety of other mechanisms for ensuring that only the authorized player is using the PGD, particularly when wager based gaming is being conducted remotely on the checked out PGD. Of course, such items might require the implementation of items such as a built in fingerprint scanner, microphone and/or camera in the PGD, as well as system software at the PGD, on a system server, or at both locations, that is adapted for verifying and authenticating an appropriate player, as set forth below.

Virtual Leashes

In addition to the foregoing considerations, another significant feature that can be implemented with respect to any of the foregoing "serial," "video clip," or "command download," PGD basic process types is that of at least one "virtual leash" that effectively tethers a given PGD to a particular user, a particular game playing area, or both. It will be appreciated that such virtual leash mechanisms can be used with both proprietary and privately owned outside PGDs. In addition, while such a virtual leash or leashes may be tied to a variety of factors, a break in any such factor with respect to an appropriate player, an appropriate gaming location, or other such appropriate factor can result in the suspension of an associated gaming session, the termination of overall PGD operations, or both. An alarm or alert may also be issued to the PGD and/or overall system or network, as may be appropriate. Further, although multiple virtual leashes can be in use at a given time (e.g., a specific player leash, an authorized location leash, a proper PGD leash, and a proper software leash), it will be appreciated that use of the term "virtual leash" may refer to one or more leashes, as may be appropriate.

One form of virtual leash can be a personal leash used to authenticate or verify that the proper player is using an associated PGD. In various embodiments, some form of biometric authentication can be used to leash the PGD to a particular authorized player, only allowing the authorized player and no other person to use the PGD, particularly for wager based gaming activities. One or more of a variety of different items adapted for identifying a player biometrically or via other means can be implemented, several of which are provided above. Again, these can include, for example, a fingerprint sensor, a microphone, a retinal scanner, a camera, a keypad and/or an electronic pad and stylus, which might be used to respectively determine a fingerprint, a voiceprint, a retina, facial features, a PIN number and/or a digital signature for a given player. Other forms of biometric and other player identifiers may also be suitable. In some embodiments, one or more of such items can be built into the PGD itself, and other embodiments might involve the use of such devices that have been placed in communication with the PGD or some other system element or interface. A combination of built in and system based player authentication devices may also be possible. Of course, various forms of analysis software and custodial files corresponding to registered or known players would also need to be provided in any such player identification system. As will also be appreciated, such a player authorization can involve the use of more than one identifier.

With respect to any form of virtual leash, it will be appreciated that the virtual leash can be both established and then maintained. That is, an original player, location, device, and/or software authentication and verification can be made, such as when a PGD is originally checked out or detached from a host gaming machine having a docking station. While a virtual leash can be established at least in part by accepting a variety of user identifiers (e.g., PIN or fingerprint), such a virtual leash can also be established, at least in part, by accepting a variety of PGD identifiers. Such PGD identifiers can include, for example, information or data from an RFID tag on or associated with the PGD, a dongle attached to or otherwise associated with the PGD, a transaction certificate stored at the PGD, or a location determination program or feature of the PGD, among others. As noted above, such a location determination program can be a GPS type program or system, which can be built into or otherwise associated with the PGD.

Once the virtual leash has been established, it can then be maintained through future checks or "pings" from the PGD and/or one or more other system components, such as authentication server 96 of FIG. 9. For example, a biometric reading of a fingerprint might be taken when a PGD is first checked out to an authorized player. The system (e.g., authentication server 96) can determine from the read fingerprint that the current player is the right player, such that gaming may commence on the PGD. Thereafter, the player may be required to provide repeated fingerprint readings periodically in order to maintain his or her gaming session on the PGD. Such repeat readings may be made on a regular interval basis, such as every minute, every 15 seconds, or every second or two, as may be appropriate. Alternatively, such readings might be made on a random basis, so as to discourage potentially fraudulent uses of the PGD by tricking the system. Such a repeated checking or pinging through the virtual leash can be thought of as a "heartbeat," in that the PGD can be rendered inoperable for gaming purposes if a proper heartbeat is not present between the PGD and an appropriate system component, such as authentication server 96.

In some embodiments, a PGD can include features adapted to detect that an authorized or proper player is currently holding the PGD. This might be accomplished by using capacitive touch sensing devices embedded into the edges of the PGD, for example. Such devices could be similar to touch style light switches and would be used by the software operating on the PGD to detect that the player is still in possession of the PGD. Should the player set the PGD down or otherwise lose physical connection to the device, the operating software will sense this, notify the system via a wireless connection that the user is no longer in possession of the unit, and revert to an idle or sleep mode. Should the player pick up the PGD again, the device might require a complete re-authentication of the user, such as via one or more biometric sensing methods. Also, at periodic events determined by the operating software, the PGD may ask the player to re-authenticate themselves in order to continue with a particular gaming session.

Still another method that might be used to determine that only a properly authorized player is playing the PGD is to use some form of secondary identification and an associated detection device. Such secondary player identification can involve, for example, an RFID player tracking card or other suitable RFID item and an RFID reading device and system. Details for such personally identifying RFID related gaming devices and features thereof are provided in commonly owned and copending U.S. patent application Ser. No. 10/897,822, by Benbrahim, filed Jul. 22, 2004, and entitled "Remote Gaming Eligibility System And Method Using RFID Tags," which is incorporated herein by reference in its entirety and for all purposes. Other such secondary identification items and methods are also described in U.S. patent application Ser. No. 10/937,990, noted and incorporated by reference above. In practice, rather than require the player to continually provide his or her fingerprint or other biometric identification on a regular basis, the PGD or other system device could periodically "ping" the secondary player identification item, such as an RFID card, token, bracelet or the like, and expect a correct response. In effect, this pinging of the secondary identification device can then become the effective heartbeat of the virtual leash or leashes. If no response or an incorrect response is received (i.e., no heartbeat or improper heartbeat), then the PGD could be adapted to suspend game play immediately and require an actual biometric authentication for the authorized player.

In some embodiments, the determination of a proper or authorized user or player may depend from a previously established list of one or more users or players who are authorized to play according to a variety of potential factors, such as for a given game, a given PGD, or at a given location. Such preapproved users or players may be limited to the user who owns or checks out the PGD, or the user who buys the game seeds, for example. In other embodiments, a group of players may be listed as those who are authorized to play a given game, on a given PGD, or at a set location. For example, while a husband might be the person who checks out a PGD and/or purchases games seeds for the play of games on the PGD, both the husband and wife might be listed as authorized or proper players for those games and/or on that PGD. As such, a first user might buy the game seeds or otherwise determine what games or how many games are to be played on a PGD, while a second user might be the one to actually play or request play of the games. As noted, in some instances, it may be preferable to restrict the second user to be the same person as the first user, while in others, a group of users may be eligible to be such a second user. In still further embodiments, it may be possible for the second user to be separate from the first user, such as where a person might want to buy games for another person or group of people not including the buyer, and a restriction is created that the recipient or recipients be the only proper or authorized players.

Another form of virtual leash can be created with respect to an appropriate location for the PGD in order to conduct wager based gaming activities on the device. Various location sensing means can be used to allow gaming operation only when the PGD is located in specific, designated gaming areas. Wireless infrastructure can be installed for such location detection and associated communications. As in the above embodiments involving a player specific virtual leash, the PGD can be rendered non-operational when it is removed beyond the boundary of the legal gaming area, particularly with respect to wager based gaming activities. As also noted in the above embodiments involving a player specific virtual leash, a heartbeat can be created with respect to the particular location of the PGD, such that an appropriate location for the device is maintained at all times.

In some embodiments, such a location based virtual leash can also provide a means for ensuring that casino owned proprietary PGDs are returned and not stolen. For example, where a casino owned or other non-player owned PGD is removed from a restricted gaming area or property, detection of such a removal could be made immediately, and one or more security measures could be activated. Such security measures might include an alert to the system and/or various casino personnel or security, as well as a loud audible signal. Such a signal could be a warning message to a player, as well as to nearby security, and could be emitted from the PGD itself and/or external system speakers. Additional security measures might involve the memory of the PGD being erased, such that reverse engineering could not take place at some uncontrolled outside location.

As will be appreciated, the task of limiting play of a PGD to a particular "authorized" gaming location or area may involve a number of considerations given the typical RF hostile casino environment. One method of determining location could involve the implementation of a number of "pico cells." As is generally known, such pico cells can comprise wireless system access points having a limited amount of power and range. Such limited power and range can be compensated for by using a large number of pico cells, with the overall result being that tighter controls can be had with respect to the exact shape and size of a defined restricted area. Whereas more powerful access points might emit signals that could be detected and used at significant distances, pico cells tend to have such a limited range that detection or communication at distances of more than a few feet or yards might not be possible. Of course, pico cell signal strength and receiver sensitivity on the PGA could also be controlled, such that a definite operational range for the pico cells could be set. Once set, the PGD would then be operable with respect to gaming only when it is able to detect a signal from a system pico cell. Once the PGD is moved off of the restricted gaming area, with no pico cells then being within a few feet or yards, then no pico cell signal could be heard, and gaming on the PGD could be suspended or terminated.

Figure 14A:
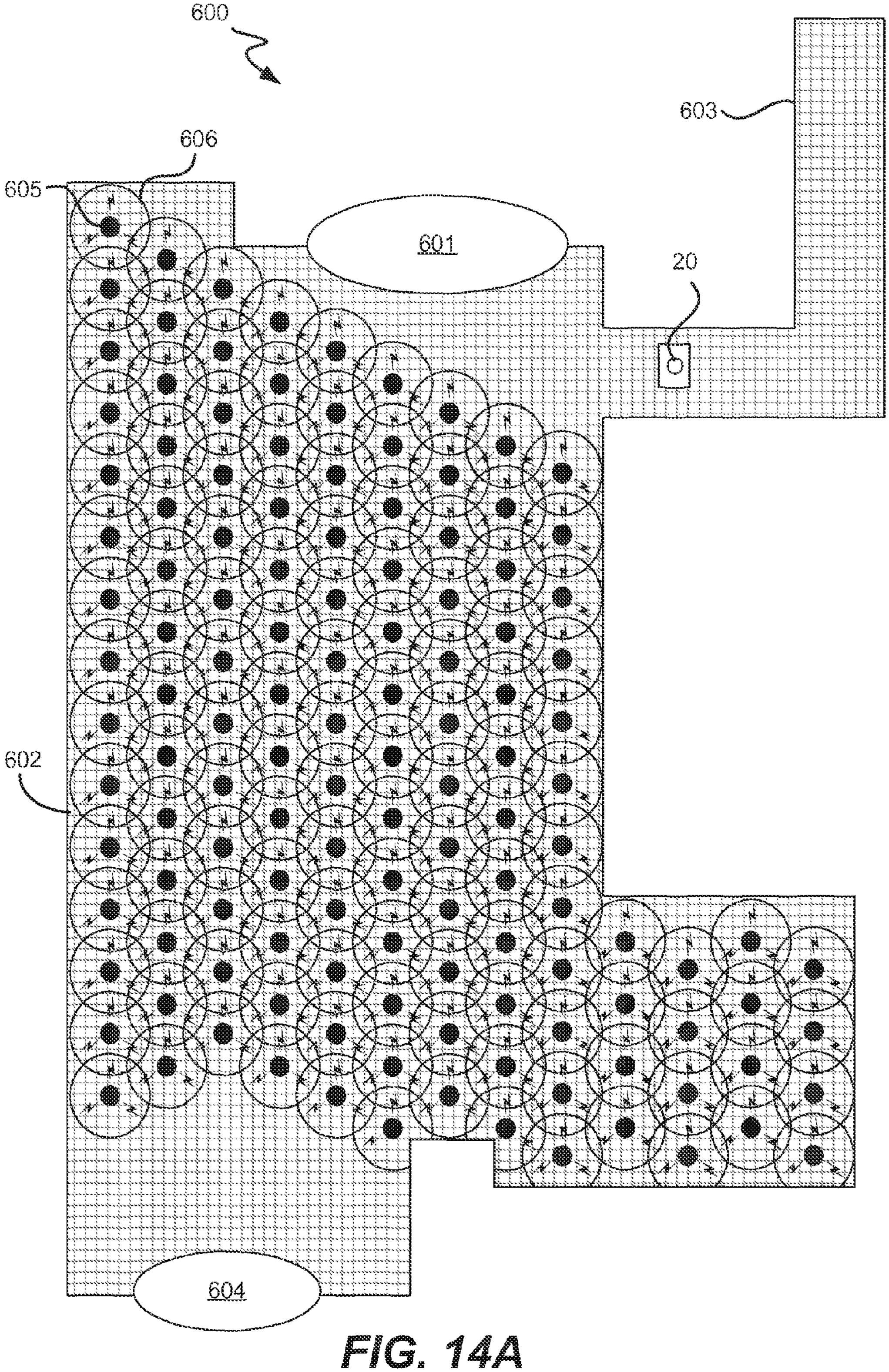
FIG. 14A illustrates in top plan view an exemplary casino floor layout having at least one PGD and multiple virtual leash terminals in the form of pico cells in accordance with one embodiment of the invention.

Referring now to FIG. 14A, an exemplary casino floor layout having at least one PGD and multiple virtual leash terminals in the form of pico cells in accordance with one embodiment of the invention is illustrated in top plan view. Casino 600 can include various items in its floor layout, such as, for example, a main or primary entrance region 601, a main or primary gaming floor 602 adapted for the play of wager based games, a hallway or other passageway 603 to an associated hotel or set of elevators to hotel facilities, and an entrance region 604 to a restaurant, shop or other affiliated enterprise within the casino, among other items. Of course, many other floor layout items and types of items may exist, and it will be understood that only a few are being shown for purposes of illustration in the present example. As is generally known, there can be locations and areas within casino 600 that are gaming appropriate, and others that are not. For example, much of primary gaming floor 602 will be gaming appropriate, with many gaming machines, gaming tables and other types of gaming devices and activities taking place. Areas where gaming might not be appropriate or legal can include those regions near entryways, such as entryways 601 and 604, as well as hallways or passageways to other non-gaming areas, such as hotel passageway 603. In particular, various legal statutes or rules might require that gaming not take place within a given distance of an entryway to a store or restaurant where children are accepted and may be present, such as a restaurant entry 604.

As such, a plurality of pico cells 605 can be established within casino 600 in and about areas where gaming activities may be legally conducted, such as most of primary gaming floor 602. Each pico cell 605 can have a limited short range, denoted as perimeter 606, within which signals emitted from the pico cell can be detected by a PGD, such as PGD 20. By strategically placing a plurality of pico cells in a particular manner, a casino or other gaming establishment can create an overall region where PGDs are able to pick up a signal from at least one system pico cell, and thus be operational with respect to wager based gaming. As shown in FIG. 14A, this region for casino 600 corresponds to all areas falling with the range perimeter 606 of any of the pico cells 605. Where a PGD is not within any such range perimeter of a pico cell, it should not pick up a pico cell signal, and thus will prevent its user from initiating or continuing a gaming session outside of the designated gaming region.

Such pico cells 605 can be established as, for example, generic wireless access points located on the ceiling or at other alternative locations on the gaming floor. In some embodiments, one or more gaming machines, gaming terminals, kiosks or other items on the gaming floor can serve as host to a pico cell. As will be readily appreciated, any given gaming machine, terminal, kiosk or the like might also be adapted in other ways to serve as a system emitter for purposes of a virtual leash function. If used to emit a virtual leash type of signal, a gaming machine might be adapted to do so via its candle, for example.

As shown in FIG. 14A, it may be desirable to orient multiple pico cells 605 such that there is some overlap with respect to the range of more than one cell. Such an overlapping design would not only prevent various "holes" in coverage that can occur where cells are spaced farther apart, but can also provide for a greater amount of backup coverage in an area in the event that a particular pico cell is lost, damaged or becomes non-functional for any reason. With respect to the illustrative exemplary PGD, this PGD 20 is actually within passageway 603, and as such is not within the range perimeter of any system pico cell. Thus, the user of PGD 603 would not be allowed to participate in gaming activities on the PGD at this location. Should the user move out of the passageway 603 and into the range 606 of at least one pico cell 605, then his or her gaming session would be allowed to start or continue.

Another method that might be used to determine locations for PGDs could involve triangulation to determine the exact physical location of each PGD within the system. As is generally known, triangulation can involve the use of three or more signal sensing and/or emitting devices, with at least three being able to detect a signal from a subject device, such as a PGD. While each signal sensing device is not by itself capable of determining a PGD or other device location, such a location can be determined by using multiple signal sensing devices. In general, each signal sensing device can typically detect the distance from itself to a subject PGD or other similar signal emitting device, such that a circle can be proscribed about a single sensing device with respect to where the PGD or other emitting device might be. By using at least three signal sensing devices, three or more such circles can be proscribed, with the intersection of all such circles defining the exact location of the emitting device. Further details of such a triangulation approach within a gaming environment can be found at, for example, commonly owned U.S. Pat. No. 6,843,725, issued to Nelson and entitled "Method And Apparatus For Monitoring Or Controlling A Gaming Machine Based On Gaming Machine Location," which is incorporated herein by reference in its entirety and for all purposes.

Figure 14B:
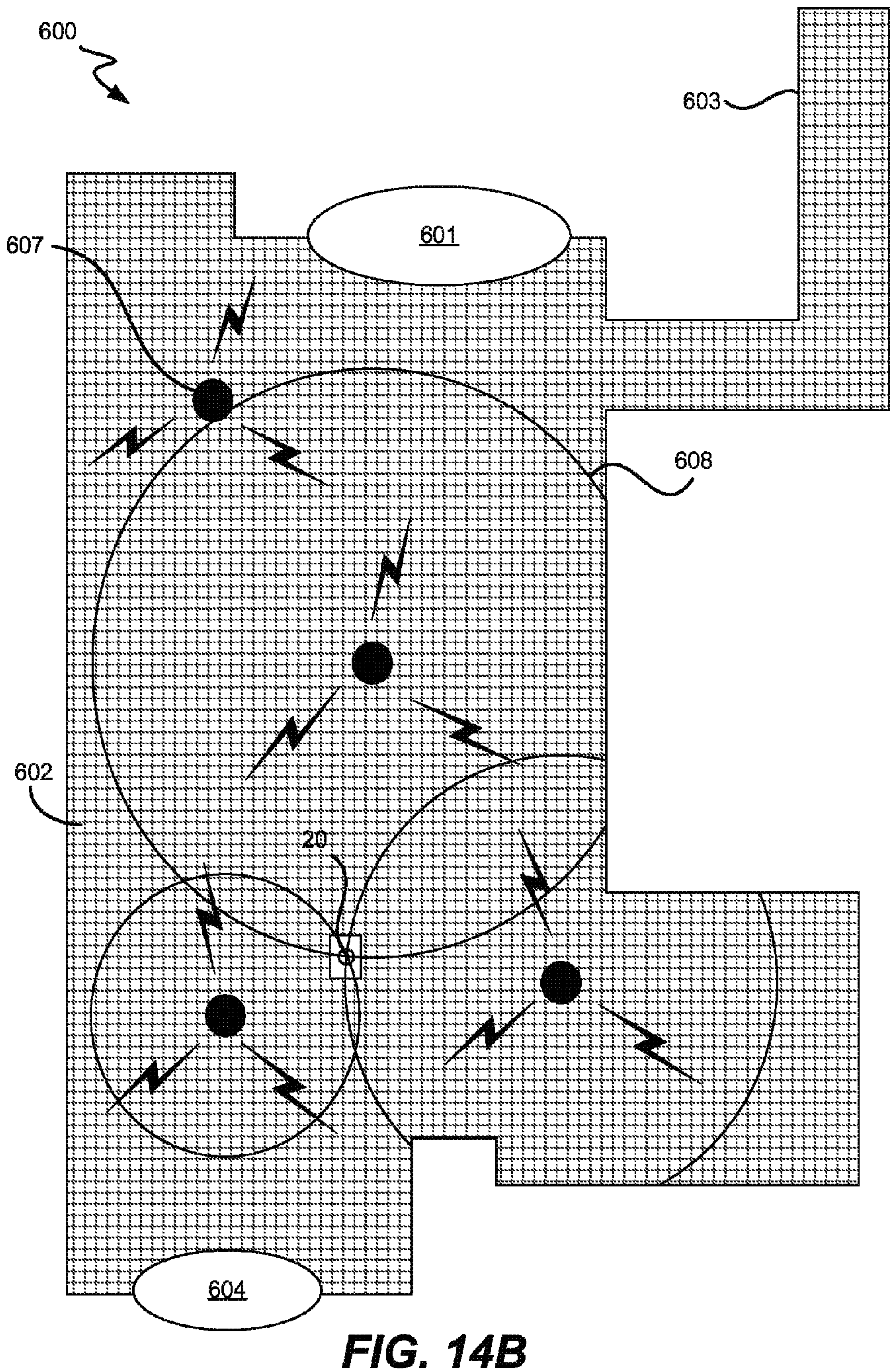
FIG. 14B illustrates in top plan view an exemplary casino floor layout having at least one PGD and multiple virtual leash terminals in the form of triangulation devices in accordance with one embodiment of the invention.

For purposes of illustration, FIG. 14B depicts in top plan view the same exemplary casino floor layout having at least one PGD present, only with multiple virtual leash terminals in the form of triangulation devices in accordance with one embodiment of the invention. Although it might be possible for casino 600 to have both pico cells and triangulation devices in the same environment or area, it is also contemplated that either form of location sensing system could be independently used. With respect to a triangulation system, at least three triangulation devices 607 can be located about the casino, preferably in strategic locations based on the shape of the casino floor plan and designated permissible gaming regions. Such triangulation devices could be in the form of wireless system access points atop towers or coupled to the ceiling above the gaming floor. Alternatively, as in the pico cell embodiment above, such triangulation devices could be hosted at one or more gaming machines, terminals, or kiosks. Unlike the pico cell embodiment above, a given PGD would not necessarily be operable for wager based gaming purposes just because it might detect a signal from a triangulation device 607 at the casino. Rather, each triangulation device 607 would be adapted to determine the distance between itself and a given PGD, such as by reading a signal from the PGD at the triangulation device.

To any single triangulation device, such a distance could be recognized as any possible location residing along a distance perimeter 608 from the triangulation device. Of course, locations outside of the casino floor plan might not be included as possible PGD locations, as is shown. Once a distance perimeter for a given PGD, such as PGD 20, is established for two different triangulation devices 607, then one or at most two possible locations would be possible for the PGD 20. In some instances, a third triangulation device will become necessary to pinpoint the exact location of a given PGD. As illustrated, the distance perimeters 608 of three different triangulation devices 607 have been used to pinpoint the location of PGD 20 as being near the entrance 604 of an associated restaurant, but not so close as to prohibit gaming activity at the PGD 20 at its present location. It should be appreciated that distance perimeter 608 does not represent a range for a triangulation device 607. Rather, the range for each such triangulation device can be quite far, even extending to many or all locations and distances on the casino floor. Such ranges are not illustrated.

One advantage to using such a triangulation approach is that PGDs that might be outside a legitimate gaming area but are still in wireless communication with one or more system devices can still be prevented from conducting gaming activities while outside the legitimate gaming area. Since the signal detection range is significantly larger by design, the system is adapted to determine exact PGD locations and act accordingly. In some embodiments, a "yes" or "no" signal can be sent to a given PGD based on its detected location within the system. Each PGD could then be adapted to prevent, suspend, and/or terminate a gaming session whenever it is outside of an approved gaming area, based on the yes or no signal being sent from the system. In addition to the foregoing, other suitable specific location sensing methods might also be adopted for use with the overall PGD based gaming system, with such specific location sensing methods including, for example, WiFi position sensing, (RF Fingerprinting, such as at https://www.ekahau.com), time difference of arrival ("TDOA"), and active RF tags, among others.

Still another form of virtual leash can be created with respect to the actual PGD itself, such that verification can be made that the device attempting to play games is a proper device for the overall wireless and virtual leash system. Such a leash can be created using a variety of different identifying devices. For example, specially coded RFID tags can be installed within or attached to each PGD, with such RFID tags being registered on the system. In this manner, every duly registered and authorized PGD, whether it be casino owned or privately owned, can have its own separate identifier that is recognizable by the system. Of course, other types and forms of identifying devices can be uses as well. For example, a specialized dongle, E-key, USB peripheral, or other attachment might be required to be attached to the PGD for gaming to begin or continue. Such a dongle, E-key, USB peripheral or other attachment might also have a specific identifier that positively identifies and individuates its associated PGD. The specific identifier could then be read by the system as part of a virtual leash process, particularly where it may be desirable to determine the exact identity of a given PGD or set of PGDs.

Alternatively, or in addition to any of the foregoing physical devices, an identification certificate or other form of electronic identification may be stored on the PGD. Such a transaction certificate or other form of electronic identification could be added as part of an original registration or first command download process, and could remain on the PGD as an unalterable file. Any removal or deletion of the file, such as where an unalterable identifier file might be downloaded to and ultimately removed or deleted from a privately owned PGD, would then result in a need to re-register the device or otherwise download a new file containing a new digital identifier. Accordingly, one part of a registration and/or command download process for PGDs that are privately owned might include the download of an unalterable file containing an individuating identifier, such that the device can be specifically identified by the system at some later time.

Still further forms of virtual leashes can be created with respect to any particular software module or program downloaded to the PGD for use in the wireless gaming system. As will be readily appreciated, various software modules and programs may contain a short portion of code that identifies the module or program, and such identifying portions may be encrypted or otherwise secured, such that improper or fraudulent identifications or transactions are hindered or prevented. Using such items, one or more critical software programs or modules may be required to submit such identifying codes as part of a virtual leash process, in order to ensure that not only an authorized module or program is being used, but also to ensure that an appropriate version and/or revision is also being used. For example, while one authorized version of "Little Green Men" might be appropriate for use in Nevada, that same version might be improper or illegal in another gaming jurisdiction, such as in New Jersey or Monaco. In cases where a privately owned PGD has an authorized and appropriate game version downloaded to it in one jurisdiction, this version would have to be verified as appropriate in that same or any other jurisdiction before it is used again at some later time, assuming it is not deleted by the user or otherwise.

In fact, a "transaction certificate" can even be created with respect to one or more software components or codes that might be stored on a given PGD, whether casino owned or privately owned. Such a transaction certificate could also be made a part of the virtual leash process, with one or more certificate items being verified before gaming using that portion of code is initiated or permitted to continue. Such transaction certificate items could relate to, for example, the software version and/or revision for any given software module or program, the types of games downloaded, any specific game downloaded, a casino identifier, an identifier with respect to an owner, player or group of owners or players for the PGD, a time stamp, transaction data regarding any games or game seeds downloaded (e.g., game title, game type, number of seeds, money paid), a device identifier, and any jurisdictional requirements with respect to a particular gaming jurisdiction, such as the one where a registration or transaction using the device has taken place, among others.

Other virtual leash components beyond specific player, authorized location, specific PGD and authorized software leashes might also be used. Such other components or types might include those for other ways to identify a given PGD itself, a particular identifier for a gaming session, and a harm minimization component, among others. Confirmation of one or more of these additional components might be required at the time of check out and/or during a gaming session, as in the case of the personal identifying and location verification leashes described above. In the case of a PGD and/or gaming session identifier, it might be desirable to track exactly where a PGD goes, as well as how gaming and other activity on the PGD has taken place. Appropriate feedback for one or more of these additional components may be required as a part of a heartbeat in order for gaming and/or other PGD activities to continue or take place on a PGD.

With respect to such additional items, activities can be monitored on a system server adapted to detect irregularities or other suspicious behavior or patterns. Such a system server might involve authentication server 96 and/or one or more other servers further adapted to track data and perform analysis with respect to unusual or noteworthy activities. A particular alert item might include a sudden change in PGD location, particularly where such a location change might not be physically possible, such that a potentially fraudulent activity may be taking place. Other possible alert items might also include a sudden change in betting limits, patterns, game play choices and/or other PGD based activities, which might be caused by fraudulent activity or a change in the person playing the device.

Various software modules and programs might be active on the system server to detect such suspicious or irregular activity, with varying levels of alerts or alarms based on the types of detected events. In some instances, a low level alert might simply result in a heightened awareness with respect to a given player or PGD, with future activity being scrutinized more closely. In more urgent circumstances, such as where a given PGD has appeared to move from one end of the casino to another in a matter of a few seconds, an alarm or alert to security personnel to physically investigate the matter may be appropriate. To assist in the analysis process, a histogram of tracked locations and activities for each PGD might be stored on a system server or database, at least temporarily. Such histograms and other tracked and stored data might be used by the system in automated fashion, and might also be made available for inspection by operator personnel if necessary.

Figure 15:
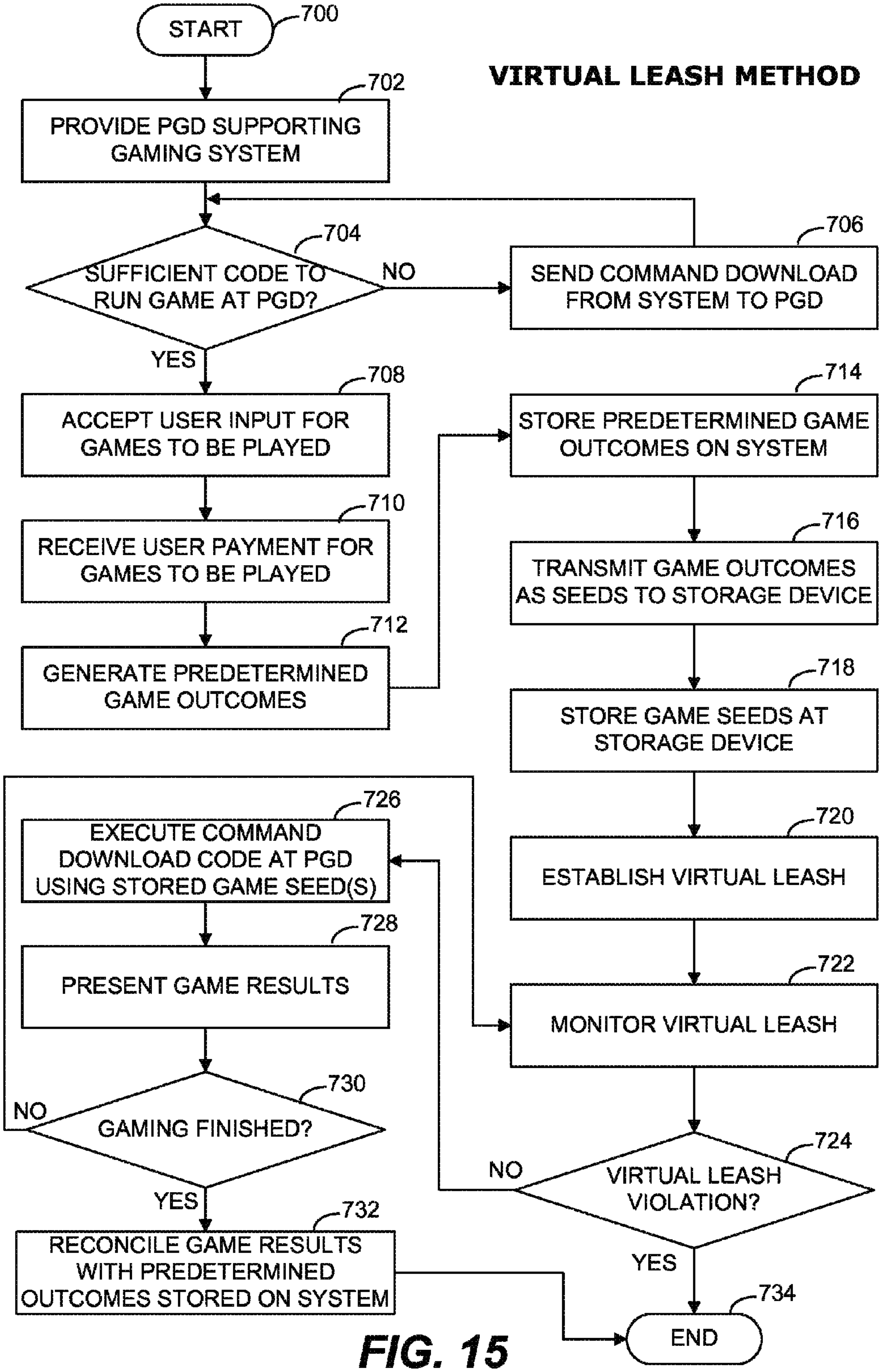
FIG. 15 is a flowchart illustrating one exemplary method of authenticating and verifying a player and location associated with a given PGD in accordance with various embodiments of the invention.

Turning lastly to FIG. 15, a flowchart illustrating one exemplary method of authenticating and verifying a player and location associated with a given PGD in accordance with various embodiments of the invention is provided. While the provided flowchart may be comprehensive in some respects, it will be readily understood that not every step provided is necessary, that other steps can be included, and that the order of steps might be rearranged as desired by a given gaming operator. After start step 700, a suitable gaming system having one or more servers adapted to facilitate wager based game play on a PGD is provided at process step 702. At a subsequent decision step 704, an inquiry is made as to whether a sufficient amount of code resides at the PGD to run games where the only further input needed is one or more game seeds containing data for predetermined game outcomes. If not, then the method moves to process step 706, where a command download of code for various programs or modules is provided from the system to the PGD. After this takes place, decision step 704 is repeated, with steps 706 and 704 potentially being repeated several times until a sufficient level of program code resides at the PGD.

Once code sufficient to run a desired game exists at the PGD, the method then continues to process step 708, where user input regarding the number of games to be played is accepted. At a following process step 710, payment for such games to be played is accepted from the user, and a set of predetermined game outcomes are then generated at process step 712. These predetermined game outcomes are stored on a system server or database at process step 714, are converted into seed form and transmitted to a storage device at process step 716, and are stored at the storage device at process step 718. Again, such a storage device can be a part of or can be separate from the actual PGD where the games are to be played. At process step 720, a virtual leash can then be established when the user is ready for actual gaming on the PGD. The virtual leash is monitored at process step 722, and an inquiry is made at decision step 724 as to whether any substantive violation has occurred to the virtual leash. If so, then the gaming session is suspended or terminated, and the method immediately ends at end step 724.

If the virtual leash remains intact and is not violated, however, then the method continues to process step 726, where the command download code residing at the PGD is executed using one or more of the stored game seeds. The game results for such game execution can then be presented or displayed at process step 728, after which an inquiry is made at decision step 730 as to whether the gaming session is finished. If not, then the method reverts to process step 722 for a repeat of steps 722 through 730. If the gaming session is indeed finished, however, then the method moves on to process step 732, where the overall game results are reconciled with the predetermined game outcomes previously stored on the system. Ways of dealing with reconciled and non-reconciled game results are discussed above. After this reconciliation, the method then ends at end step 732. Again, various details and additional steps may similarly be included, and it is specifically contemplated that many variations of these exemplary methods may also be practiced.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming system adapted for accepting wagers, playing games based on the wagers, and granting monetary payouts based on the results of the games, comprising:

a game server configured to accept input regarding a specific number of wager based games to be played on an associated hand-held personal gaming device, to generate a game seed having data regarding a predetermined game outcome for each of said specific number of wager based games, and to transmit said game seed for each of said specific number of wager based games to a storage device for use by said personal gaming device for future game play thereupon, wherein said wager based games involve the placement of wagers, the play of games based on the wagers and the grant of payouts based on the outcomes of the games;

a financial server in communication with said game server and configured to track financial data related to each of said generated predetermined game outcomes;

an authentication server in communication with said game server and configured to establish a plurality of virtual leashes, wherein each of the plurality of leashes are repeatedly checked during game play on the personal gaming device, wherein a break in any of the plurality of virtual leashes causes game play on the personal gaming device to stop, wherein the plurality of virtual leashes includes:

a personal virtual leash adapted to authenticate or verify a user of said personal gaming device, a location virtual leash adapted to determine whether a location of the personal gaming device is within an authorized gaming area, wherein a break in the location virtual leash additionally triggers a warning message to the player, a personal gaming device virtual leash adapted to verify the personal gaming device itself, and a software virtual leash adapted to verify that software stored on said personal gaming device is authorized to be used; and a hand-held personal gaming device including a display adapted to display gaming related information, a processor configured to execute gaming related code, and a memory containing at least one command download of computer code to be executed by said processor, wherein said at least one command download of computer code includes enough code for said hand-held personal gaming device to process and display independently a game play at said display based on one of said game seeds, and wherein said personal gaming device is adapted to communicate both with said game server and said authentication server, wherein the financial server is further configured to accept information from the gaming server regarding the predetermined game outcome for each of the specific number of games, and is further configured to reconcile the accepted information with actual results from the future game play on the personal gaming device.

2. The gaming system of claim 1, wherein said specific number of wager based games to be played comprises a block of games to be paid for in advance before said game seeds are transmitted to said personal gaming device.

3. The gaming system of claim 1, further including:

a portable memory device adapted to store said game seeds, wherein said portable memory device is adapted to be coupled and decoupled from said personal gaming device.

4. The gaming system of claim 1, wherein said personal virtual leash is established at least in part by accepting at least one of a PIN, password, fingerprint, voiceprint, retinal scan, picture, or digital signature of said user.

5. The gaming system of claim 4, the personal virtual leash is established by reading a fingerprint of said user while said user handles said personal gaming device.

6. The gaming system of claim 1, wherein said personal gaming device virtual leash is established at least in part by accepting data from at least one of an RFID tag, or dongle.

7. The gaming system of claim 1, further including:

at least one docking station configured to interface with said personal gaming device, wherein said game seeds are transmitted to said personal gaming device via said at least one docking station.

8. The gaming system of claim 1, wherein said hand-held personal gaming device comprises a private outside device owned by said user, and wherein one or more of said game server, said financial server and said authentication server are owned and operated by a gaming establishment separate from said user.

9. The gaming system of claim 1, wherein said location virtual leash is established at least in part by emitting a signal from one or more system devices.

10. A method of administering wager based games, comprising:

providing a gaming system having one or more servers adapted to facilitate the play of said wager based games at an associated hand-held personal gaming device, said wager based games involving the placement of wagers, the play of games, and the grant of monetary payouts based on the results of the games;

accepting input from a first user regarding a number of wager based games to be played on said personal gaming device, said personal gaming device including a display adapted to display gaming related information, a processor configured to execute gaming related code, and a memory containing at least one command download of computer code to be executed by said processor, wherein said at least one command download of computer code includes enough code for said personal gaming device to process and display a game play at said display based on a game seed having data regarding a predetermined game outcome for a respective game;

generating at said system having one or more servers a predetermined game outcome for each of said number of wager based games to be played on said personal gaming device;

transmitting said predetermined game outcome for each of said number of games in the form of data within a game seed to a storage device for use by said personal gaming device;

storing said game seed for each of said number of games at said storage device for later use;

executing said at least one command download of computer code at said personal gaming device using a first game seed from said stored game seeds to present a game corresponding to said first game seed at said display;

storing data regarding said predetermined game outcome for each of said number of games at least one of said one or more system servers;

establishing, by said system having one or more servers, a plurality of virtual leashes relating to the personal gaming device, wherein a break in any of the plurality of virtual leashes causes the game play on the personal gaming device to stop, wherein the plurality of leashes includes:

a personal virtual leash configured to authenticate or verify the first user, a location virtual leash configured to determine whether a location of the personal gaming device is within an authorized gaming area, wherein a break in the location virtual leash additionally triggers a warning message to the player, a personal gaming device virtual leash configured to verify the personal gaming device itself, and a software virtual leash configured to verify that software stored on the personal gaming device is authorized for the game play;

monitoring the plurality of virtual leashes for a break of any of the plurality of leashes; and reconciling said stored data with actual results from said executed game plays on said personal gaming device using said game seeds.

11. The method of claim 10, further comprising the step of:

receiving payment from said first user for a wager to play at least one of said number of wager based games.

12. The method of claim 10, wherein said storage device is selected from the group consisting of: a smart card, a player card, a portable memory module and a memory of said personal gaming device.

13. The method of claim 10, wherein said personal virtual leash is established at least in part by accepting at least one of a PIN, password, fingerprint, voiceprint, retinal scan, picture, or digital signature of a proper user.

14. The method of claim 10, wherein the step of monitoring said plurality of virtual leashes includes monitoring on a repeated basis to determine whether a break has occurred.

15. The method of claim 10, further comprising the step of:

providing a docking station configured to interface with said personal gaming device, wherein said transmitting step is performed via said docking station.

16. The method of claim 10, further comprising the steps of:

receiving input from a second user regarding a request to play said game at said personal gaming device; and verifying that said second user is a proper user for which said game may be played.

17. A gaming system adapted for accepting wagers, playing games based on the wagers, and granting monetary payouts based on the results of the games, comprising:

a game server configured to accept input regarding a specific number of wager based games to be played on an associated personal gaming device, to generate a game seed having data regarding a predetermined game outcome for each of said specific number of wager based games, and to transmit said game seed for each of said specific number of wager based games to a storage device for use by said personal gaming device for future game play thereupon, wherein said game server is further configured to provide at least one command download of computer code to said personal gaming device, wherein said at least one command download of computer code includes enough code for said personal gaming device to process and display independently a game play at a display of said personal gaming device based on one of said game seeds, and wherein the game server is further configured to generate information regarding the predetermined game outcome for each of the specific number of games, and is further configured to reconcile the generated information with actual results from the future game play on the personal gaming device; and an authentication server in communication with said game server and configured to establish a plurality of virtual leashes with said personal gaming device, wherein each of the plurality of leashes are repeatedly checked during game play on the personal gaming device, wherein a break in any of the plurality of virtual leashes causes game play on the personal gaming device to stop, wherein the plurality of virtual leashes includes:

a personal virtual leash adapted to authenticate or verify a user of said personal gaming device, a location virtual leash adapted to determine whether a location of said personal gaming device is within an authorized gaming area, wherein a break in the location virtual leash additionally triggers a warning message to the player, a personal gaming device virtual leash adapted to verify the personal gaming device itself, and a software virtual leash adapted to verify that software stored on said personal gaming device is authorized to be used.

18. The gaming system of claim 1, wherein the authentication server is further configured to send an alert to security personnel if the location virtual leash is broken.

19. The gaming system of claim 1, wherein the memory of the personal gaming device is configured to be erased if the location virtual leash is broken.

* * * * *